US010832528B2

(12) United States Patent
Malek

(10) Patent No.: US 10,832,528 B2
(45) **Date of Patent: *Nov. 10, 2020**

(54) SYSTEM AND METHOD OF CONDUCTING GAMES OR BETTING AS A PROXY, WITH EASE OF ACCESS

(71) Applicant: Sean Malek, Las Vegas, NV (US)

(72) Inventor: Sean Malek, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,789

(22) Filed: Jan. 15, 2019

(65) Prior Publication Data

US 2019/0147701 A1 May 16, 2019

Related U.S. Application Data

(63) Continuation-in-part of application No. 15/594,557, filed on May 12, 2017, now Pat. No. 10,325,447, (Continued)

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G07F 17/34*** | (2006.01) |

(52) U.S. Cl.

CPC ........ *G07F 17/3288* (2013.01); *G07F 17/323* (2013.01); *G07F 17/326* (2013.01); *G07F 17/3211* (2013.01); *G07F 17/3223* (2013.01); *G07F 17/3227* (2013.01); *G07F 17/3239* (2013.01); *G07F 17/3244* (2013.01); *G07F 17/3251* (2013.01); *G07F 17/3255* (2013.01); *G07F 17/3258* (2013.01); *G07F 17/3276* (2013.01); *G07F 17/3293* (2013.01); *G07F 17/34* (2013.01); *G07F 17/3209* (2013.01)

(58) Field of Classification Search

USPC ........ 463/13, 17, 20, 21, 22, 25, 27, 39, 42; 273/292

See application file for complete search history.

(56) References Cited

U.S. PATENT DOCUMENTS

| | | | | |
|---|---|---|---|---|
| 6,358,149 B1 * | 3/2002 | Schneider | G07F 17/32 463/27 | |
| 2013/0090160 A1 * | 4/2013 | Iyer | G07F 17/3225 463/27 | |

* cited by examiner

*Primary Examiner* — Adetokunbo O Torimiro

(74) *Attorney, Agent, or Firm* — Newman Law, LLC

(57) ABSTRACT

To bring the excitement to the people (majority, who are not experts in games), we present the examples, described here, for one person to be able to bet on and be part of the deal and excitement for a third party, as his agent, proxy, or shadow. Some other examples are: one-link connectivity for easy registration and betting, connection and integration of social networks, Game of skills and/or chance, TV show integration, Player vs player situations, One-click betting/linking/functioning/triggering or OCB, Tipster scheme, a website belonging to our platform, Charity scheme, Pari-mutuel betting in our environment (all bets of a type in a pool, where any winning can be shared, after the house or casino deduction for fees), Proposition betting in our environment, and Multiple leg/parameter situation (where only a subset of decisions is relied upon on a 3rd party, and the rest are decided by the 1$^{st}$ party, herself).

42 Claims, 40 Drawing Sheets

Related U.S. Application Data which is a continuation-in-part of application No. 15/212,273, filed on Jul. 17, 2016, now Pat. No. 9,652,939.

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Of A Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

165

*FIG. 2A*

PRIOR ART-Jacks or Better

| Hand | 1 Credit | 2 Credits | 3 Credits | 4 Credits | 5 Credits |
|---|---|---|---|---|---|
| Natural Royal Flush | 300 | 600 | 900 | 1200 | 4000 |
| Four Deuces | 200 | 400 | 600 | 800 | 1000 |
| Wild Royal Flush | 25 | 50 | 75 | 100 | 125 |
| Five Of A Kind | 15 | 30 | 45 | 60 | 75 |
| Straight Flush | 9 | 18 | 27 | 36 | 45 |
| Four Of A Kind | 5 | 10 | 15 | 20 | 25 |
| Full House | 3 | 6 | 9 | 12 | 15 |
| Flush | 2 | 4 | 6 | 8 | 10 |
| Straight | 2 | 4 | 6 | 8 | 10 |
| Three Of A Kind | 1 | 2 | 3 | 4 | 5 |

170

*FIG. 2B*

PRIOR ART-Deuces Wild

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Aces | 160 | 320 | 480 | 640 | 800 |
| Full House | 10 | 20 | 30 | 40 | 50 |
| Flush | 7 | 14 | 21 | 28 | 35 |
| Straight | 5 | 10 | 15 | 20 | 25 |
| Three Of A Kind | 3 | 6 | 9 | 12 | 15 |
| Two Pair | 1 | 2 | 3 | 4 | 5 |
| Jacks Or Better | 1 | 2 | 3 | 4 | 5 |

175

*FIG. 2C*

PRIOR ART-Double Bonus

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Aces w/2,3, or 4 | 400 | 800 | 1200 | 1600 | 2000 |
| Four 2,3, or 4 w/A-4 | 160 | 320 | 480 | 640 | 800 |
| Four Aces | 160 | 320 | 480 | 640 | 800 |
| Four 2,3, or 4 | 80 | 160 | 240 | 320 | 400 |
| Four 5-K | 50 | 100 | 150 | 200 | 250 |
| Full House | 10 | 20 | 30 | 40 | 50 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 1 | 2 | 3 | 4 | 5 |
| Jacks Or Better | 1 | 2 | 3 | 4 | 5 |

180

*FIG. 2D*

PRIOR ART-Double Double Bonus

185

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Aces | 80 | 160 | 240 | 320 | 400 |
| Four 2,3, or 4 | 40 | 80 | 120 | 160 | 200 |
| Four 5-K | 25 | 50 | 75 | 100 | 125 |
| Full House | 7 | 14 | 21 | 28 | 35 |
| Flush | 5 | 10 | 15 | 20 | 25 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

PRIOR ART-5/7 Bonus Poker

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Of A Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

200

*FIG. 3A*

(≤$50.00)

| Hand | 1 Credit | 2 Credits | 3 Credits | 4 Credits | 5 Credits |
|---|---|---|---|---|---|
| Royal Flush | 250 | 500 | 750 | 1000 | 4250 |
| Straight Flush | 50 | 100 | 150 | 200 | 300 |
| Four Of A Kind | 25 | 50 | 75 | 100 | 175 |
| Full House | 9 | 18 | 27 | 36 | 45 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

205

*FIG. 3B*

($50.25 to $100.00)

| Hand | 1 Credit | 2 Credits | 3 Credits | 4 Credits | 5 Credits |
|---|---|---|---|---|---|
| Royal Flush | 250 | 500 | 750 | 1000 | 4250 |
| Straight Flush | 50 | 100 | 150 | 200 | 300 |
| Four Of A Kind | 25 | 50 | 75 | 100 | 175 |
| Full House | 9 | 18 | 27 | 36 | 75 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

210

*FIG. 3C*

($100.25 to $200.00)

| Hand | 1 Credit | 2 Credits | 3 Credits | 4 Credits | 5 Credits |
|---|---|---|---|---|---|
| Royal Flush | 250 | 500 | 750 | 1000 | 4250 |
| Straight Flush | 50 | 100 | 150 | 200 | 300 |
| Four Of A Kind | 25 | 50 | 75 | 100 | 175 |
| Full House | 9 | 18 | 27 | 36 | 75 |
| Flush | 6 | 12 | 18 | 24 | 40 |
| Straight | 4 | 8 | 12 | 16 | 25 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

215

*FIG. 3D*

(>$200.00)

SYSTEM AND METHOD OF CONDUCTING GAMES OR BETTING AS A PROXY, WITH EASE OF ACCESS

RELATED APPLICATIONS

This application is a Continuation-in-part (CIP) of another co-pending application Ser. No. 15/594,557, filed 12 May 2017, called Malek-Game-1-CipCipCip, from Family-2, titled "SYSTEM AND METHOD OF CONDUCTING GAMES OF CHANCE AS A PROXY OR BASIS FOR ANOTHER PLAYER", which is a Continuation-in-part (CIP) of another application Ser. No. 15/212,273, filed 17 Jul. 2016, now allowed/issued as U.S. Pat. No. 9,652,939, issued on 2017 May 16, which is a Continuation-in-part (CIP) of another application Ser. No. 14/846,748, filed Sep. 5, 2015, now allowed and issued as U.S. Pat. No. 9,396,612, issued on 19 Jul. 2016, which was a Continuation-in-part (CIP) of another application Ser. No. 14/742,405, filed 2015 Jun. 17, now U.S. Pat. No. 9,218,722, issued on Dec. 22, 2015, which is a Continuation-in-part (CIP) of another co-pending application Ser. No. 14/702,701, filed 2 May 2015, which is an application as a Continuation-in-part (CIP) of another application Ser. No. 14/465,670, filed Aug. 21, 2014, now allowed, as U.S. Pat. No. 9,022,858, issued on May 5, 2015, which is a Continuation-in-part (CIP) of another application Ser. No. 14/096,140, filed 4 Dec. 2013, which is a continuation-in-part application of U.S. patent application Ser. No. 12/050,768 filed on Mar. 18, 2008, now U.S. Pat. No. 8,641,514, issued Feb. 4, 2014, which is a continuation-in-part application of U.S. patent application Ser. No. 11/688,111 filed on Mar. 19, 2007. It incorporates by reference the teachings of all applications above, and claims priority to the filing dates of all applications above.

FIELD OF INVENTION

The embodiments of the present invention relate to a system and method of enhancing conventional game in a game of chance, based on the third party proxy, agent, or basis.

BACKGROUND

Casinos are a mix of electronic gaming machines (e.g., slot machines) and live casino games (e.g., craps), or table games, e.g., poker or other playing card games. Most people are not experts in these games, but enjoy playing anyway, with limited skills. Some games have very complex rules and require complex analysis. So, very few are very good at it, but the rest just enjoy watching the experts play. For example, lots of people watch tournaments played on TV for various games, e.g., poker. It can be used for people who are at different casinos or machines, or who cannot physically be there, or cannot afford to go there, or do not have time to go there, or the specific game is not there at the current location. The proxy scheme can help all of those people/situations. It can be used for a 1$^{st}$ person, who thinks that the 2$^{nd}$ person is an expert or lucky or has luck or is on a lucky machine or on lucky streak or on a roll or has more chance of winning or has a lucky object, or has those impressions mentioned above, regardless of the actual data or validity. So, in those cases, the 1$^{st}$ person wants to be in his place, or wants to be there, or wants to sit on that machine and play, instead or with the 2$^{nd}$ person.

SUMMARY

To bring the excitement to the rest of people (majority, who are not experts), we invented the following embodiments, described below, for one person be able to bet on and be part of the deal and excitement for a third party, as his agent, proxy, or shadow, to bet for him, or instead of him, or as if the first person was doing the game directly, or one betting for another, or one playing for another with the other person's money. That generates more excitement on the game or casino, with more participation, transactions, income, profit, loyalty, and repeat customers.

This also brings a lot of variations on the game, e.g., stock market model, or derivatives model, or hedge fund model, to make the game very innovative and exciting for mass of people, i.e., majority of people who want to play and cheer up the experts from the side-line, but have a stake in the game and result, making it more interactive and engaging than anything else that has been introduced in casinos and gaming industry, so far. Other variations, embodiments and features of the present invention will become evident from the following detailed description, drawings and claims. Some other examples/embodiments are:

A proxy betting system, with one-link connectivity for easy registration and betting, as well as connection and integration of social networks, for rapid expansion in market and for generating excitement among users, as options/extras.

Other options are:

1. Game of skills and/or chance
   The expert can be followed by others.
   Or, any person with no specific skills can be followed by others.
2. TV show integration
3. Player vs player situations
4. One click betting/linking/functioning/triggering, in our environment, or OCB
5. Tipster scheme
6. Social network scheme, with a website belonging to our platform
7. Charity scheme
8. Pari-mutuel betting in our environment: all bets of a type in a pool, where any winning can be shared, after the house or casino deduction for fees,
9. Proposition betting in our environment
10. Multiple leg/parameter situation: where only a subset of decisions is relied upon on a 3rd party, and the rest are decided by the 1$^{st}$ party, herself

BRIEF DESCRIPTION OF THE DRAWINGS

FIGS. 2*a*-2*e* illustrate four conventional video poker pay tables;

FIGS. 3*a*-3*d* illustrate an exemplary group of pay tables according to the embodiments of the present invention;

FIG. 7 illustrates a flow chart detailing a methodology associated with an embodiment of the present invention utilized with live games of chance.

DETAILED DESCRIPTION

Figure 1:
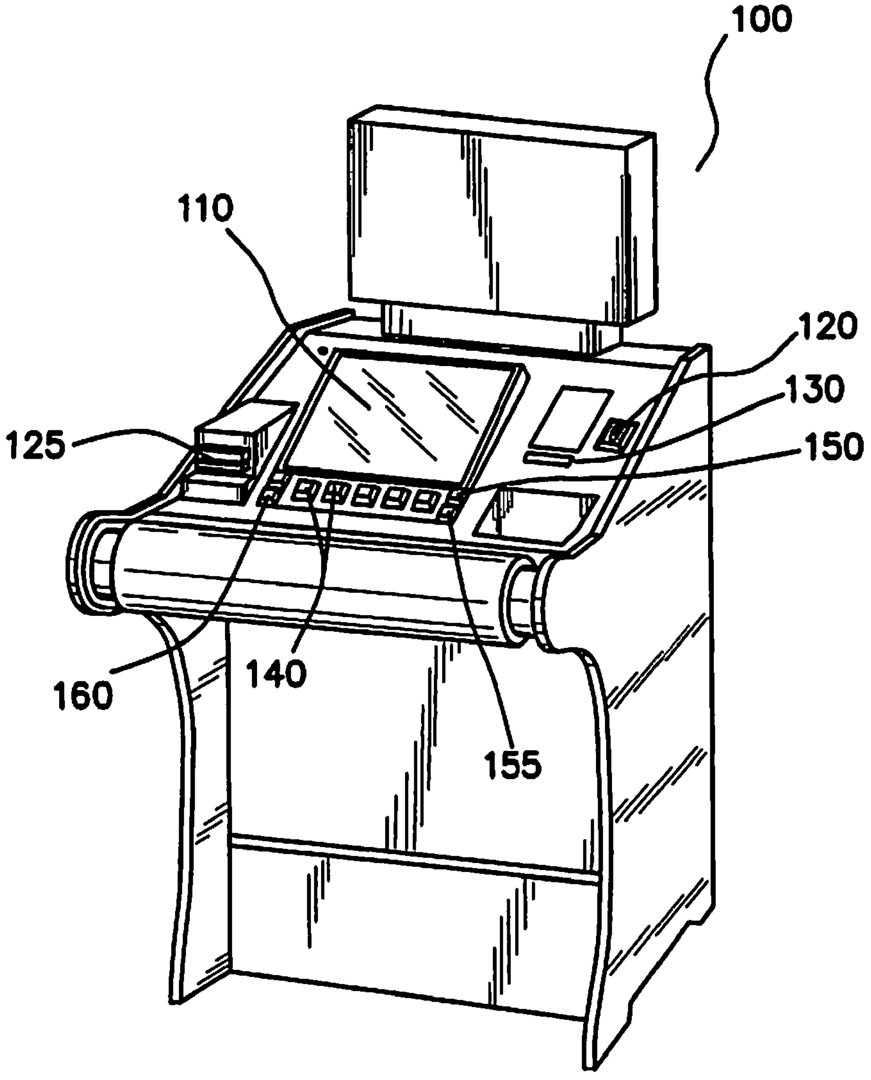
FIG. 1 illustrates a conventional video poker machine.

Proxy or Agent-Playing:

Here, we describe embodiments related to the proxy or agent-playing methods and systems for casinos and gaming machines or industry. In one embodiment, we have an original player or expert player. Then, we have one or more players as audience, with low expertise, but game enthusiast, who want to participate, more than watching from sideline. These players are tag along/piggyback/coattail players (new players) who want to learn the games from masters, or want to play for fun alongside masters of the game (experts), or want to make some money based on the expertise of another person. Or, it is for people who, for any reason, cannot be there, or at that time, or for sake of money, they cannot be there.

Here, we describe embodiments for gaming/slot machine or table games or thinking games or board games or strategic games or analyzing games, through which a new player could choose from an array of other machines or electronically controlled/monitored/managed games of chance, with ongoing games and bet along with the ongoing game in real time. Or, the new player could wait for a gaming session to begin on a specific machine or for electronically controlled/monitored/managed game.

This could be one or multiple games at once. It could be that the new player sees the actual game(s) all at the same time in smaller screens, or flip through and go to each game in order to follow the progress, or just be a graph for each ongoing game to show the trend of the game (e.g., winning/losing, how long been playing, how much money the session started with, how much credit is in play now, and any information that may help player choose where to tag along, e.g., history and comments about a master, or number of scores and points or winnings, or statistics of all games the player or master has done so far, or amount of risk the player takes as a score or percentage, based on a base line or threshold, historically or up to now or recently). This could be average, cumulative, weighted average, or total for each of metrics or parameters. This is for comparisons between different game masters or experts. There can be comment or scores for social media around the same topic or game or player, to get a score, or rating, or ranking. It can have follower or fan club or Twitter follower based on that. People can invite friends to join the club or fan club. They can have discounts or coupons or special events for fan club members. Casinos can get data mining from these data or fan club members to customize the message or market for all members, to increase revenue and memberships, or expand the club very fast, or have a repeat customer.

This could be on any device, mobile, phone, casino, virtual, PC, remote, in-person, through Internet, secure network, gaming machine, table, tablet, or the like. This could be inside a casino, remote, nearby, in vicinity, with RFID, in line of sight, with infra-red communicator, with laser communicator, or with one central computer or server. This could be on separate computers, or server farm, or array of computers or processors, or communicating devices peer-to-peer, or centralized, or distributed, or parallel, or the like. This could be in real time or with delay process. This could be in-device processing, or in mobile app, or in mobile device, or centralized, or remote processing, or distributed.

In one embodiment, a new player may allocate portions (percentage or fixed amounts or conditional amounts on rules or conditions) of his credits to different ongoing games. He may be able to move credits/funds around at any time. He may cash out at any time, or he may be bound to stay as long as original player stays. They may form a pool of funds together around an expert player. That fund may have a minimum amount. He may be able to play dollar for dollar, or he may only win or lose by percentage matching the percentage won or lost at real (live) game. The second person may bet as a percentage or ratio of the expert player or up to a fixed amount of dollar value, or based on a formula, to find min, or max, or range of values, e.g.:

Y = 0.5 G + 5 $ or
Y = 0.5 G − 5 $ or
Y = 0.5 G or
Y = 0.5 $G^2$ + 5 $ or
Y = 0.5 $G^3$ + 5 $ or
Y = 0.5 $G^3$ + 0.6 $G^2$ + 8 $ or
Y = polynomial (G) or
Y = Function (G) or
Y = exp (G) or
Y = Log (G) or
Y = Ln (G) or
Y = non-linear-Function (G) or
Y = linear-Function (G) or
If ...G...... then ...Y.... or
Rules on Y, based on G, using rules engine or
(Case ...G1...... then ...Y1.... &
Case ...G2...... then ...Y2.... &
..................................... &
Case ...Gn...... then ...Yn....)

In one embodiment, a new player could choose to bet one play at a time or one person at a time. In one embodiment, a new player has to choose to bet multiple plays at a time or multiple persons at a time, or as a min, or by a max, or range of dollar amount, or range of percentage amount, or min time period or times or hours, or max time period or times or hours, or range of those, or thresholds on time, number, dollar value, or percentage value(s) or ratios (or based on number of plays or any other parameters/thresholds, such as handle or cash-in or "theoretical", or the like). In one embodiment, it has an option to choose, or gets mandated, or gets mandated after the first choice. In one embodiment, the choice period is limited or over after some time, initially. In one embodiment, the choices or range of choices are changing over time, or per season, or periodically, or per morning/afternoon, or per day, or calendar, or month. In one embodiment, the older (or so-called "expert" or "lucky" or "original" or "leader" or "lead" or "most wanted/desired" or "experienced") player, vs. as new player, has more choices or less limitations or different thresholds or values or parameters, as mentioned here. In one embodiment, the older player gets credits, bonuses, free plays, awards, mileage points, rewards, lunch, room, drink, gifts, rental car, or the like. In one embodiment, bringing a new member for the club counts as credit or score or dollar value or points for the member. Other embodiments are (Note that: These are different embodiments, but can be combined together, in any mixture, with themselves and any other example in this invention disclosure.):

- New player could choose amount of his own bet per hand independently of the original player's bet amount, however, of course, the outcome would depend on the outcome of the original player.
- The bet is on 2 or more expert players.
- The bet is on average of 2 or more expert players.
- The bet is on weighted average of 2 or more expert players.
- The bet is on total of 2 or more expert players.
- The bet is on min and max of 2 or more expert players.
- The bet is on range of 2 or more expert players.
- New player could choose amount of his own bet per hand only dependent of the original player's bet amount.
- In case the new player just bets along and stands by idly, there could be a side game. This side game could be played for free or for money. There could be prizes/free play, etc., offered with the side game.
- It can be hierarchical: first bets on $2^{nd}$, $2^{nd}$ bets on $3^{rd}$, and so on.
- It can be proxy voting and betting.
- Max betting per person betting, e.g., dollar or number of people or number of bets.
- Max betting on expert person, e.g., number or value or ratio or frequency or periodicity.
- Syndicate or union betting.
- Manager of syndicate gets a salary or percentage of the win.
- Group betting.
- Auction betting, based on regular or reverse auction.
- Stock market model, where the value of great player goes up based on demand, and get more salary or percentage, for his syndicate, as a reward for expertise in the game and great play history, to encourage great players and put values on them, with market setting their values automatically, based on the demand pressures.
- Hedge fund model, where one can bet and hedge against not favorable outcome.
- Derivative model, where one can bet on a derivative of a game, person, or outcome, or combination of such, for one or more people, as individual or in combo or average or total or formula-based or conditional or rules-based.
- Stock market model, where all parameters are variables, based on demand of people.
- Auction model, where all parameters are variables, based on demand of people.
- The original player may or may not be notified of someone betting along on his game remotely. He may or may not have any choice on that, or some leverage or bonus or percentage or negotiation power.
- He may or may not be able to bet on the new players' outcome of cumulative bets.
- Cumulative bets.
- Total bets.
- Average bets.
- Average over time.
- History average bets.

The coattail machines may have their own independent game, and may also be played along with from other machines.

There could be infinite bets as a new player, or could tag along/bet on one or more coattail machines, that are betting on one or more other ongoing games each.

Original player may be a players' club member with a disclosed history of winning/losing, gaming habits, and etc. He may invite new players to bet on his game, or he may just announce to be available, as a broadcast or text message, so new players can begin betting on his game, or learn from him, with verifiable results and track record by Casino, published or on website for inspection, with statistics of all expert players who are available for this process listed and tabulated, with ranking and scores for each and complete history and curves/stats for each, with recent and overall performances. This notification could be automatic or made by original player, within a property/players' club/group of properties/group of gaming machines/or the like.

The invitation is generated for players with high score, above some threshold, F.

The invitation is generated automatically.

People can invite expert(s) to become lead or leader on a syndicate, where people bet on him or them, individually, or collectively, or in average, or weighted average format, or the like.

The bet can be uniform or proportional or not related at all, for each of the leaders.

The syndicate can be initiated by an expert or group of experts.

There is at least one lead or leader on each syndicate.

There may or may not be one or more managers, who can do one or more of the following tasks:

who acts as a manger of the fund who selects the expert who sets the bet and thresholds for the bets.

There might be more than one lead on each syndicate.

There are one or more buckets of funds for each syndicate, to be used independently for different bets for same or different or multiple events or conditions or experts or games or casinos or family of games or group of players or a club's members or any subset of those.

The manager may or may not set his own, or by others, for salary or percentages for manager fees, or per transaction for fixed or percentage values, per period or month or quarter or year or day, on net or gross values.

Players with applicable history of winning/losing could be popular and may be able to collect a flat fee or a percentage of wins or initially deposited monies in order to allow new players to bet on them. The higher the demand and expertise, the higher the value in stock market setting or auction setting, or more income or percentages.

Players may also disallow their gaming session to be followed or bet on, in one embodiment.

In one other example, the followers are not seen or filtered by the expert.

In one other example, the followers are or may be seen or filtered by the expert.

In one other example, the expert has no choice on parameters.

In one example, the expert has some choices on parameters, to set or limit or put ranges, e.g.: for the number of followers and dollar amount or number of games to be followed by all or one person or how the money is distributed or game parameters or the like.

New players may be notified by email/text/social media/call, etc., when their favorite players begin to play or to be notified of when their favorite player(s) may plan to begin a gaming session in the near future, or based on a calendar or entered in personal calendar or reminder clock or calendar. (Or, they are notified, when their favorite lucky machine or game being played, or expert player or lucky player is playing, or will play soon, with complete schedule/calendar marked, in advance, as an option.)

Players may have to sign up in order to be eligible to be followed.

Multiple new players can bet on an ongoing game or an original player.

Favorites could be specific games, specific machines, or specific players.

All this could be done on the Internet where it is legal.

All this could be done on devices like smart phones/tablets/computers/watches/pads/servers/TVs/processors/controllers/ASIC/FPGA/or the like.

Eligible players maybe identified and approached through data collected by casino and/or gaming staff or regular people or as in draft procedure in a Football League or through profiles in a social network setting, for matching, searching, picking up, negotiating, or contracting, based on some terms or conditions. Machines/units that can be played along with remotely, may or may not be able to be physically located/identified by a new player.

Machines that are capable of playing along with other machines may have their own game(s) so that if new player does not wish to play along with any other ongoing games at the moment, he is able to play his own game until such time he decides to play along with someone. For example, if new player wants to wait for his favorite machine/table/player to begin playing, he can do the same, meanwhile.

New player(s) can make himself accessible with an ID/players card number so he can be notified by original player of his intent to play again.

The encryption and biometrics or private/public keys are used for authentication and verification of people.

The smart cards or RFID or GPS or smart phones or passwords or serial numbers for devices or tel. numbers identify/locate the identity of people or players, to reduce fake people in games.

Also, original player can notify new player of his game/day/result, if new player happens to quit, before the original player is done with his gaming session. (Or, this notification is automatically sent by either player.)

Original player can notify a specific person/family/group that he is or will be playing now or soon or date or periodic schedule or condition to trigger to play, e.g., a specific date or event in calendar or town.

Original player can have a data bank of his history/track record identifiable by players club card/specific ID code/user name, etc., that allows/enables new players to follow his progress and decide to tag along on his games, at any given moment.

Expert player can set his own price, and can have different prices for different new players (people/groups). (The parties can set their rates, for matching together, to have a contract with each other, automatically, if they overlap in values.)

Because of the vast variety of games that this invention would encompass, many aspects of individual games need to be customizable based on, for example, but not limited to, level of interactivity between players (both ends) and players, players (both ends) and management, players (both ends) and machines, and the like. Other examples are the design of machines, design of screen, and what is seen by, or hidden from, players (both ends).

Other Inventions:

For the purpose of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

The operation of slot machines, video poker machines, keno machines and other electronic gaming devices is controlled by microprocessors which communicate with internal memory devices and the external features of the machines. The microprocessors also incorporate, or communicate with, a random number generator which ensures the randomness of the machines' outcomes. In one of the embodiments of the present invention, one or more processors, along with memory and related devices, control the new applications disclosed herein. Therefore, the embodiments, along with the corresponding odds, of the present invention may be programmed into the processor or associated software. Since the technology for operating and controlling electronic gaming machines is well known to those skilled in the art, the subtle details are not described herein.

In one specific example, video poker machines and devices have been in existence for many years. Video poker machines utilize a processor that randomly organizes a deck of simulated cards. Once a wager is placed, the order of the cards is set. Cards are then provided to the player in order off the top of the simulated deck. Reference is now made to the figures wherein like parts are referred to by like numerals throughout. FIG. 1 illustrates an exemplary video poker machine generally referred to by reference numeral 100. The machine 100 includes a display 110, coin input 120, card reader 125, bill or coupon acceptor 130 and interface buttons, including hold/discard buttons 140, deal/draw button 150, play max coins button 155 and cash out button 160. In lieu of, or in addition to, all operations achieved using the interface buttons may be accomplished via touch screen implementation.

FIGS. 2*a*-2*e* show conventional pay tables for various video poker games currently played in casinos. The pay tables 165-185 correspond to Jacks or Better, Deuces Wild, Double Bonus Poker, Double Double Bonus Poker and 5/7 Bonus Poker video poker games. The payout schemes are substantially similar with subtle nuances. Each pay table comprises payouts relative to 1 to 5 coins being played. In almost every instance the payouts have a direct relationship to the number of coins played. So, if two coins are played the payout is twice that of the same payout for one coin being played and if four coins are played the payout is four times that of same payout for one coin being played. However, each pay table provides an enhanced payout for a player having five coins (i.e., maximum coins) being played and obtaining a Royal Flush. In such instances, the payout is not five times that of the same payout for one coin being played but is 10 times. Therefore, many players play five coins because they want the enhanced payout if they hit the Royal Flush. Of course, the odds of hitting a Royal Flush are small at approximately 1 in 40,000.

The embodiments of the present invention provide players with enhanced payouts based on the amount of their cash-in or initial investment in a game of chance. That is, the amount of money (or coupons, tickets or the like) a player places into the video poker machine to initiate play influences payouts. Using video poker as an example, FIGS. 3*a*-3*d* show four unique Jacks of Better pay tables 200-215 corresponding to four different ranges of cash-in amounts associated with a quarter machine. Similar enhanced payout schedules may be generated for other video poker variations (e.g., Deuces Wild) as well. Pay table 200 corresponds to a conventional Jacks or Better pay table used in response to a player cashing in for $50 or less. Pay table 205 is used for cash-in amounts ranging between $50.25 and $100.00 and provides enhanced payouts for Royal Flush, Straight Flush and Four of a Kind outcomes with 5 coins played. Pay table 210 is used for cash-in amounts ranging between $100.25 and $200.00 and provides enhanced payouts for Royal Flush, Straight Flush, Four of a Kind and Full House outcomes with five coins played. Pay table 215 is used for cash-in amounts exceeding $200.00 and provides enhanced payouts for Royal Flush, Straight Flush, Four of a Kind, Full House, Flush and Straight outcomes with five coins played. Those skilled in the art will recognize that enhanced payouts may be generated for any winning outcomes, with any amount of coins played, and the enhancements may be manipulated in any manner desired. For example, the Royal Flush payout may be enhanced to 4250 coins, rather than 4100 coins. Regardless of the pay table, the house or casino should have a suitable edge. Also, it is possible that some payouts related to specific outcomes may be reduced while others are increased. Ideally, the overall payouts related to higher cash-in amounts are greater for the player. In other words, a player has a greater chance of winning or receives a greater return with each enhanced pay table or schedule. In one embodiment, we have higher probability or value per item or table entry or event or favorable winning event. In one embodiment, we have higher dollar amount value for a winning situation or event. That is, in different embodiments, one can get a more favorable result(s), using higher (or shifted or biased) probability and/or higher dollar value.

Figure 4:
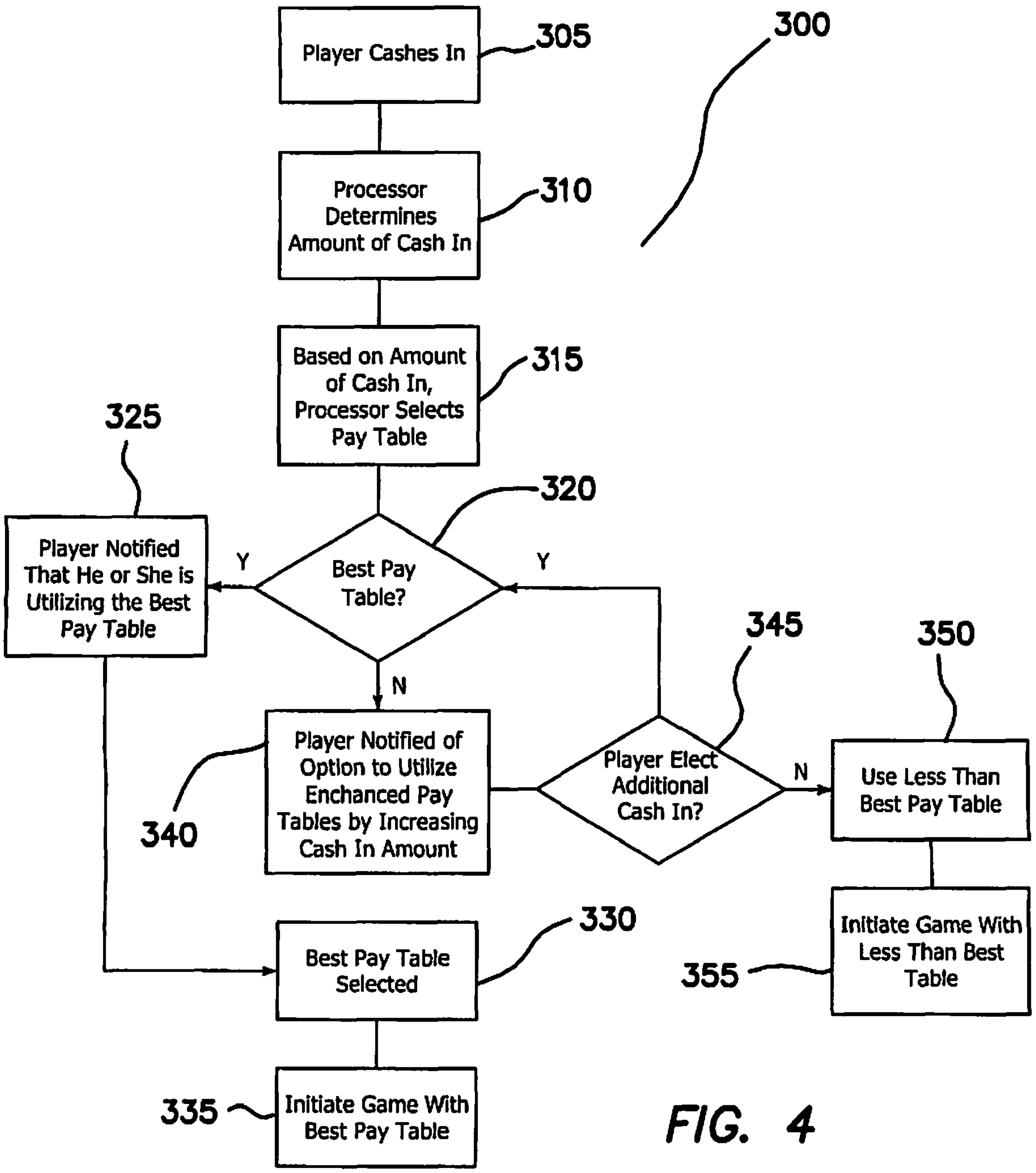
FIG. 4 illustrates a flow chart detailing a methodology associated with an embodiment of the present invention utilized with games of chance facilitated by electronic gaming machines.

FIG. 4 shows a flow chart 300 detailing one embodiment of the present as utilized with an electronic gaming machine or device. Initially, at 305, a player cashes in by inserting currency, coupons or tickets into the machine. At 310, the processor determines the amount of the cash-in and based on the amount of the cash in, at 315, selects a corresponding pay table. At 320, the processor determines if the selected pay table is the best table available for the player. The best pay table means a pay table providing the best overall payout percentage for the player. In other words, the best pay table gives the player the best chance to win. Optionally, at 325, the processor causes the player to receive notification that the best pay table will be in play. At 330, the best table is selected and then, at 335, the game is initiated with the best pay table. If at 320, the best pay table is not to be selected, at 340, the player is prompted to insert additional money to change the current pay table to one with better player payouts. The prompt indicates how much money must be input to utilize one or more pay tables having enhanced payouts over the current pay table. If, at 345, the player declines to insert any additional money, at 350, the current pay table is selected and, at 355, the game is initiated using the selected pay table. If, at 345, the player inserts additional money, a new pay table, which may be the best table or not, is selected, and, at 360, the game is initiated with the selected pay table. The selected pay table remains in effect until the player cashes out the gaming session.

Depending on the casino, players may be permitted to change the pay table as often as possible by cashing out and cashing in regularly or the system may include restrictions such that players may have limited access to enhanced pay tables. For example, players may only be permitted to utilize the enhanced pay tables once per 24 hour period or other pre-determined time period or may only have access one certain days of the week or via invitation. Casino player tracking systems or the like may be responsible for maintaining information related to the number of times that a player has utilized the enhanced payout schedules.

Figure 5:
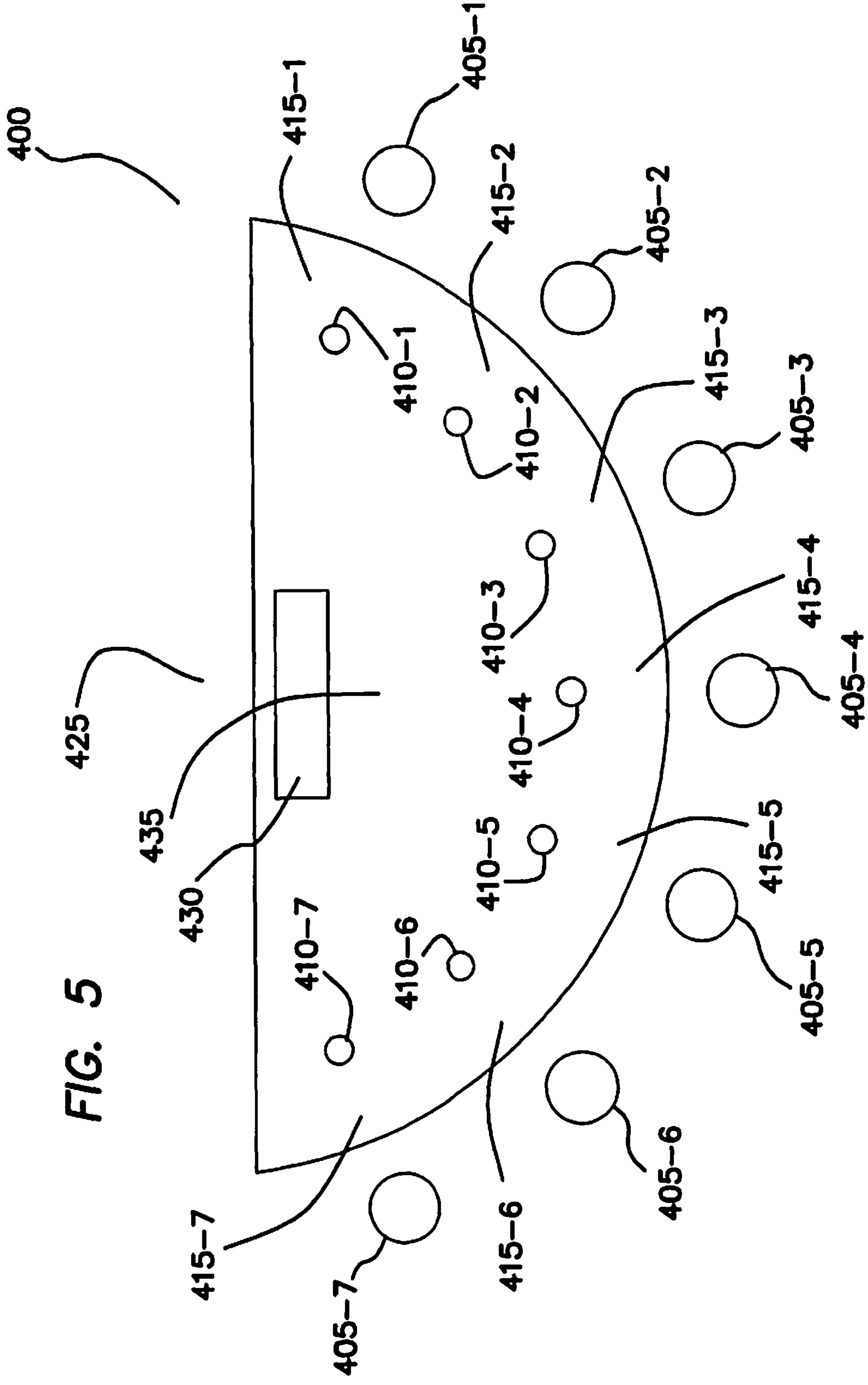
FIG. 5 illustrates a conventional blackjack layout.

FIG. 5 shows a blackjack layout 400. The blackjack layout 400 accommodates seven player positions 405-1 through 405-7, seven player wager areas 410-1 through 410-7, seven player card areas 415-1 through 415-7, a dealer position 425, chip rack 430 and dealer card area 435. The blackjack table supporting the blackjack layout 400 may also support a card shoe and card shuffler. With conventional blackjack using six to eight decks winning wagers typically pay even money and 3 to 2 on a two card 21 (i.e., "Blackjack"). Because of the prevalence of card counting, when one or two decks of cards is used to play blackjack, many casinos now lower the Blackjack payout to even money as well.

Figure 6:
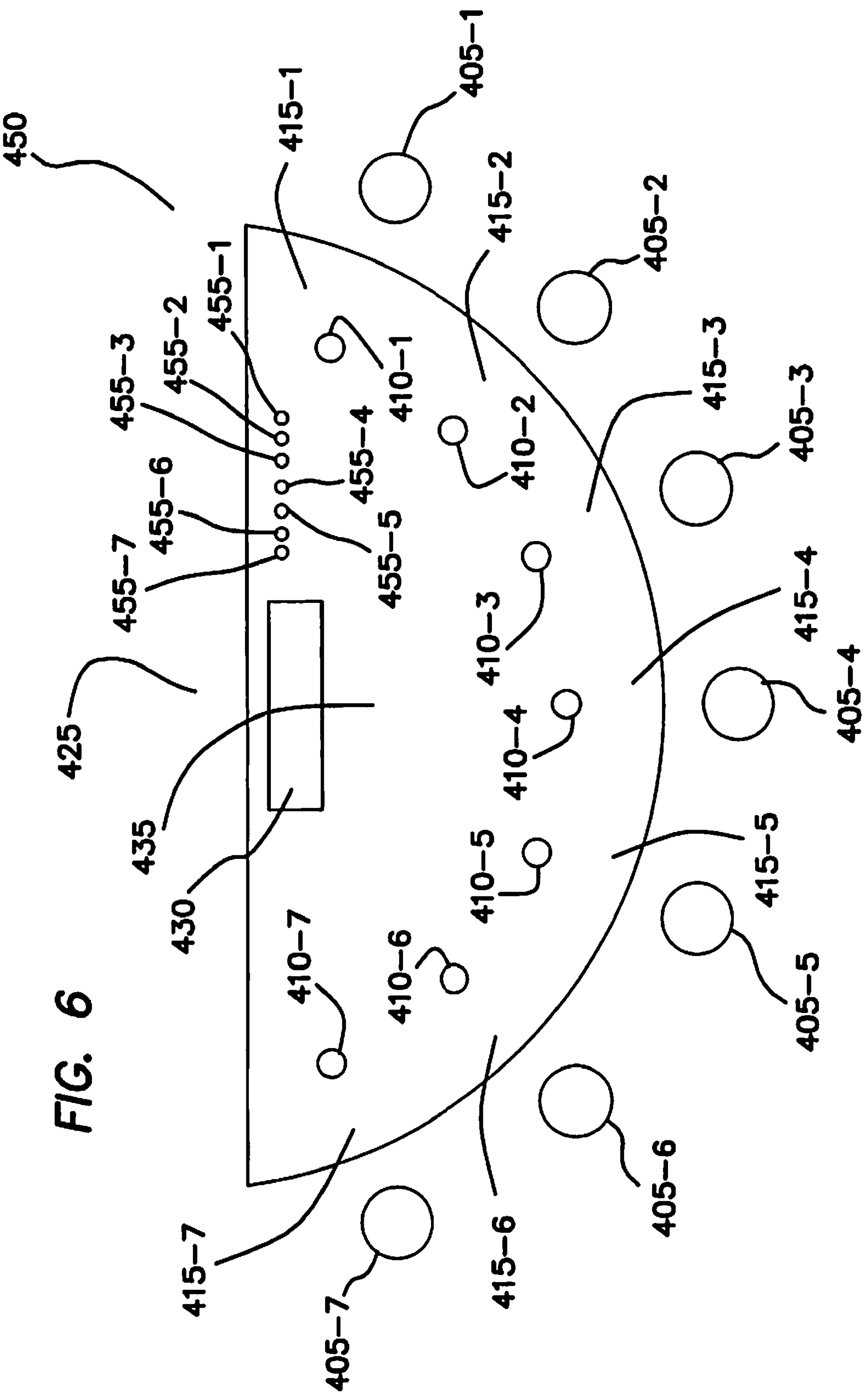
FIG. 6 illustrates an exemplary blackjack layout according to the embodiments of the present invention.

FIG. 6 shows a slightly modified blackjack layout 450 corresponding to the embodiments of the present invention. The modification to the layout 450 comprises player-corresponding circles 455 adjacent to the dealer position 425. The circles 455 provide a location for placement of payout indicators for each player position. Like the embodiment set forth above with respect to electronic gaming machines, the payouts are enhanced depending on the amount of money cashed in by each player. To track the payouts for each player, the dealer utilizes different payout chips indicative of a player's initial investment. So, with a two tiered payout structure a white chip may correspond to a conventional payout and a red chip may correspond to an enhanced payout. An electronic system may also be utilized to track which payouts correspond to which players. For example, most casinos have player tracking systems with monitors installed at most live games of chance which can be used as a reference by the dealer to maintain payout schedules for each player. With blackjack, for example, a larger initial investment, may result in a 3.5 to 1 payout on Blackjacks rather than 3 to 2 or even money. Other payouts, including payouts corresponding to even money wagers, double downs and split hands, may also be enhanced. While not shown, the unique pay tables may be printed on the layout so that players are able to immediately determine the pay table they want to play.

While blackjack is detailed above, other live table games, including Let It Ride and Caribbean Stud Poker, which have pay tables dedicated to low probability poker hands, may also utilize the embodiments of the present invention.

Figures 2E, 7:
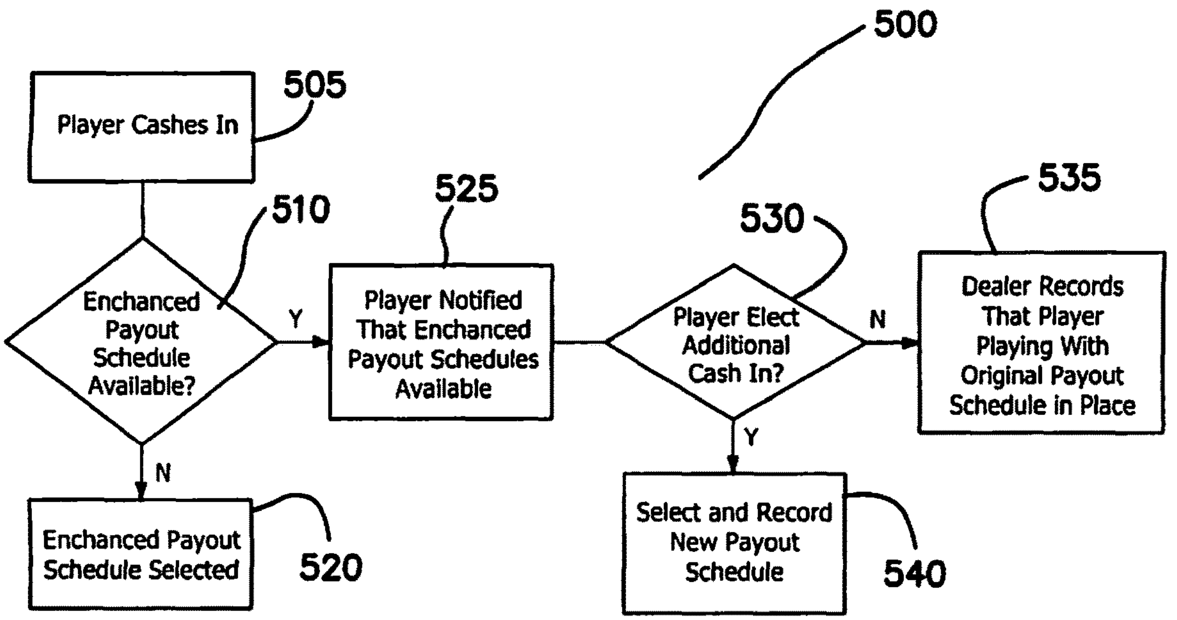

FIG. 7 shows a flow chart 500 detailing a live embodiment of the present invention. At 505, a player cashes in an amount of money. At 510, a dealer determines whether the amount cashed in entitles the player to an enhanced payout schedule. If the player has cashed-in enough to qualify for the best available payout schedule, at 520, the dealer selects and identifies, marks or otherwise maintains a record that the best payouts are being used for the player. If not, at 525, the dealer notifies the player that by cashing in more money the player will be entitled to a better payout schedule. If, at 530, the player declines to cash in additional money, at 535, the dealer selects and identifies, marks or otherwise maintains a record that the player is entitled to conventional payouts or other payouts less than the best payouts available. If, at 530, the player elects to cash in additional money, at 540, the dealer identifies, marks or otherwise maintains a record of the payout schedule to which the player is entitled.

Those skilled in the art will recognize that any game of chance, including, but not limited to craps, blackjack, keno, bingo and roulette, whether facilitated by electronic gaming machines or devices, or live games, may benefit from the embodiments of the present invention. Moreover, any slot machine can be configured to facilitate the embodiments of the present invention. The embodiments of the present invention are also suitable for online systems and server-based systems offering games of chance. With online and/or server-based systems, players access the games of chance from a remote server using a player terminal (dumb or smart), personal computer or hand-held device (e.g., cellular telephone or PDA) but the overall purpose of the embodiments of the present invention remains the same: to provide players with enhanced payout schedules for putting more money into the game.

The embodiments of the present invention benefit the player by providing enhanced payouts and provide the house or casino with a greater likelihood of winning at a higher rate because players have more money invested in the game. Even though players do not have to play all of the money initially invested or cashed in, players are more likely to play money already cashed in over money in their pockets or awaiting at the ATM or cashier.

In another embodiment of the present invention, other bonuses or awards are manipulated or enhanced based on the amount of the initial investment. Most casino resorts now provide players with comps and other amenities based on how, and how much, players play games of chance. In most instances, players accumulate player points which can be redeemed for casino amenities (e.g., food, rooms, etc.). Accordingly, with the embodiments of the present invention, such comps and other amenities may be enhanced based on the player's initial investment. For example, a player may receive double player points based on an initial investment amount exceeding a pre-established threshold amount and triple player points responsive to a larger initial investment. Comps, like free or reduced rate rooms, may also be enhanced based on the initial investment amount. Such enhancements are added to conventional awards or comps the player would conventionally receive.

In one embodiment of the present invention, if players play and lose the entire amount invested, they receive a bonus or award. In one embodiment, the bonus comprises free plays of the machine wherein the number of free plays is based on the amount of money initially invested. In other words, more free plays are provided responsive to a larger initial investment. Indeed, initial investments below a threshold amount (e.g., $50) may not be entitled to any bonus. In another embodiment, players are offered the opportunity to continue playing the gaming machine using the enhanced pay table for any additional monies deposited even if the additional amount deposited is less than the threshold amount for utilizing said enhanced pay table.

In one embodiment, we have a method of conducting a game of chance comprising: accepting an initial investment from one or more players to participate in a game of chance; and if the game of chance is facilitated by an electronic gaming machine, crediting a player on the machine an amount equivalent to the initial investment; while if the game of chance is a live game of chance, providing players with gaming chips equivalent to the initial investment; and then selecting a payout schedule from a plurality of payout schedules, wherein the payout schedules forming the plurality of payout schedules successively provide one or more increased payouts over a conventional payout schedule for the game of chance, as an amount of the initial investment increases.

In one embodiment, the increase in payout can be done using a formula or table or list or database or curve or equation or function. In one embodiment, the increase is in average, or total, or for each instance, or weighted average, or every other instance, or periodic, or randomly selected instance, or every n-th instance in the sequence of events (with n as an integer, equal or bigger than 1), e.g. every $4^{th}$ instance or occurrences, or any predetermined pattern of instance or occurrences. In one embodiment, the increase or decrease is based on the factors mentioned here in this disclosure. In one embodiment, the increase is based on an event, such as an event from outside or inside the machine or casino, as a trigger. In one embodiment, the increase is based on the type or class of an event. In one embodiment, the trigger is based on time or period of time or date or hour or calendar or user related, e.g. user's birth date, e.g. captured on the smart or magnetic card or chip or dangle or memory card or storage stick or other devices for such purposes, or e.g. Christmas day, or $4^{th}$ of July, or $3^{rd}$ Tuesday of each month, or any long weekend, or any Federal or state holiday.

In one embodiment, this period can be extended with addition of more money by the user, using a table or formula, or randomly result oriented, or other events, or other methods, such as coupon, authorization from casino, bonus awards, favorite customer, VIP customer, customer with repeat business, or calendar time or period or date, or user-based event or date, or customized event or date, or trigger event or condition, or logical AND or OR or XOR or other operations on conditions or parameters or events or triggers, e.g.:

If A happens AND B happens, then extend the period for e.g. 2 more days, or 2 more sessions, or 4 more weeks, or 1 more season, or the like.

In one embodiment, the outcome is based on random or semi-random number generator, to produce the outcome from a range of values, but selected randomly from such range, or mapped to such range using a predetermined formula or instruction or method or routine or table or list or function. Or, it can be based on some range of probability which determines the outcome values based on said probability value, e.g. as a function or table or relationship.

Another example is when we have a range of probabilities, e.g. 0.1 to 0.3, and we randomly select one value, e.g. 0.25, from such range, which we can use as a basis for selection of values from a possible range of discrete or continuous outcome values in dollar amount (or bonus objects or selections, e.g. free one night stay in the hotel, or free lunch for 2 people, selected from a list), e.g.:

{1 dollar, 2 dollars, 3 dollars, . . . , 100 dollars}, as discrete set, or

[1, . . . , 100] dollars, as continuous set, or real number axis for values for dollar amounts, or selection of tables 1, 2, 3, 4, or 5, for payment schedules, for which each has different outcomes for dollar amount in the table.

In one example, one assigns the value of 0.25 for the probability value in the example above to table number 2, as an example. Or, in another example, all tables 1 through 5 have the same probability values, as uniform, for being selected, in example above, which corresponds to 0.2 probability value for selection of each table, randomly, which corresponds to different outcomes for the user for winning amounts, or winning combinations, e.g. for cards in different games, e.g. poker.

Some examples which were covered by our previous disclosures (our parent cases) are shown below. We have a method of conducting a game of chance on an electronic gaming machine comprising a display and a memory unit, and in communication with a processor, with said method comprising: said processor accepting an initial investment from a player to participate in said game of chance on said electronic gaming machine; said processor crediting said player's account on said electronic gaming machine an amount equivalent to said initial investment; said processor receiving a first threshold value; receiving a plurality of payout schedules from said memory unit; and if said initial investment is higher than said first threshold value, then said processor assigning a first payout schedule from said plurality of payout schedules to said player's account on said electronic gaming machine; wherein said first payout schedule has a higher payout than that of a second payout schedule among said plurality of payout schedules; then said processor receiving a pre-determined time instance (or time period or date or day or event or threshold or trigger); said processor receiving a threshold number of times; said processor counting a number of times said first payout schedule is used for said player's account on said electronic gaming machine; and if said pre-determined time instance is not reached, and said number of times said first payout schedule is used for said player's account on said electronic gaming machine is below said threshold number of times, then said processor distributing a winning outcome to said player's account according to payout defined in said first payout schedule; and if said pre-determined time instance is reached, or said number of times said first payout schedule is used for said player's account on said electronic gaming machine is equal or above said threshold number of times, then said processor distributing said winning outcome to said player's account according to payout defined in said second payout schedule.

One embodiment is that when we try to increase a slot players "time on machine", as an example. In order to do that, one would need to be given an incentive/reason or a "bonus" for playing beyond what they normally would, time-wise and/or dollar-wise. A player would initially deposit an amount of money into a slot machine to begin a gaming session. He would then play for a while, and stop playing usually when they have lost all or a portion of that money to the machine. Now, if the player is offered the following option or rule, he/she may stay and play on the machine longer, and may even invest or spend more money to do so:

If the player deposits, for example, $100.00 into the machine, he would be given $100 credit at the machine. He could then begin to play and either start to win or lose. If the player's credit begins to diminish, then at every predetermined increment (in this example $20), he would be given a chance to win his money back, back to 100 dollars (or more than 100 dollars, in one embodiment) in the form of a "bonus round" and so on. That is, for every 20 dollar losing to the machine, or for every 20 dollar subtraction from the original value, e.g. at $80, 60, 40 levels or thresholds, and so on, this opportunity comes up (and has a specific probability of winning and amount of winning corresponding to that).

One embodiment is, for example, the player puts in $100 into the machine, and when/if he is down to $80, he will get a bonus round and be given a chance to win back all, a portion of, or maybe, even more than the $20 that he has so far lost, e.g. 30 or 40 dollars more than original value of 100 dollars, i.e., up to 130 or 140 dollars, in different embodiments. Later, as he plays on, if his credit in machine goes down to $60, he will again be given a chance in a bonus round to win back all, a portion of, or maybe, even more than the $40 he has lost of his original cash deposited in the machine. This could happen at every $20 increment to the last dollar, meaning that when player's credit goes to $0, he would yet get another chance in a free bonus round to win back all of, a portion of, or even more than the $100 that he has lost so far, e.g. up to or exactly 130 dollars.

In one embodiment, the increments are uniform, as shown above. In one embodiment, the increments are non-uniform, e.g. steps of losing for 10 dollars in between 20 dollar steps, or steps of gaining back 20 and 30 dollars mixed, in a non-uniform manner, in a predetermined fashion or randomly selected from a pattern of steps. The pattern of steps can be e.g.:

10, 20, 25, 20, 30 dollars, as a series of steps or sequence, for losing money, for thresholds, or steps for gaining money back, starting from the original value, or starting from current value at a given point of time.

In one embodiment, the increments chosen randomly, can be, e.g., chosen from values 10, 20, 25, 30, and 35, e.g.:

10, 20, 30, 20, 30, as a sequence, for steps, for losing, or for gaining steps, e.g. using the same sequence or a different sequence, in different embodiments.

In one embodiment, all components can vary from machine to machine, and/or from property (gaming facility) to property. In one embodiment, all machines and corresponding values can be accumulated for a user, or averaged, or for multiple users, or done per machine, or per casino, or per user's friends, or per club, or per group, or per social setting, or across the machines for the same game, or per user's family circle, to be thresholded against or compared to, or for the purpose of selecting a proper table for pay out or awards for winnings or the probability of success or amount of wins, per the categories mentioned above, e.g., per group. For example, once the group members, collectively or individually (as different embodiments), reach a threshold amount of win, e.g. 1000 dollars, the machine or machines or casino keeps track of such total or average win, to terminate the use of enhanced-win mode, and switch to other, less favorable, tables or win schedules, for less total or average wins (as different embodiments).

In one embodiment, the tables e.g. 1 through 5 are selected randomly, or based on some trigger or rules or rules engine, which is stored in a processor, microprocessor, table, memory, or database, e.g. based on some or multiple condition(s), e.g. If-Then-Else rules. For example:

IF A happens (e.g. a threshold is reached for dollar value or time), THEN switch to table 3, instead of table 4, for payments, for a period of 1 day, or until we reach another dollar value goal(s) or thresholds.

ELSE select table 2, or average the winning so far, or . . . .

In one embodiment, the higher average value means that sometimes it may be higher outcome, and sometimes lower value outcome, but overall, in average or weighted average, the outcome is higher in value, statistically or for a period of time or probability-wise, e.g. for a winning of a user or users, or per casino or group of people or machine or group of machines. In one embodiment, a machine is independently averaged and monitored, for its own probability, alone. In one embodiment, a machine is collectively aggregated or grouped together with other people or machines for its performance and probability or winning results. Thus, aggregated probability distribution(s) of multiple actors, machines, or elements come in, instead of an individual probability distribution.

In one embodiment, the user is given a notice or alarm about the fact that there is an opportunity to use enhanced tables or table, in various steps of enhancements, e.g. 4 different enhancement tables, each requiring e.g. higher initial deposit in the machine, or higher initial deposits or collective contributions into the machine, so that the user can take advantage of such schemes, as his options. In one embodiment, the user is given notice about thresholds and gains, and corresponding jumps, gain back opportunities, or winnings, with proper rules and description of steps in each direction, i.e., for losing and gaining. In one embodiment, the user is given notice by/on screen of machine, mobile device, texting, email, printout, voice, sound, music, notes, icons, display numbers and symbols, or the like.

Figure 8:
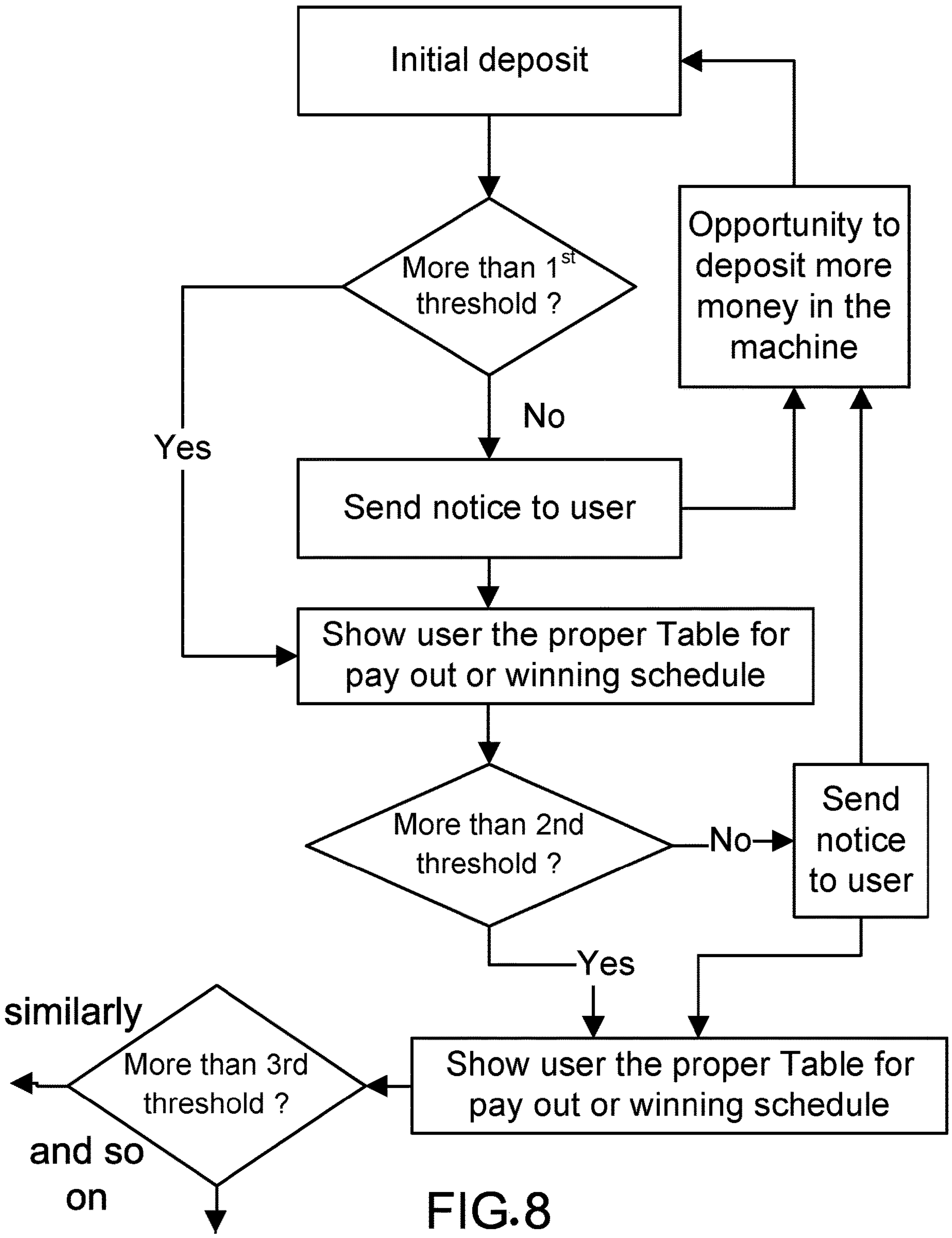
FIG. 8 is an embodiment of usage of multiple thresholds for selection of proper table for winning determination.
Figure 9:
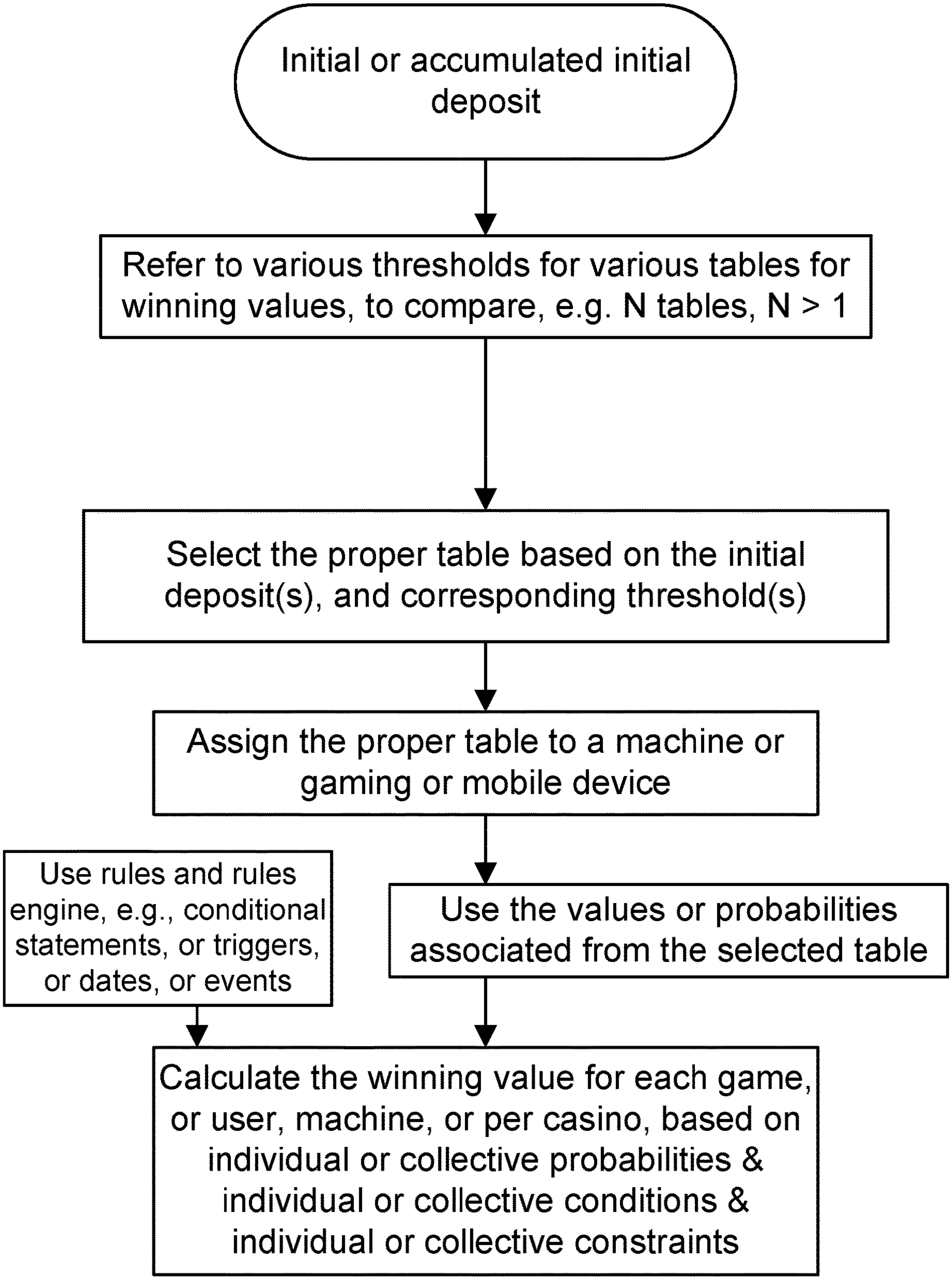
FIG. 9 is an embodiment of usage of multiple thresholds for selection of proper table for winning determination, along with usage of other parameters.
Figure 10:
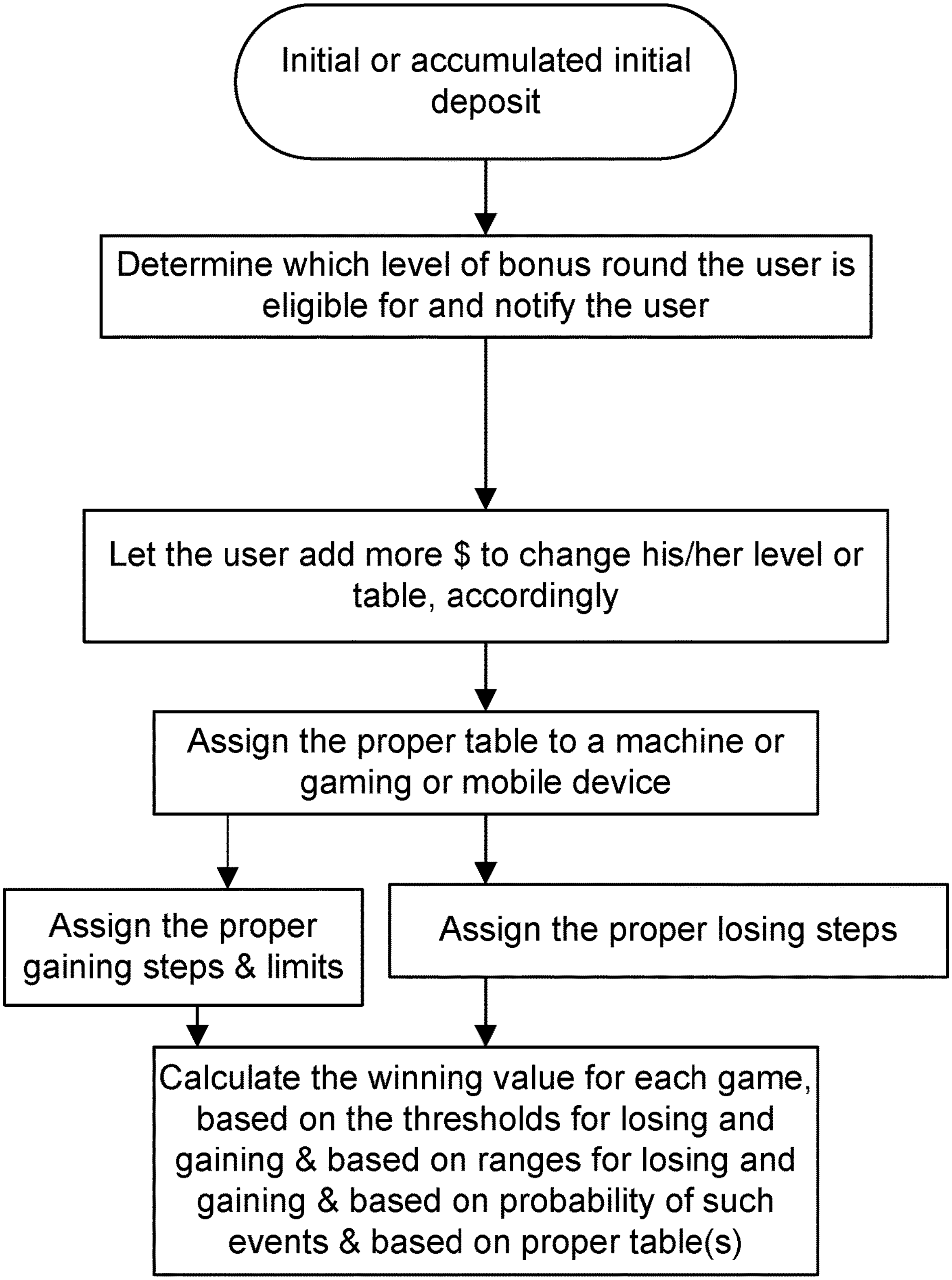
FIG. 10 is an embodiment for selection of proper table for winning determination, along with assigning proper steps for losing part and gaining part.
Figure 11:
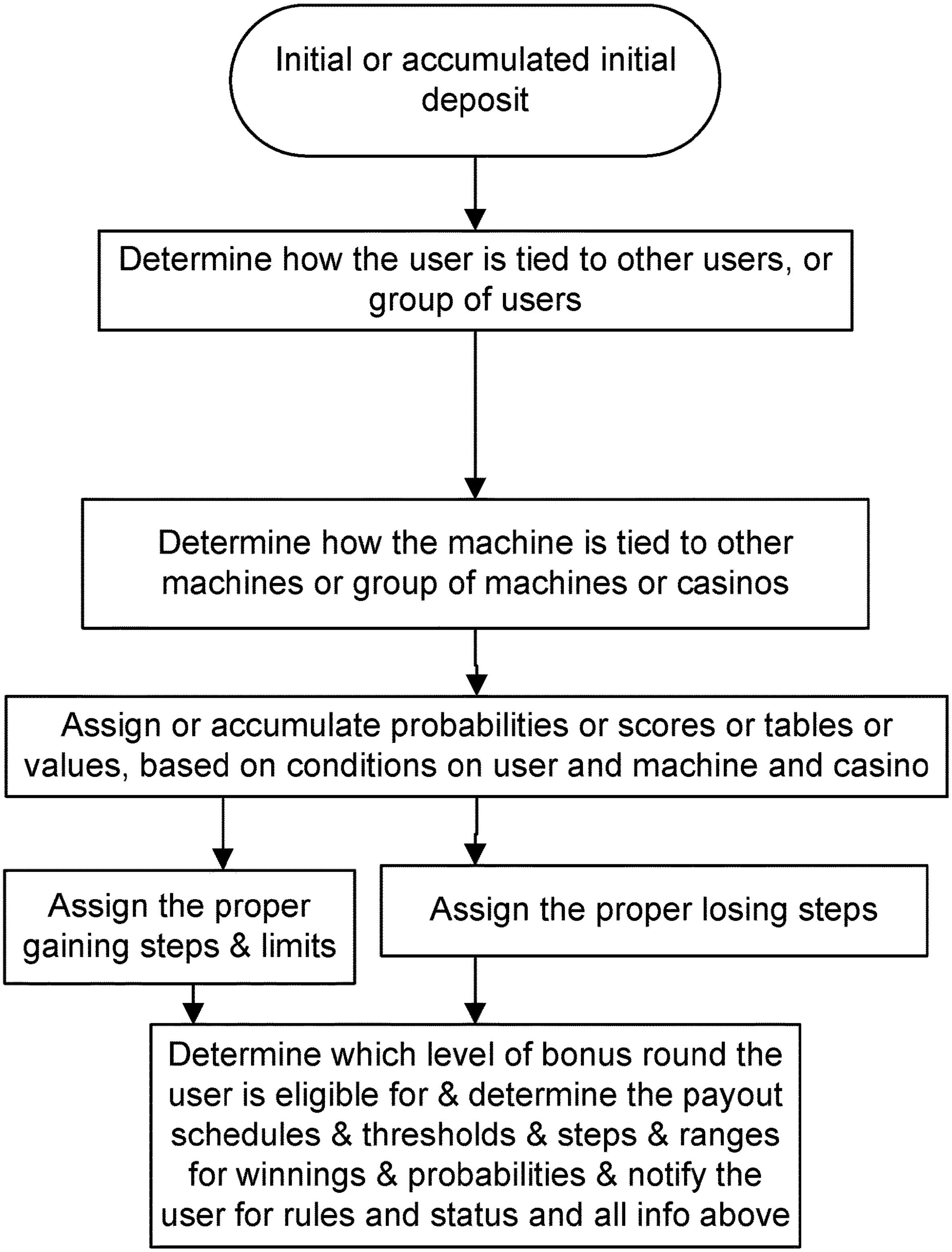
FIG. 11 is an embodiment for winning determination, along with combining users and machines, e.g. for probability and statistical analysis.
Figure 12:
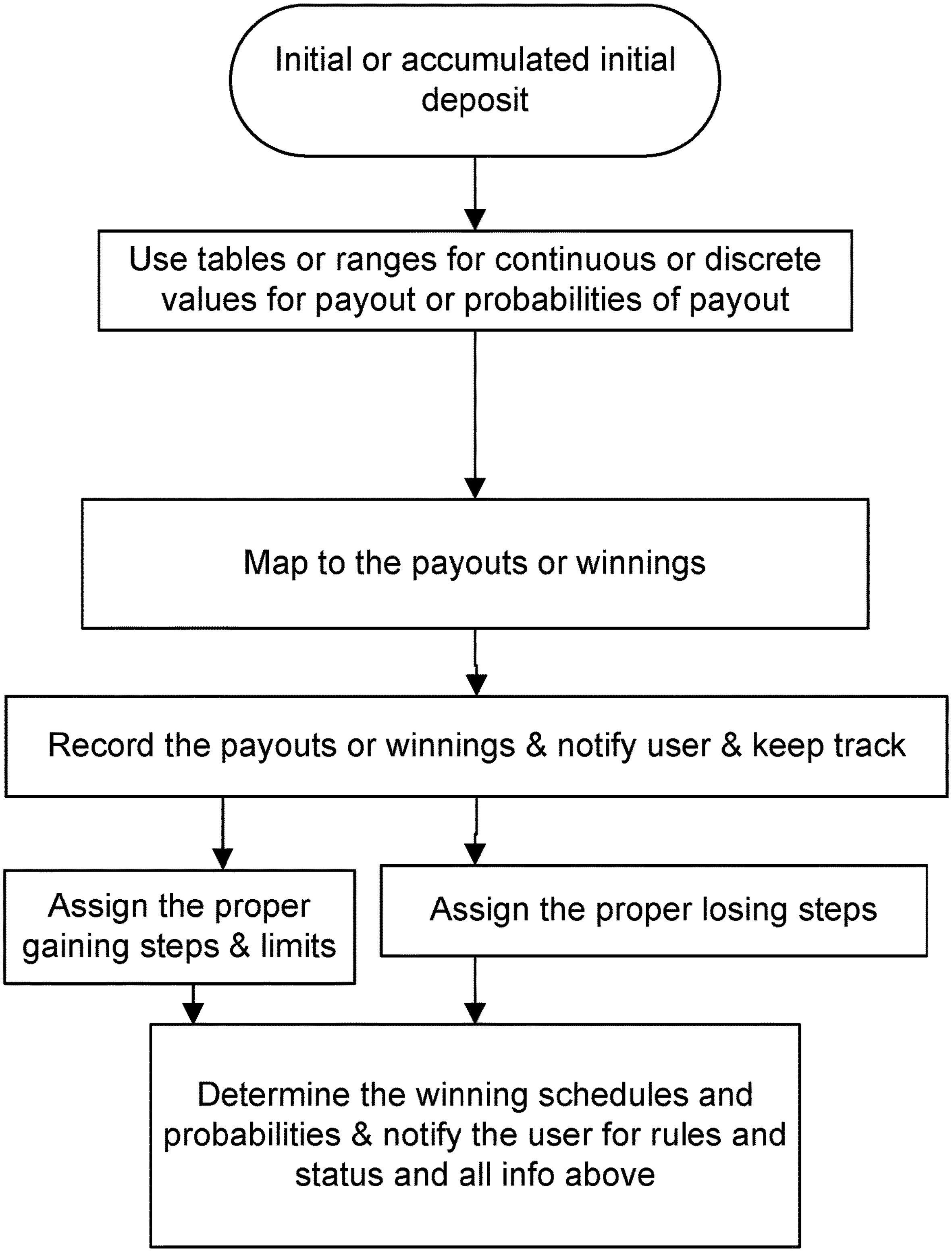
FIG. 12 is an embodiment for winning determination, along with continuous or discrete values or parameters, e.g. for probability and statistical data, for payout.

FIG. 8 is an embodiment of usage of multiple thresholds for selection of proper table for winning determination. FIG. 9 is an embodiment of usage of multiple thresholds for selection of proper table for winning determination, along with usage of other parameters. FIG. 10 is an embodiment for selection of proper table for winning determination, along with assigning proper steps for losing part and gaining part. FIG. 11 is an embodiment for winning determination, along with combining users and machines, e.g. for probability and statistical analysis. FIG. 12 is an embodiment for winning determination, along with continuous or discrete values or parameters, e.g. for probability and statistical data, for payout.

Figure 13:
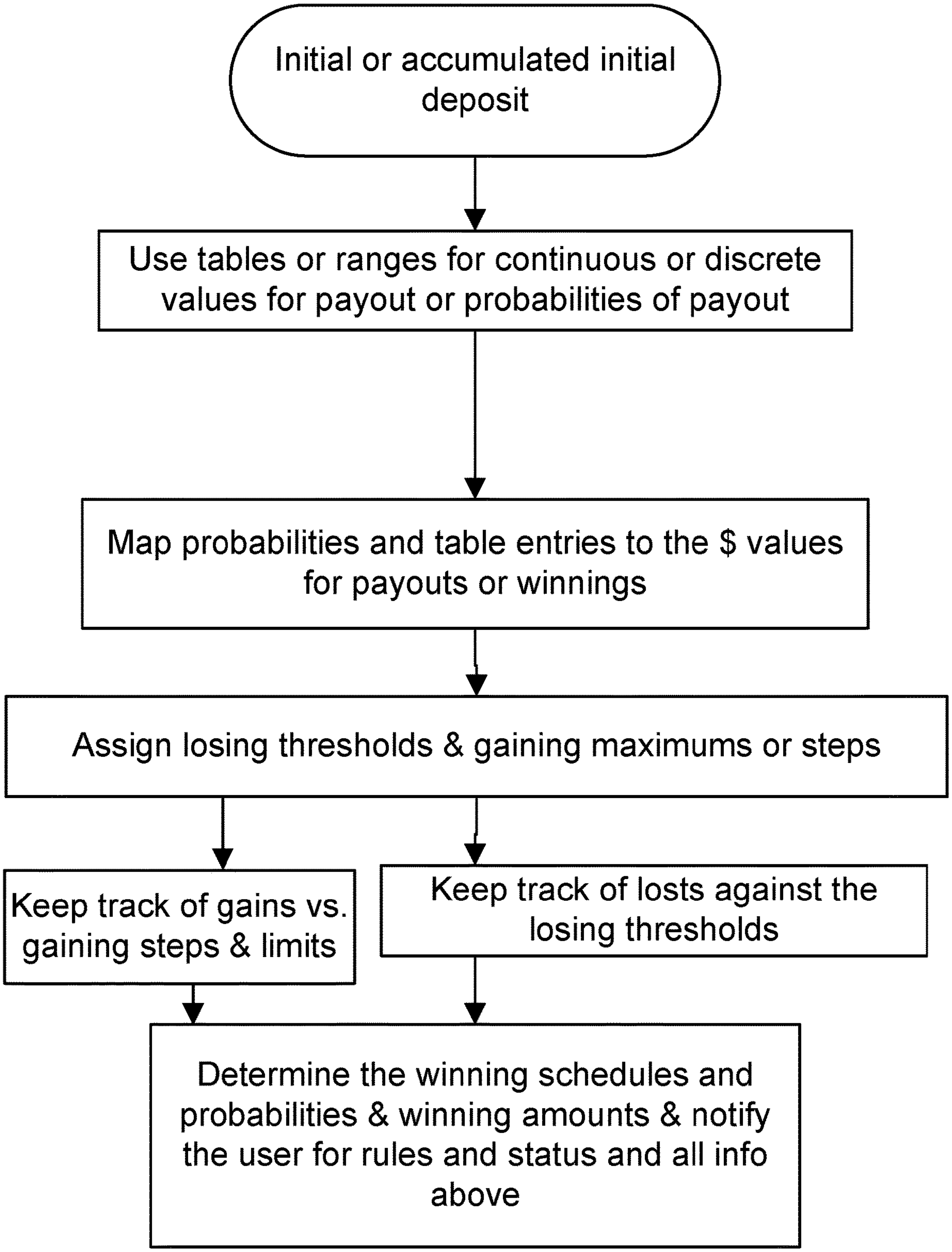
FIG. 13 is an embodiment for winning determination, along with tracking gains and losses, e.g. to choose or switch to the right table, or find the proper values.
Figure 14:
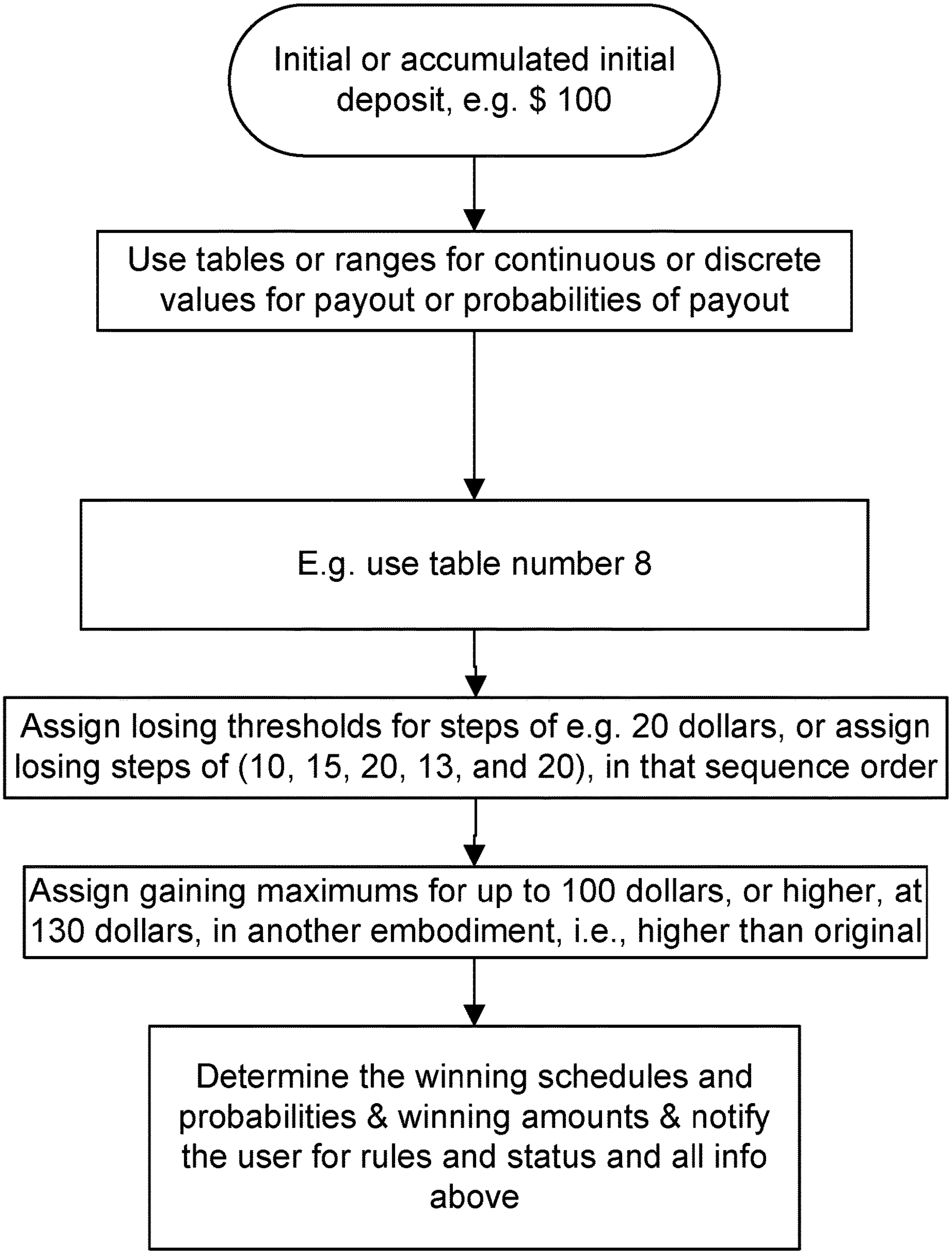
FIG. 14 is an embodiment for winning determination, along with assigning various values for gains and losses, for maximums or steps or thresholds.
Figure 15:
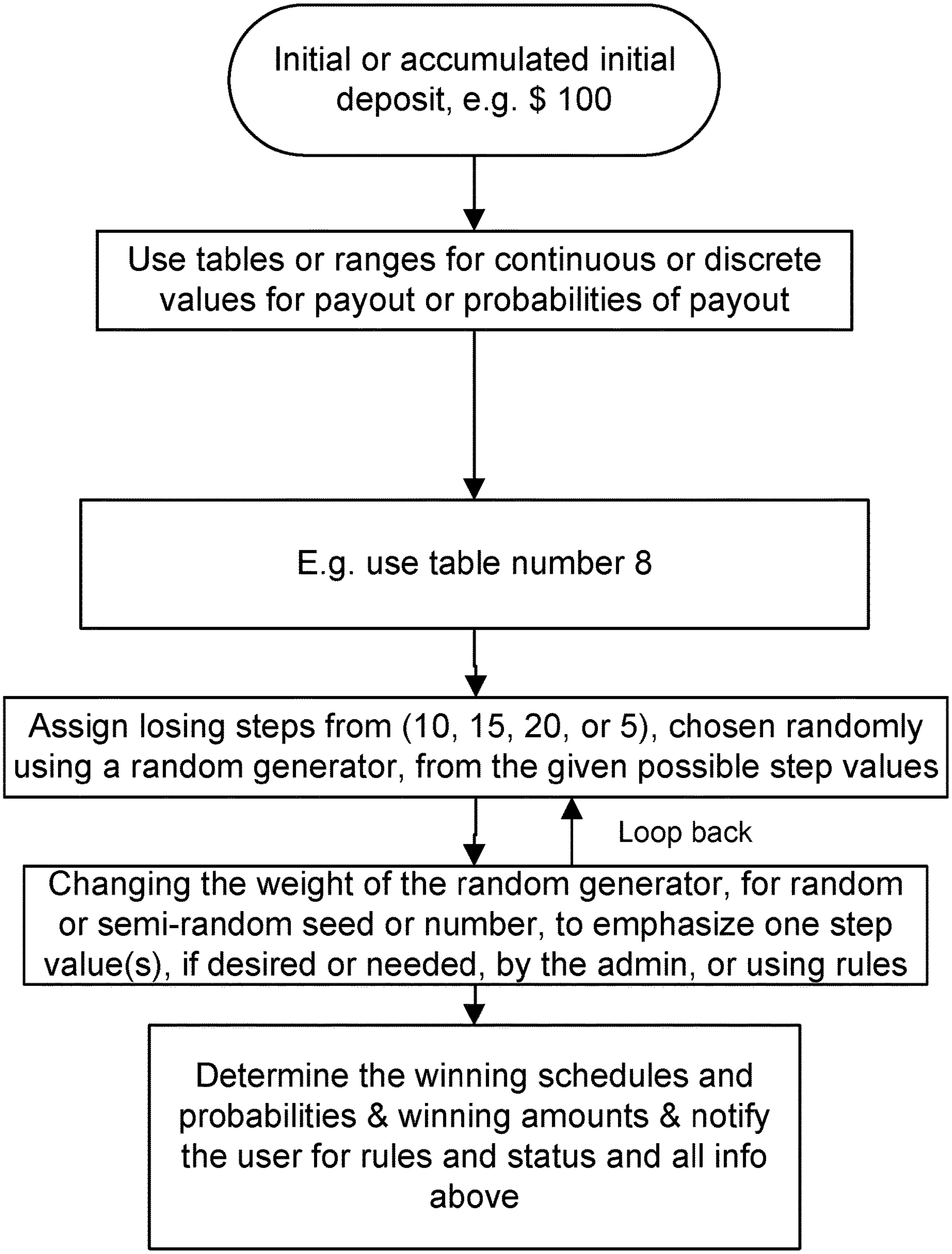
FIG. 15 is an embodiment for winning determination, e.g. along with using a random generator, e.g. for assigning various values for gains and/or losses, for maximums or steps or thresholds.
Figure 16:
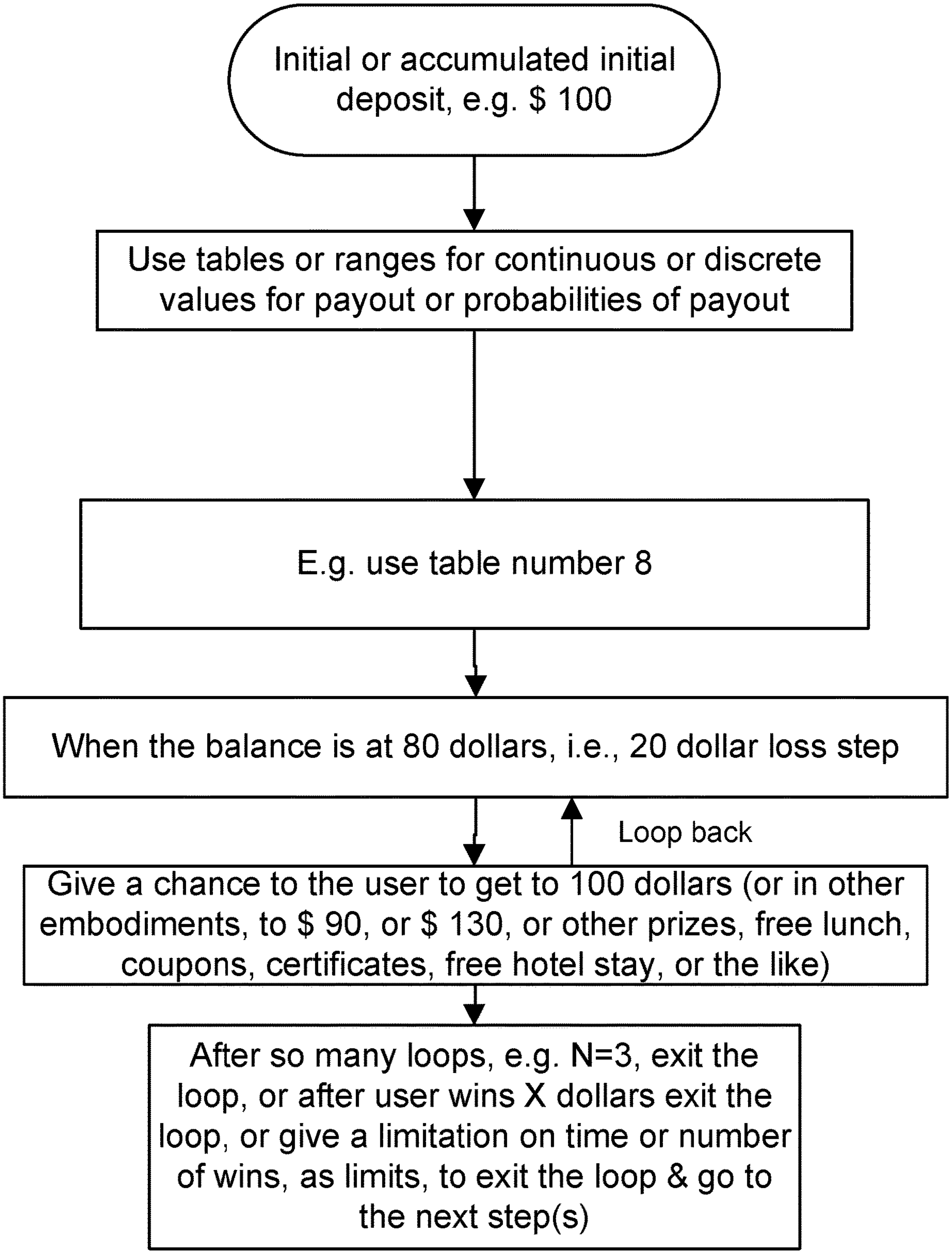
FIG. 16 is an embodiment for winning determination, along with a chance to win some or all or more than original input value, with a loop, and exit condition for the loop, and continuous execution of such routine (plus giving a notice to the user, for the user adding to input value, if desired).

FIG. 13 is an embodiment for winning determination, along with tracking gains and losses, e.g. to choose or switch to the right table, or find the proper values. FIG. 14 is an embodiment for winning determination, along with assigning various values for gains and losses, for maximums or steps or thresholds. FIG. 15 is an embodiment for winning determination, e.g. along with using a random generator, e.g. for assigning various values for gains and/or losses, for maximums or steps or thresholds. FIG. 16 is an embodiment for winning determination, along with a chance to win some or all or more than original input value, with a loop, and exit condition for the loop, and continuous execution of such routine (plus giving a notice to the user, for the user adding to input value, if desired).

Figure 17:
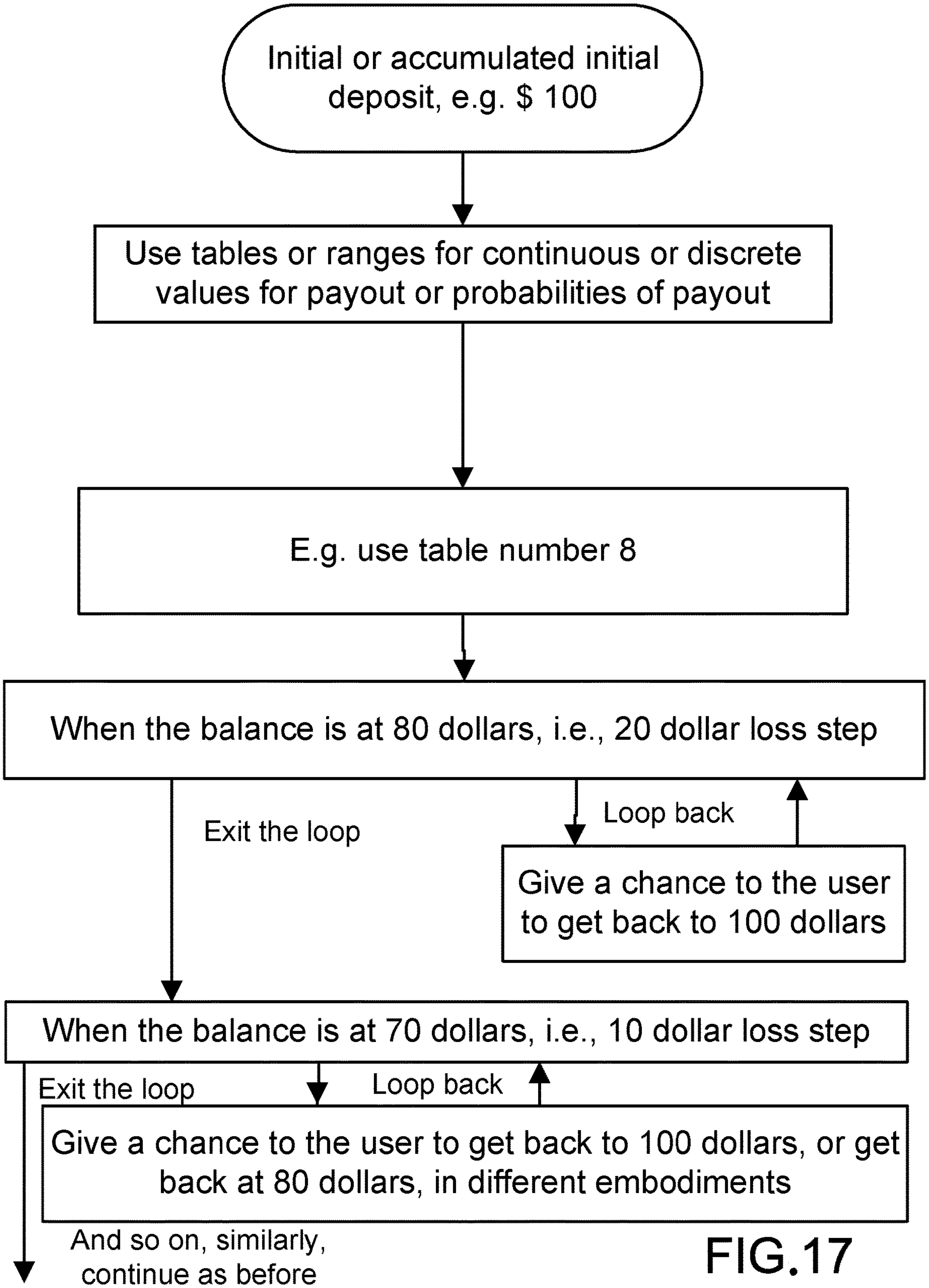
FIG. 17 is an embodiment for winning determination, along with a chance to win some or all or more than original input value, with a loop, and exit condition for the loop, and continuous execution of such routine (e.g. in different steps, going down, with various step sizes, in general, in one embodiment).
Figure 18:
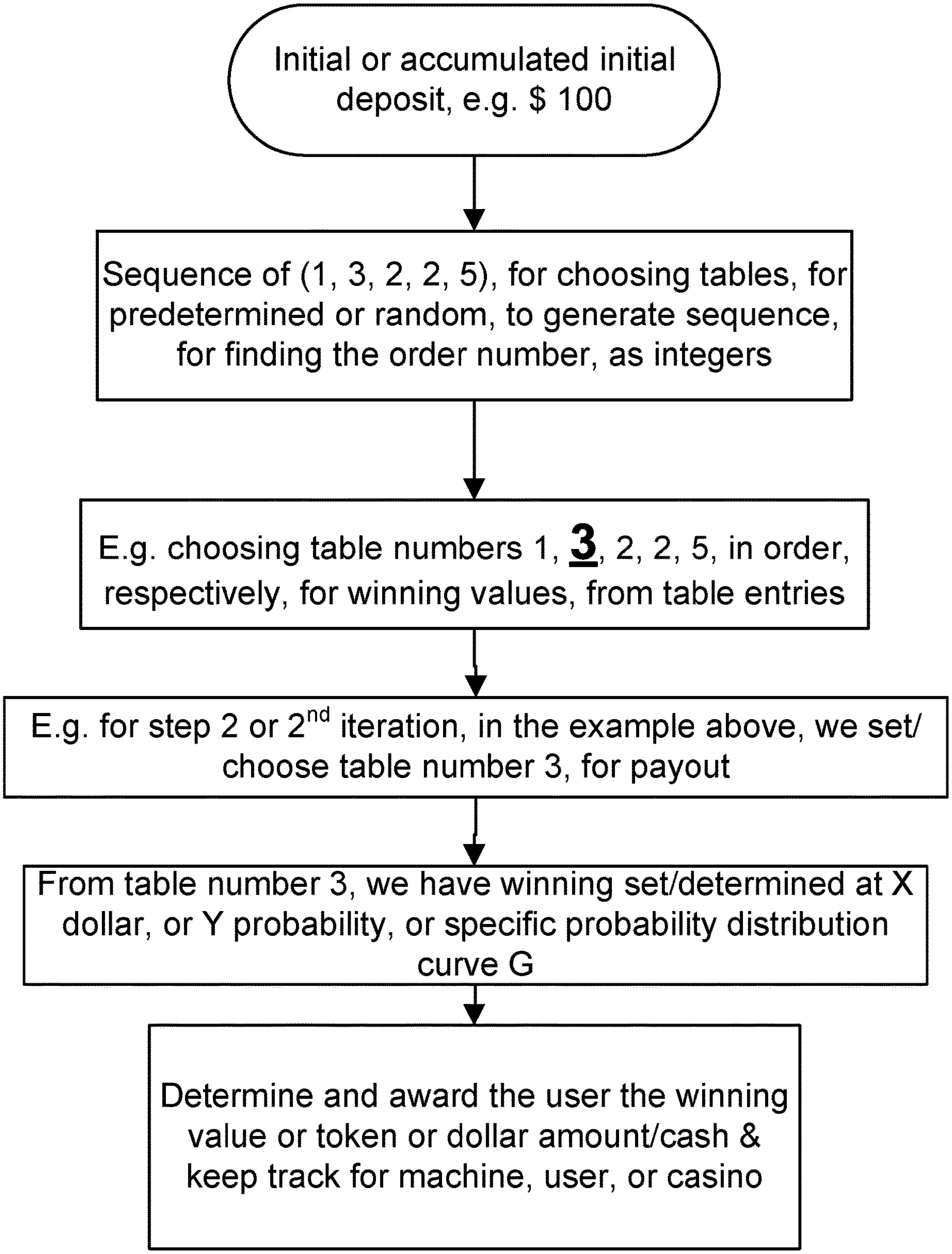
FIG. 18 is an embodiment for winning determination, along with choosing a table from a sequence of numbers indicating the table number.
Figure 19:
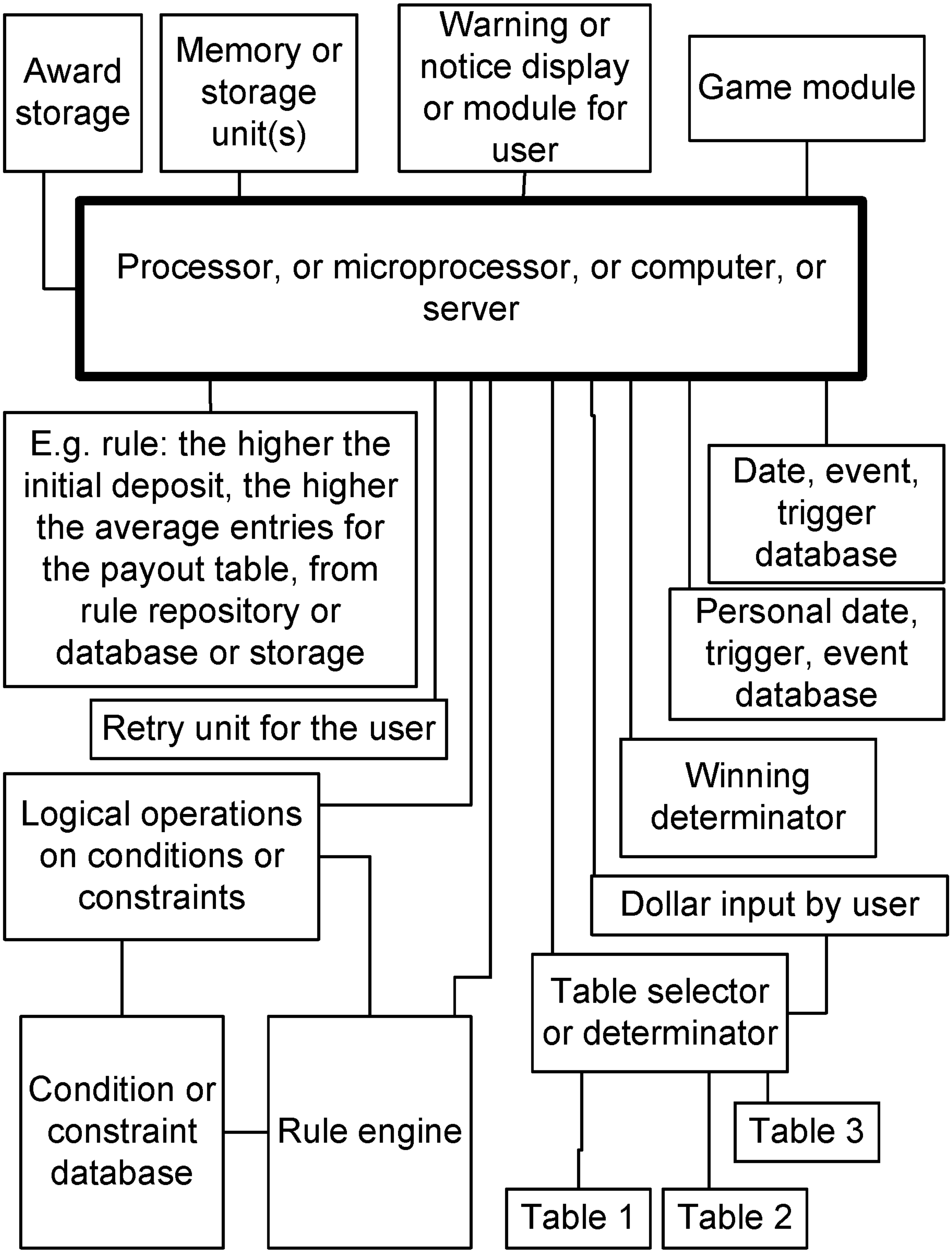
FIG. 19 is an embodiment for winning determination system, along with various components, for operation of various embodiments.
Figure 20:
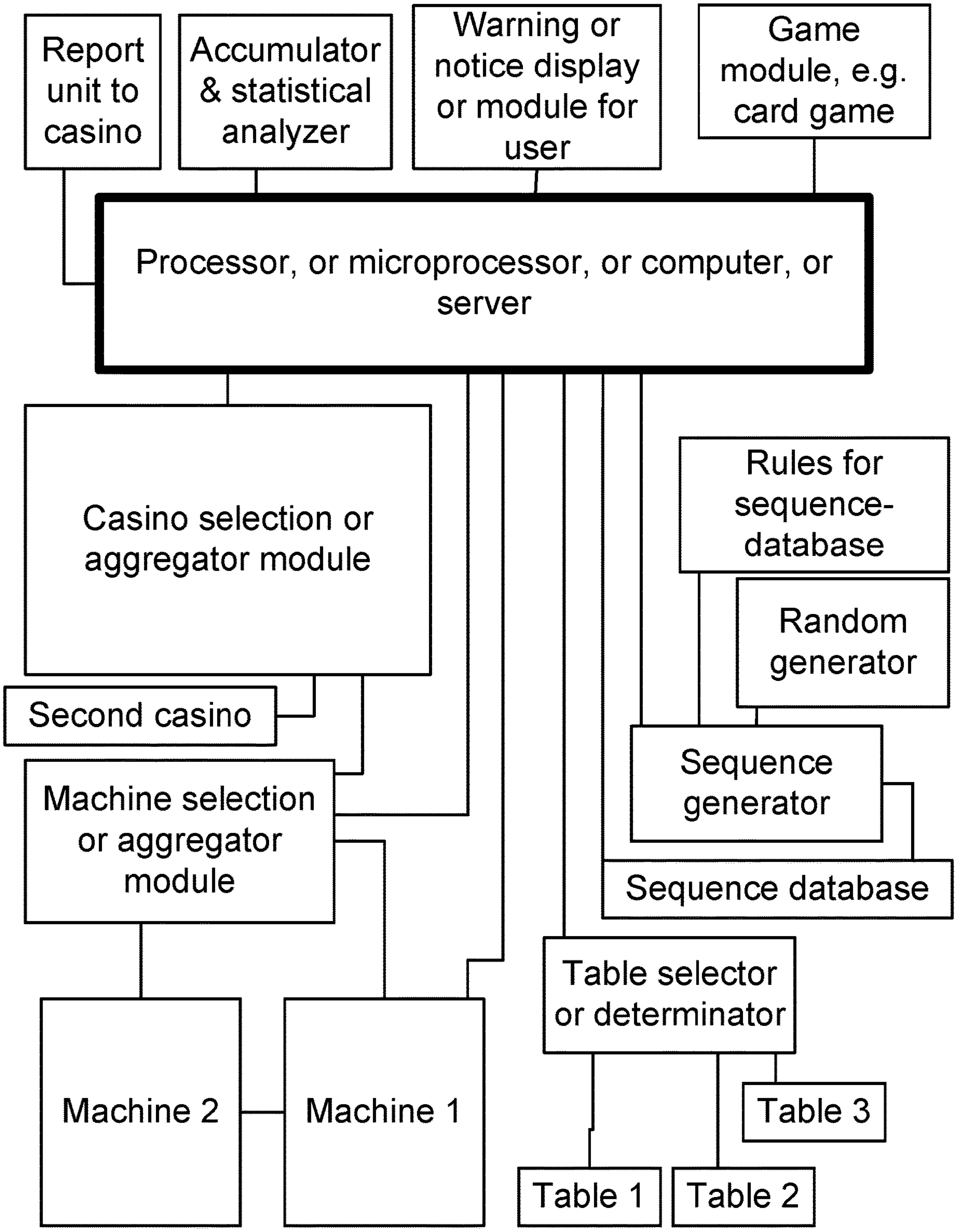
FIG. 20 is an embodiment for winning determination system, along with various components, for operation of various embodiments.

FIG. 17 is an embodiment for winning determination, along with a chance to win some or all or more than original input value, with a loop, and exit condition for the loop, and continuous execution of such routine (e.g. in different steps, going down, with various step sizes, in general, in one embodiment). FIG. 18 is an embodiment for winning determination, along with choosing a table from a sequence of numbers indicating the table number. FIG. 19 is an embodiment for winning determination system, along with various components, for operation of various embodiments. FIG. 20 is an embodiment for winning determination system, along with various components, for operation of various embodiments.

In one example, we have a method of conducting a game of chance on an electronic gaming machine comprising a display and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold value; receiving a plurality of payout schedules from said memory unit; and if said initial investment is higher than said first threshold value, then said processor assigning a first payout schedule from said plurality of payout schedules to said player's account on said electronic gaming machine; wherein said first payout schedule has a higher payout than that of a second payout schedule among said plurality of payout schedules; then receiving a losing step value from a storage unit; said processor calculating a first losing threshold by subtracting said losing step value from said initial investment; and if said player's account balance on said electronic gaming machine is below said first losing threshold, then providing said player a first bonus round, based on said first payout schedule, up to a value equal to said initial investment.

In other examples, we have a method which comprises one or more of the following steps:

said processor receiving a second threshold value;

or assigning a third payout schedule from said plurality of payout schedules to said player's account on said electronic gaming machine;

or receiving a second losing step value from said storage unit;

or calculating a second losing threshold; or combining winning values for various people in a social group or family plan;

or combining probability of winning values for various people in a social group or family plan;

or combining probability distribution curves for winning events for various people in a social group or family plan;

or capping winning values for various people in a social group or family plan, against a maximum winning threshold value;

or combining winning values for various machines in one or more casinos;

or combining probability of winning values for various machines in one or more casinos;

or combining probability distribution curves for winning events for various machines in one or more casinos;

or capping winning values for various machines in one or more casinos, against a maximum winning threshold value;

or using a random generator to select a table or schedule from said plurality of payout schedules;

or using a random generator to select a probability value for winning event;

or using a random generator to select a probability distribution curve for value for winning event;

or selecting a sequence of values for losing steps;

or selecting a sequence of values for gaining steps;

or using a conditional statement for rules engine or module;

or awarding non-cash prizes or merchandise.

Any of the methods or systems given above can be implemented in the following situations, as well, instead of, e.g., the initial deposit(s) amount being the deterministic value or the governing/threshold parameter:

When the awards or bonus round or enhanced winning table is triggered or implemented for and based on lost amounts, e.g., starting from 100 or 200 US$ as initial deposit (or deposits, total), when the user loses 40 US$, as the losing step or value or threshold, to get to 60 or 160 US$ balance, respectively, the enhanced or bonus regime kicks in or is activated. So, the main/important number or value is 40 US$, in this example, which governs the rules and thresholds for this embodiment.

The loss value/step in the embodiment above can also be expressed in terms of percentage or ratio or relative value, rather than absolute value such as 40 US$. For example, we can set the trigger or threshold for enhanced table or bonus round when we have one of the following criteria, as an example, starting from 100 US$, originally:

When we have 10 percent loss; or

When we have 2/3 of the amount lost; or

When we have 0.2 of the original amount loss.

For winning, in one embodiment, we have non-cash, cash, amenities, free upgrade, free room, free lunch, discounted, coupons, free merchandise, bonus round, a chance of winning the original investment/input/dollar value back, or fraction of original back, or more than original back, or any combination of the above.

In one embodiment, we have the total loss of a person is accumulated in one or more sessions, or for a family or circle of friends, or for a period or multiple periods, or for a single machine or for a series or machines or for a casino or multiple casinos, or in a city or multiple cities. So, for example, the person loses 100 dollars in total, then he will get a prize or bonus round or elevated winning table or favorable outcome table or free lunch or free stay at hotel or free game or free time on machine. For example, the person loses 80 dollars and gets a message, on screen of the computer or game machine or on its printed ticket or e-ticket or by email or on a card or smart card or magnetic card or credit card or customer card or ticket, that if he loses 20 dollars more, he will get a lunch worth of 50 dollars at a local affiliated or non-affiliated restaurant, as a coupon or gift card or ticket. Also, in one example, this can continue more, e.g., with another step and prize at a higher level of loss, e.g., when the person loses 180 dollars, and gets a message for the threshold for 200 dollars, as at that time, it will get an 80 dollar hotel stay for one night value or helicopter ride on the city or a show at night. So, at this scenario, everybody feels a winner, as the gambler may get a value ($80) more than the value he is going to risk at the last step ($20). Also, casino only pays a fraction of $80 to the restaurant, which is cheaper than 20 dollars, and the restaurant has many more customers at a pre-determined value, which is a good business, overall.

In one embodiment, we have a situation when a person loses L=40 dollars or a percentage of the original amount, then we (casino or game machine) will give him/her a prize, lunch, bonus round, favorite table of results or better/higher probability of win, or a chance to another play. In other embodiments, we have any of the embodiments described above, but without any threshold or requirement of initial deposits, or threshold being equal to zero dollars.

In one embodiment, we have a situation when if the person is on a machine for 1 hour, then gets the bonus or prize, or alternatively, with these conditions:

Staying on the machine for 20 more minutes, or 10 more plays on the machine, or 2 more sessions or continuous sessions on the game machine, or in casino.

In one embodiment, we have free play as prize, or 20 dollars worth of play. In one embodiment, we have triggers based on deposits made to the machine. In one embodiment, we have triggers based on amounts lost on the machine, for the same examples given above. In one embodiment, we have triggers based on same machine, play, session, casino, game, type, visit, day, month, year, season, average, total values, or the like. In one embodiment, we have triggers based on total amount in absolute value, e.g., lost in one chain of events or session or sitting or sequence. In one embodiment, we have the games in poker, blackjack, computerized, simulation, or slot machines.

In one embodiment, we have the condition or trigger based on, e.g.:

- Same sitting, having X dollars now
- Same day or week, having X dollars now
- If play 3 hours
- If play 3 hours, continuously
- If play 3 hours, and loses 450 dollars or more
- For a specific machine or computer game or module
- During non-peak hours
- During peak hours
- If after losing 50 dollars, if stay 30 minutes more, or lose 40 dollars more
- If after 2 hours on machine, if stay 30 minutes more, or lose 40 dollars more
- If loses r dollars, then gets a x dollar lunch, but if loses s dollars, it has more choices for lunch or dinner to choose from
- No initial deposit requirements, but for every 20-dollar intervals/losses, decide for prizes, or adjust for prizes and levels and values (note that these numbers are just examples, and not limiting, for all the above examples)
- Table of values: 40 $, next 50 $, next 15 $: ask for player to put in these values, in the sequence, for prizes or rewards, or use random numbers generated by a computer for such a sequence
- Based on card across a casino, machines, casino-wide, or not-machine-specific, as also described fully, already, in our parent case, which the current case is a CIP of In one embodiment, we have a situation that if we lose more dollars, we will get a prize: A method of conducting a game of chance on an electronic gaming machine comprising a display, and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold value for triggering prize or reward, said processor receiving a second threshold value for notifying said player; a counter calculating said player's losing total; said processor receiving said player's losing total; if said player's losing total is more than said second threshold value for notifying said player, then subtracting said player's losing total from said first threshold value for triggering prize or reward, to get a first difference value; displaying said first difference value to said player on said display; recording said first difference value on said player's card; said processor receiving a first predetermined amount of time; if said player comes back and logs in to said electronic gaming machine or a particular casino within said first predetermined amount of time since last time said player logged out, a card reader reading said first difference value from said player's card; wherein said card reader is within or connected to said electronic gaming machine; if said player further loses another amount equal or more than said first difference value, then said electronic gaming machine presenting said player with a prize, reward, game option, coupon, lunch ticket, show ticket, hotel room ticket, or discounted or free service.

In one embodiment, we have the following variations to the above:

- aggregating all losses on all machines in said particular casino.
- aggregating all losses on all machines in all sister casinos.
- receiving a warning on a cell phone.
- receiving a warning on a laptop.
- combining losses for various people in a social group or family plan.
- extending deadline for expiration of said player's card.
- adding more steps for thresholds for other prizes.
- adding more choices for other prizes.
- combining winning values for various machines in one or more casinos.
- combining probability of winning values for various machines in one or more casinos.
- combining probability distribution curves for winning events for various machines in one or more casinos.
- capping winning values for various machines in one or more casinos, against a maximum winning threshold value.
- using a random generator to select a table or schedule from a plurality of payout schedules.
- using a random generator to select a probability value for winning event.
- using a random generator to select a probability distribution curve for value for winning event.
- selecting a sequence of values for step thresholds.
- selecting a sequence of values for losing thresholds.
- using a conditional statement for rules engine or module.
- said first predetermined amount of time is one day.

In one embodiment, we have a situation that if we stay longer time period, we will get a prize: A method of conducting a game of chance on an electronic gaming machine comprising a display, and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold time value for triggering prize or reward; said processor receiving a second threshold time value for warning said player; a time recorder keeping a time for a total log-in time for said player on said electronic gaming machine; said processor receiving said total log-in time from said time recorder, if said first threshold time value for triggering prize or reward minus said total log-in time is less than said second threshold time value for warning said player, then giving a notice to said player; displaying said notice to said player on said display, recording said notice on said player's card; said processor receiving a first predetermined amount of time, if said player comes back and logs in to said electronic gaming machine or a particular casino within said first predetermined amount of time since last time said player logged out, a card reader reading said total log-in time from said player's card, wherein said card reader is within or connected to said electronic gaming machine; if said player further logs in another period of time equal or more than said first threshold time value for triggering prize or reward minus said total log-in time, then said electronic gaming machine presenting said player with a prize, reward, game option, coupon, lunch ticket, show ticket, hotel room ticket, or discounted or free service.

In one embodiment, we have a situation that if we stay more number of plays, we will get a prize: A method of conducting a game of chance on an electronic gaming machine comprising a display, and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold value for triggering prize or reward; said processor receiving a second threshold value for notifying said player; a counter calculating said player's total number of individual game plays; said processor receiving said player's total number of individual game plays; if said player's total number of individual game plays is more than said second threshold value for notifying said player, then subtracting said player's total number of individual game plays from said first threshold value for triggering prize or reward, to get a first difference value; displaying said first difference value to said player on said display; recording said first difference value on said player's card; said processor receiving a first predetermined amount of time; if said player comes back and logs in to said electronic gaming machine or a particular casino within said first predetermined amount of time since last time said player logged out, a card reader reading said first difference value from said player's card; wherein said card reader is within or connected to said electronic gaming machine; if said player further plays another number of individual game plays equal or more than said first difference value, then said electronic gaming machine presenting said player with a prize, reward, game option, coupon, lunch ticket, show ticket, hotel room ticket, or discounted or free service.

In one embodiment, we have a situation that if we stay on non-peak hour periods, we will get a prize: A method of conducting a game of chance on an electronic gaming machine comprising a display, and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold time value for triggering prize or reward; said processor receiving a second threshold time value for warning said player; said processor receiving a definition of non-peak hour periods from a time database; a time recorder keeping a time for a total log-in time for said player on said electronic gaming machine for accumulation of said non-peak hour periods for said player; said processor receiving said total log-in time for said accumulation of said non-peak hour periods for said player from said time recorder; if said first threshold time value for triggering prize or reward minus said total log-in time for said accumulation of said non-peak hour periods for said player is less than said second threshold time value for warning said player, then giving a notice to said player; displaying said notice to said player on said display; recording said notice on said player's card; said processor receiving a first predetermined amount of time; if said player comes back and logs in to said electronic gaming machine or a particular casino within said first predetermined amount of time since last time said player logged out, a card reader reading said total log-in time for said accumulation of said non-peak hour periods for said player from said player's card; wherein said card reader is within or connected to said electronic gaming machine; if said player further logs in another period of time of said non-peak hour periods equal or more than said first threshold time value for triggering prize or reward minus said total log-in time for said accumulation of said non-peak hour periods for said player, then said electronic gaming machine presenting said player with a prize, reward, game option, coupon, lunch ticket, show ticket, hotel room ticket, or discounted or free service.

In one embodiment, we have defined the non-peak hour periods as when less people are trying to play the games and stay on machines to encourage people stay on, on odd hours, for better distribution of users and avoiding peaks and congestions or uniformly distribute the population throughout the day or week, for optimum profit and utilization of games and machines, e.g., to avoid people waiting for sitting on a machine, due to congestion and overcrowding, which can be avoided by population distribution among different hours, as uniform as possible, to increase game participations and play time, and less idling or unused time (minimizing under-utilization periods). For example, if between the hours 6 am to 10 am, the machine is vacant or unused, we want to encourage people to come that period. So, we gave them advantage of winning or prizes, to compensate for inherent lack of (or less) customers for those periods, as explained above in details.

In one embodiment, we have card for personal information and ticket for dollar amount and ad info, as well as any other relevant info. The same information can be recorded on both card and ticket or coupon. The reader and printer can record and print or read to/from any one of them. In one embodiment, we have a central database holding the same info, e.g., via the card or ticket or other means.

In one embodiment, we have the player with 2 choices, of playing more or leaving. In one embodiment, we have the log-in concept used very broadly, e.g., for anytime the player is back on the machine or start playing again or put the card or ticket in the machine or turn of the machine. For example, when a player is not identified and leaves the machine and comes back later, from the ticket, card, RFID, tag, or similar means, the machine can still know that he is the same person that was here before, and he can benefit from his history/file/prior transactions with the machine, to get more favorable results, as shown above. In one embodiment, we have internet based, computer based, tablet based, tel. based, or laptop based, for the machine, e.g., for one or more players, alone or together, to be able to do the teachings shown above.

In one embodiment, we have live marketing, promotion, and/or instant rewards, with real time feedback, e.g., to decide what option or awards or choices to give the player, on spot. In one embodiment, we have customized options for the casinos, so that the unit of machine can be programmed or input for parameters or adjusted by menus or knobs, so that billions of different variations can be programmed on spot or centrally or remotely or varied or periodically changed or modified based on casinos' desire or marketing needs or predictions, to optimize, with all parameters given above for these machines as variables, and adjustable or changeable, to give maximum flexibility to the casinos for better customer satisfaction and loyalty, and higher profits at the end. So, all the parameters in this invention/disclosure can be changed as independent or dependent variables, controlled by a remote or central computer or server, as was also described in the parent application.

The dynamic bonusing is used for variable parameters, e.g., changing and setting the parameters by casinos for: time, thresholds, periods, dollar values, ranges, conditions, bonus amount, bonus round, and the like, or as other parameters mentioned in this invention. The dynamic parameter database comprises all the variables for the game, as listed in various parts of this invention, such as thresholds, times, periods, margins, percentages, awards, dollar values, triggers, probabilities, chances, statistics, curves, ratios/percentages, absolute values, relative values, and the like.

The dynamic parameter interface lets the casino change the parameters in the database, with its display. The parameter initializer for the game and the game controller sets the parameters and then runs the game, respectively, based on the dynamic parameters, read from the dynamic parameter database. So, the same game on different machines have different performances and outcomes, and they can be changed routinely, manually, or periodically, or based on time or trigger or event or conditions or if/then rules or rules engine, or remotely, or centrally, or by a processor, or by a pattern, or by a computer, by casino, for marketing or optimization or customer loyalty or testing customer purposes.

In one embodiment, we have an electronic gaming machine owner entering a set of dynamic parameters, which comprises: initial time, ending time, time periods, time thresholds, initial dollar value, dollar value thresholds, dollar value ranges, bonus amount values, trigger time values, trigger dollar values, probability values, probability curves, probability tables, winning chances, winning tables, winning values, reward levels, reward tables, reward thresholds, casino margins, and house percentages, through a dynamic parameter interface.

In one embodiment, we have table games (such as poker or card games) and slot machines. In one embodiment, we have the metrics based on number of plays or sessions per hour, with G percentage house/casino advantage, for comparison of benefits or differences with the prior situation. For example, we have 3 $/play, or 15 sec/game (e.g. a sitting of 1 hour produces 240 games, statistically, in average), with the number of plays, average wagers specified, and house advantage in percentage F % or ratio H, for average win or profit of the casino or machine, statistically. Another example is "average daily theoretical" value. For estimate/calculations, we have 2 methods: (a) spread for table games, with estimate of number of games per hour or time window, and (b) for slot machines, with exact number of push/pull handle or button on the machine.

In other embodiments, we have: adjusting values in said game rules and command engine, based on a rule, time, trigger, condition, casino, user, said player, said electronic gaming machine owner, marketing requirement, customer demand, sales history, customer traffic, season, time of day, profit history, profit margin, location, or customer taste.

In other embodiments, we have: a parameter initializer reading said set of dynamic parameters from said dynamic parameter database; said parameter initializer setting values for game parameters and rules in a game rules and command engine, using said set of dynamic parameters; said processor accepting an initial investment from a player to participate in said game of chance on said electronic gaming machine; said processor crediting said player's account on said electronic gaming machine an amount equivalent to said initial investment; said processor receiving a first threshold value for triggering prize or reward from said game rules and command engine; said processor receiving a second threshold value for notifying said player from said game rules and command engine.

In other embodiments, we have the following examples of games:

1. Additional rewards granted to player in exchange for player's card signup as play progresses.
   a. Allows for a system through which an un-carded player would be presented with messages encouraging him to sign up for a players card.
   b. Tied to total player spend and/or playing habits (i.e., max bet, average bet, etc)
   c. The intention is to provide repeated and incremental incentive to a player to sign up, in proportion with his value to the casino.
   d. As the player is worth more, the system prompts the player with additional incentives:
      i. if you sign up now, you would get $5 Free Play, then $10, etc.
2. Additional rewards granted to player as player progresses through Average Daily Theo tiers.
   a. As players hit different thresholds of worth to the casino, they would typically be moved into different reward tiers.
   b. These tiers are typically opaque to the player (differentiated from player facing tiers, i.e., Sliver, Gold, Platinum, etc.), and are expressed primarily through monthly mailers and invitations to the events.
   c. This system would allow for an immediate rewarding/inviting during play when a player has exhibited behavior that would move them into a different tier.
   d. For example, Player is playing at a different level than before or, as a new player, is exhibiting play that would typically result in an additional reward or invite to an event, the system prompts and rewards that player at the machine (whether or not they have to go to a players club booth to redeem, or get a voucher at the machine).
3. Notification of players club, player facing tier status during play and temporary 'boosts' to status.
   a. Some players clubs feature player-facing tier structures (Silver/Gold/Platinum) with additional benefits to players, as they move into higher tiers.
   b. Those tiers are typically achieved through volume of play, i.e., coin-in the machine. $1=1 point (or the like). The more you play, the higher your status, which opens up financial and other rewards (premium parking, line-skip privileges, etc.).
   c. This extension would prompt the player with his current tier status and how far he needs to go (i.e., how many more points he needs) to move into the next tier.
   d. Additionally, the system could temporarily increase the point accumulation speed to increase player's time on device or coin in.
   e. For example, when player reaches a threshold of time on device or coin in (or whatever triggers it), they receive e.g. 2× tier points for e.g. the next 20 minutes or T time period.

The following table shows some of the definitions and parameters used for our system, as how it is done in the industry:

TABLE 1

| Parameters used. | | |
| --- | --- | --- |
| term | Definition | calculation |
| handle | Total amount wagered | Bet per spin X bet (spin) count |
| Average bet | Average money risked on each decision to wager. For table games, this is a visual estimate by table games employee. | Handle/ number of spins |
| bet | The total amount a player risk on a single outcome. | N/A |
| Time played | Irrelevant fro slots. For table games, it is when the player sits down to when the player gets up. | Time out − time in |
| theoretical | The expected amount that the casino expects to win from a player based on money risked and house advantage. | Different for slots & tables (see chart) |
| Reinvestment percentage | This is the amount of expected win that the casino spends to retain players through promotions, comps, and other rewards. | Custom percentage X theoretical |
| Player session | Time between the placement of the first bet to the placement of the last bet. | Time of last bet − time of first bet |
| Bet (spin) count | Number of bets placed. | N/A |

The following is an example of calculations for our system, for Theoretical Win calculation, by the game type, as how it is done in the industry:

TABLE 2

| Example for calculations: | | |
| --- | --- | --- |
| | slots | Table games |
| Time played (m) | | 90 |
| Estimated bets per hour or time | | 40 |
| Bet (spin) count | 100 | 60 |
| Average bet | $ 3.00 | $ 25.00 |
| Handle | $300.00 | $1,500.00 |
| House advantage | 7.50% | 2.00% |
| Theoretical Win | $ 22.50 | $ 30.00 |

The following are some examples, for the teaching of the parent cases:

Use in game bonus to trigger match play type bonus. E.g., half is cash and half is free play. E.g., you put 20 $ and they match 20 $ for free play, for a total of 40 $.

Use casino to award the concert tickets randomly on nights of soft/low attendance.

Use casino to create immediate bounce back, e.g., losing 20 $ at last hour, but if put 20 $ more in, then it gets a bonus.

Use casino to award dessert, meal coupon, after dinner, so that the player comes back after dinner to play more.

Determine average time on machine. After passing average threshold, then give bonus to stay in more.

Refund 20% of loss, for quick loss, but redeemable with another deposit.

Random bonus, but only redeemable when customer signs up for player's card (assign random code to a new account).

Random hot seat, but actually use a formula to determine (e.g., biggest statistical loser, based on time played and relative losing percentage), to reward the casino's long-time losers.

Anybody losing 20 $ in short period of time T, get 0.5 back as bonus, for quick loss.

If starting with 40 $, and after some win/losing, the player played or lost or won 250 $, as total, or more, cumulatively, then win a prize, bonus round, or free play, or free night at hotel, or free lunch, based on average daily theoretical, with option of using a player's card, with accumulating rewards, with more bonuses, if joining the player's club.

Other Inventions: Proxy Playing/Betting:

The following are the examples and embodiments of the invention for proxy or replacement betting or gambling, that can be combined, as shown in figures, with details:

A method of conducting a game of chance on an electronic gaming device, said method comprising: a processor receiving a name of an expert player from an expert database; wherein said electronic gaming device comprises said processor; said processor receiving a history and statistical data for performance of said expert player from a performance database; said processor displaying said history and statistical data for performance of said expert player on a device monitor; said processor ranking said expert player based on said history and statistical data for performance of said expert player; selecting said expert player for a syndicate for said game of chance on said electronic gaming device; a first player choosing said expert player from said syndicate's database; said expert player betting a first value of currency on said game of chance on said electronic gaming device; said processor producing a first outcome for said expert player betting said first value of currency on said game of chance; said electronic gaming device communicating with a remote device; said first player betting a second value of currency on said game of chance on said remote device; said processor producing a second outcome for said first player betting said second value of currency on said game of chance; said processor receiving a first rule from a rule database; wherein said second outcome is a function of said first outcome, based on said first rule, processed in a rule engine; plus the following features, as an option added, in any combination:

a manager choosing said expert player.

choosing multiple experts.

choosing multiple managers.

choosing multiple syndicates.

choosing multiple buckets for different accounts for different bets.
limiting followers.
choosing followers.
setting conditions for followers.
averaging values from multiple experts.
weighted-averaging values from multiple experts.
said second outcome is same as said first outcome.
betting as a proxy on a second person, who is betting on a third person, as a chain of proxies.
adjusting percentage or salary based on using an auction model.
adjusting percentage or salary based on using a hedging model.
adjusting percentage or salary based on using a stock market model.
adjusting percentage or salary based on demand on said expert player.
using authentication to verify an identity of a person.
group-betting for said game of chance.
charging a portion of winnings as a management fee.

Figure 21:
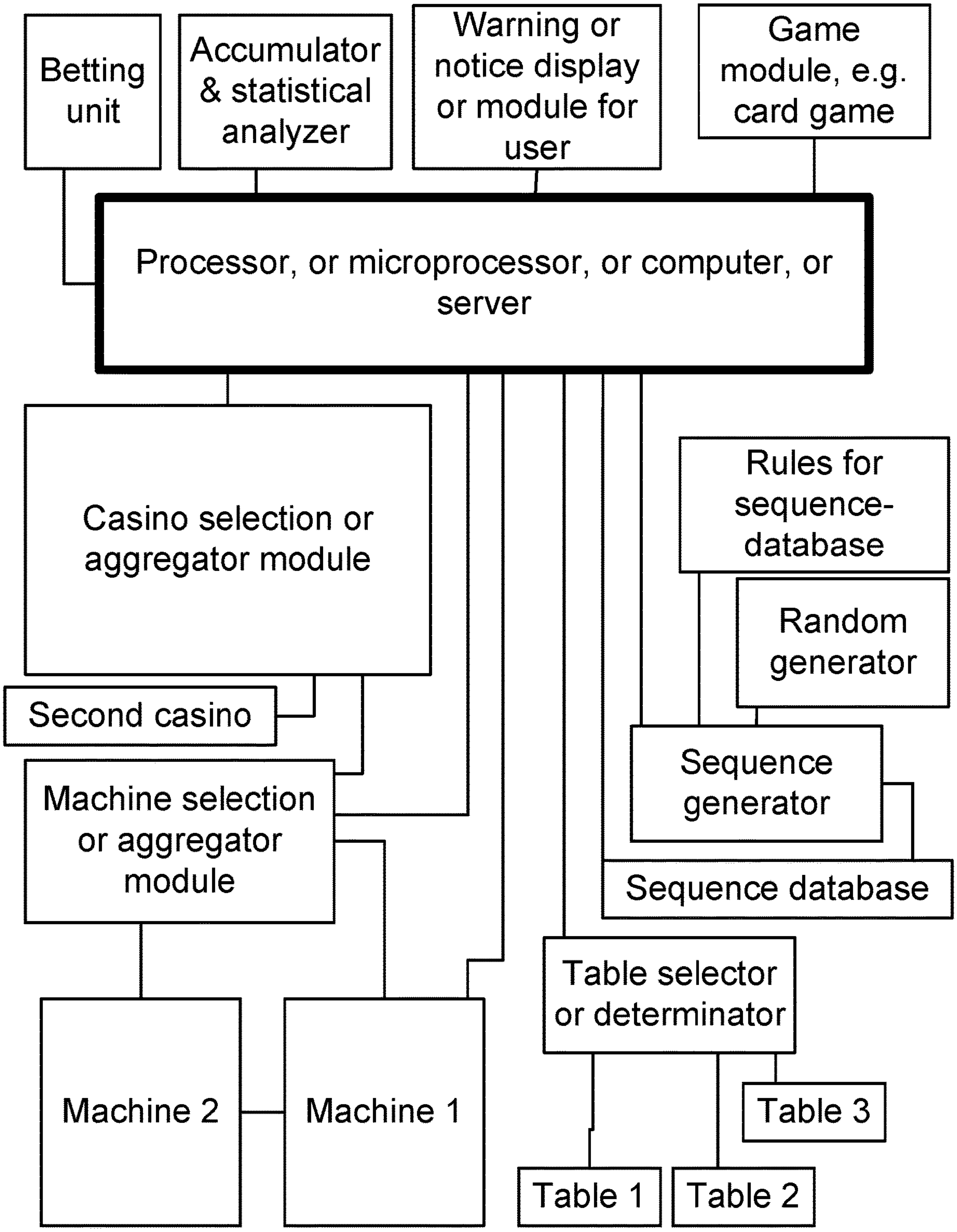
FIG. 21 is an embodiment for proxy betting system for different machines and different casinos, as well as different games.
Figure 22:
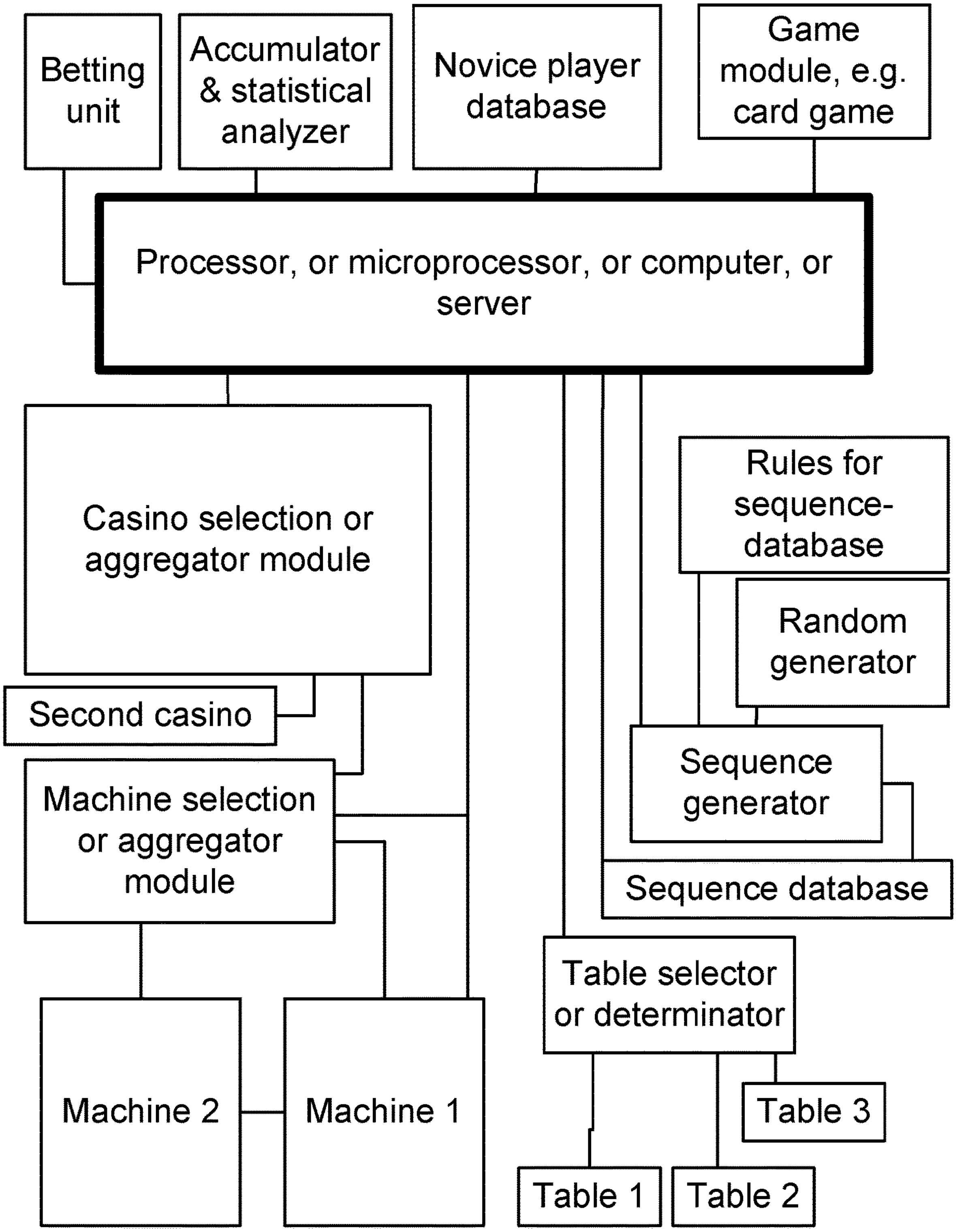
FIG. 22 is an embodiment for proxy betting system for novice players' participation.
Figure 23:
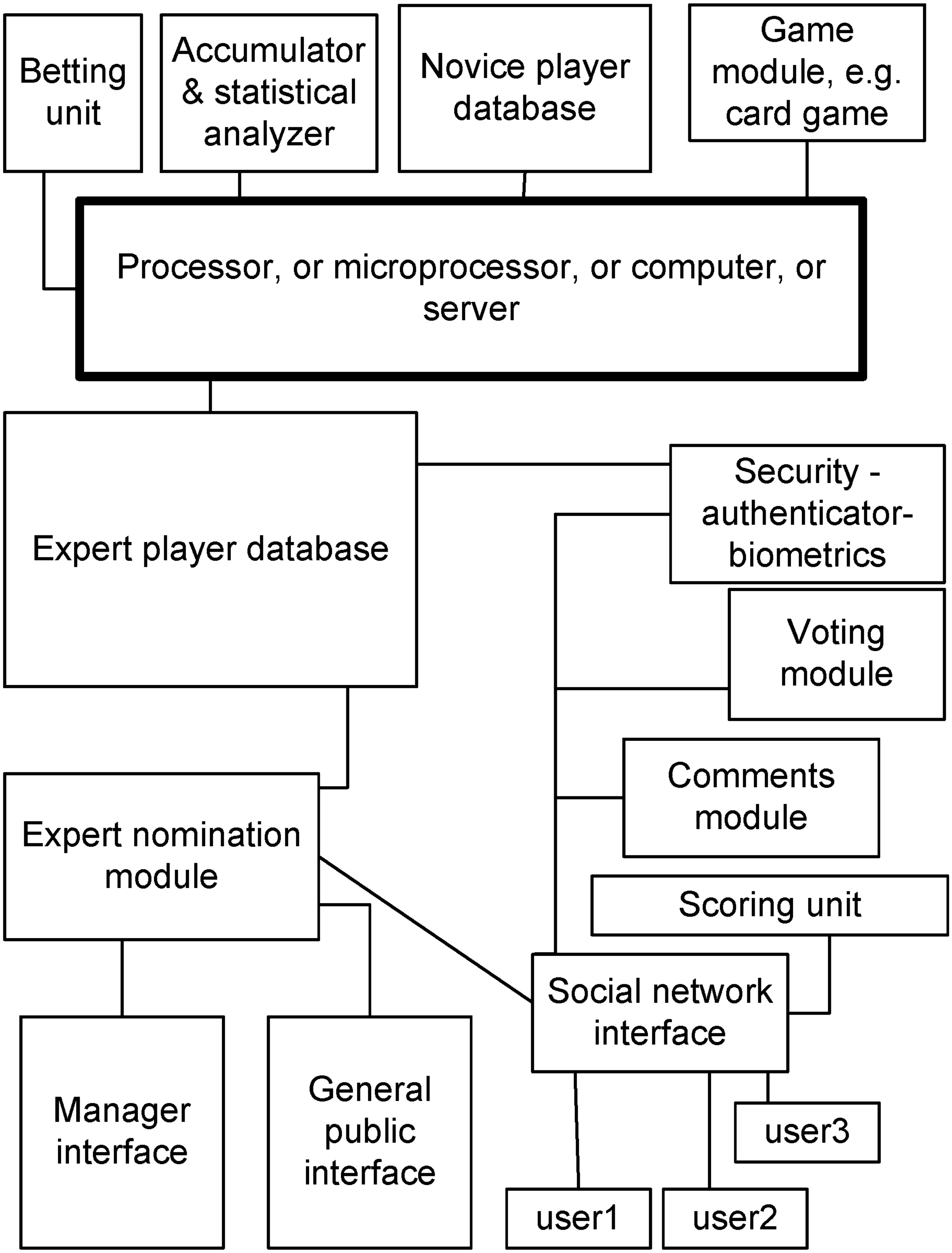
FIG. 23 is an embodiment for proxy betting system for expert or leader determination or setting up module.
Figure 24:
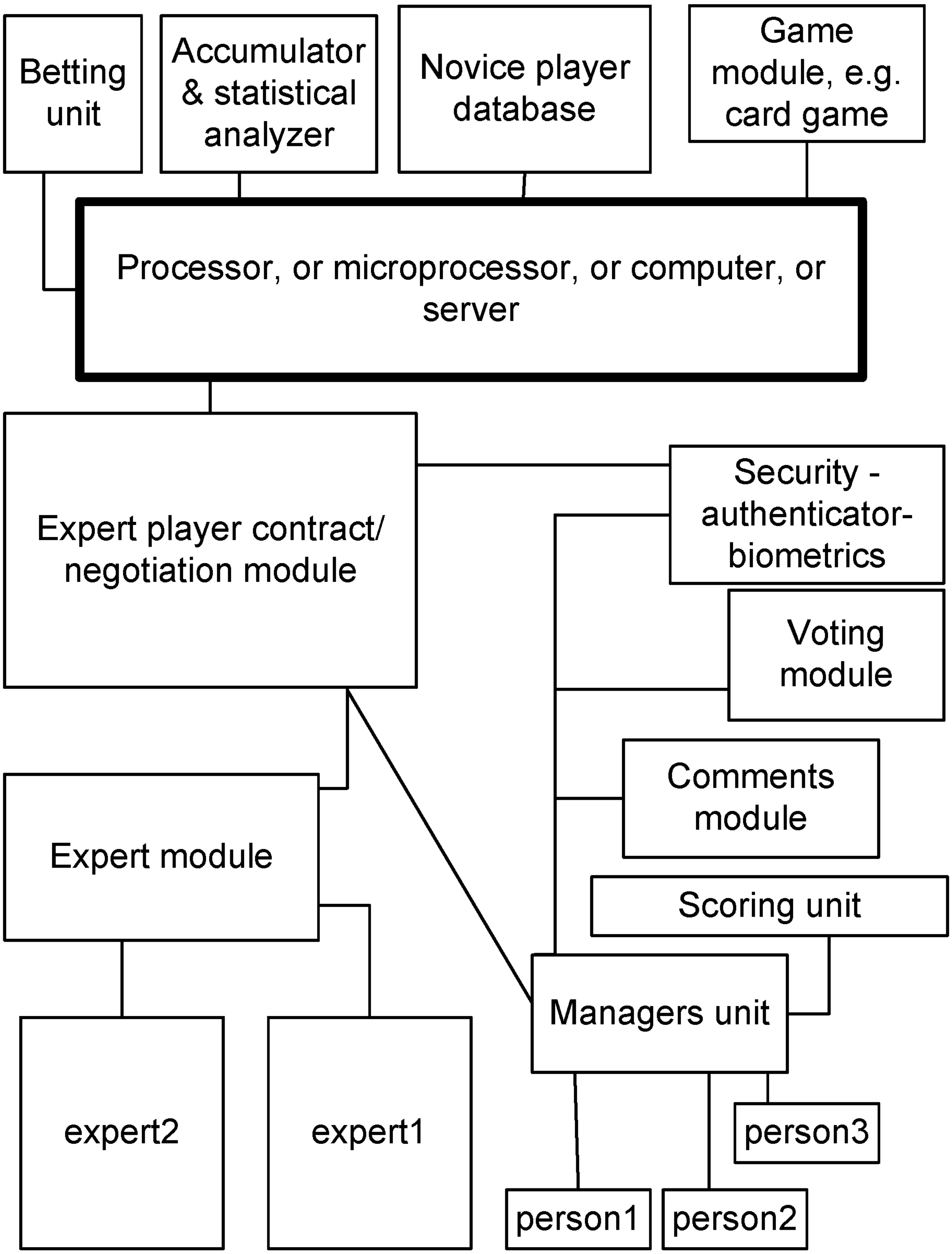
FIG. 24 is an embodiment for proxy betting system for manager and expert negotiating and contracting module.

FIG. 21 is an embodiment for proxy betting system for different machines and different casinos, as well as different games. FIG. 22 is an embodiment for proxy betting system for novice players' participation. FIG. 23 is an embodiment for proxy betting system for expert or leader determination or setting up module. FIG. 24 is an embodiment for proxy betting system for manager and expert negotiating and contracting module.

Figure 25:
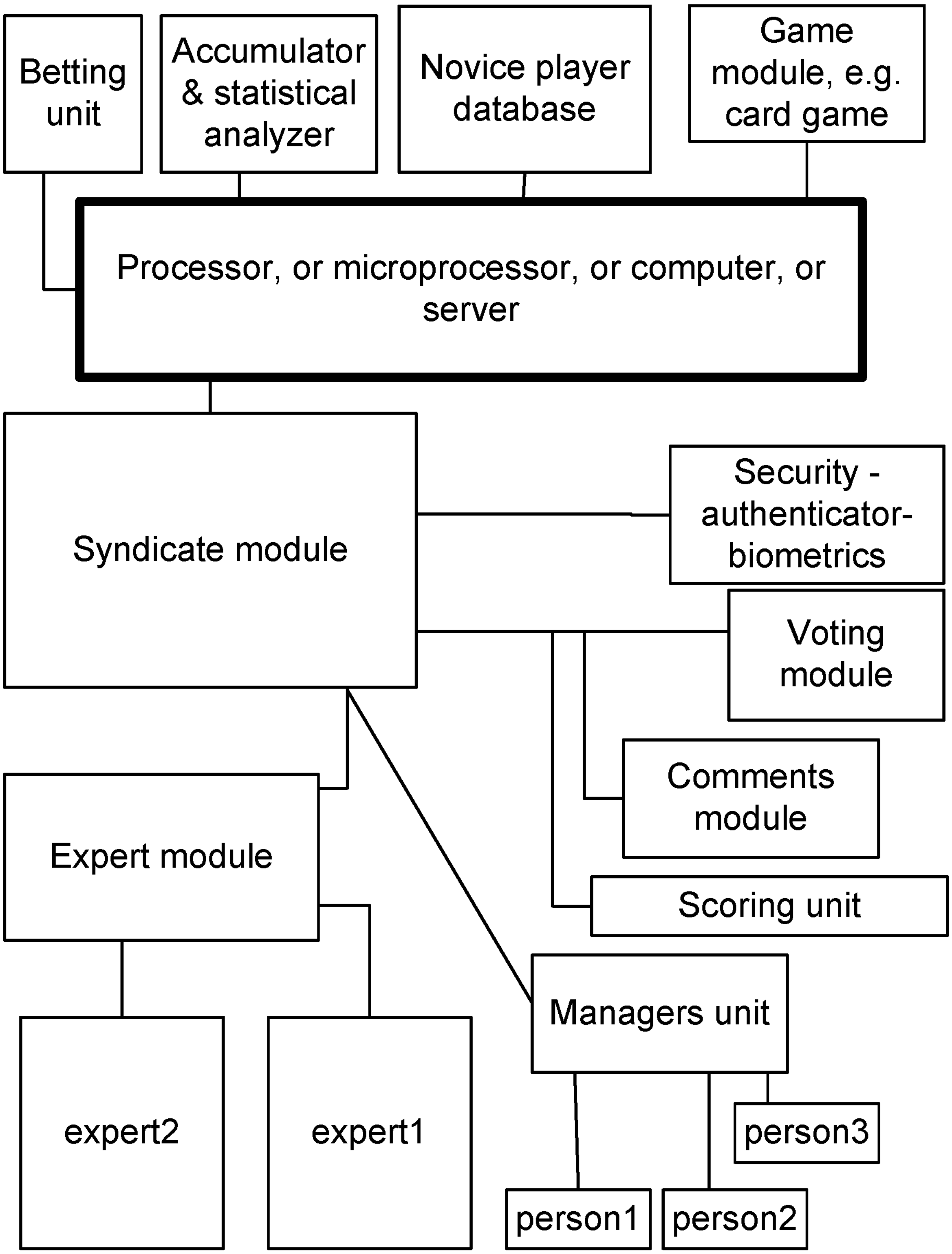
FIG. 25 is an embodiment for proxy betting system for syndicate module with all components.
Figure 26:
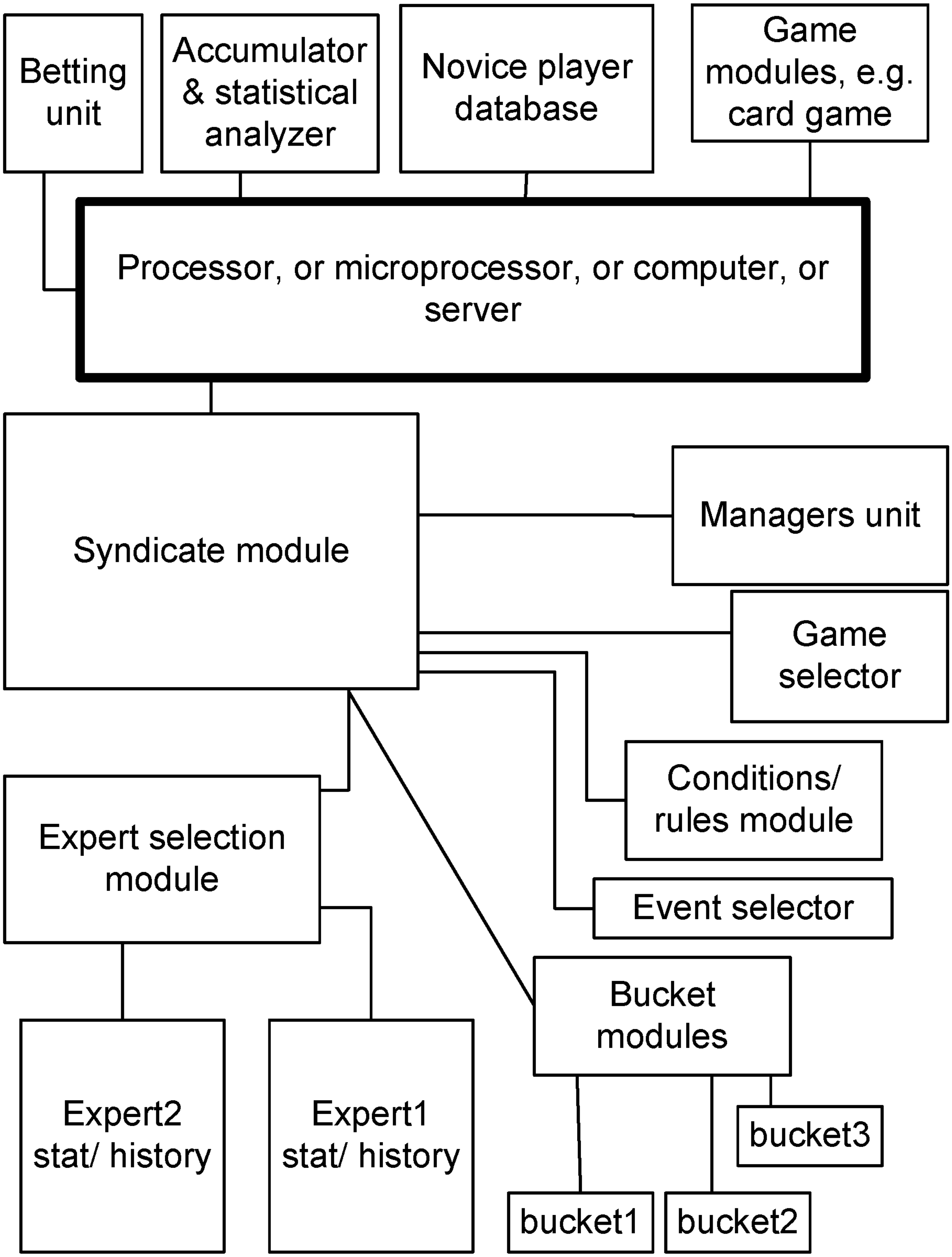
FIG. 26 is an embodiment for proxy betting system for different bucket modules for different purposes for betting as separate accounts.
Figure 27:
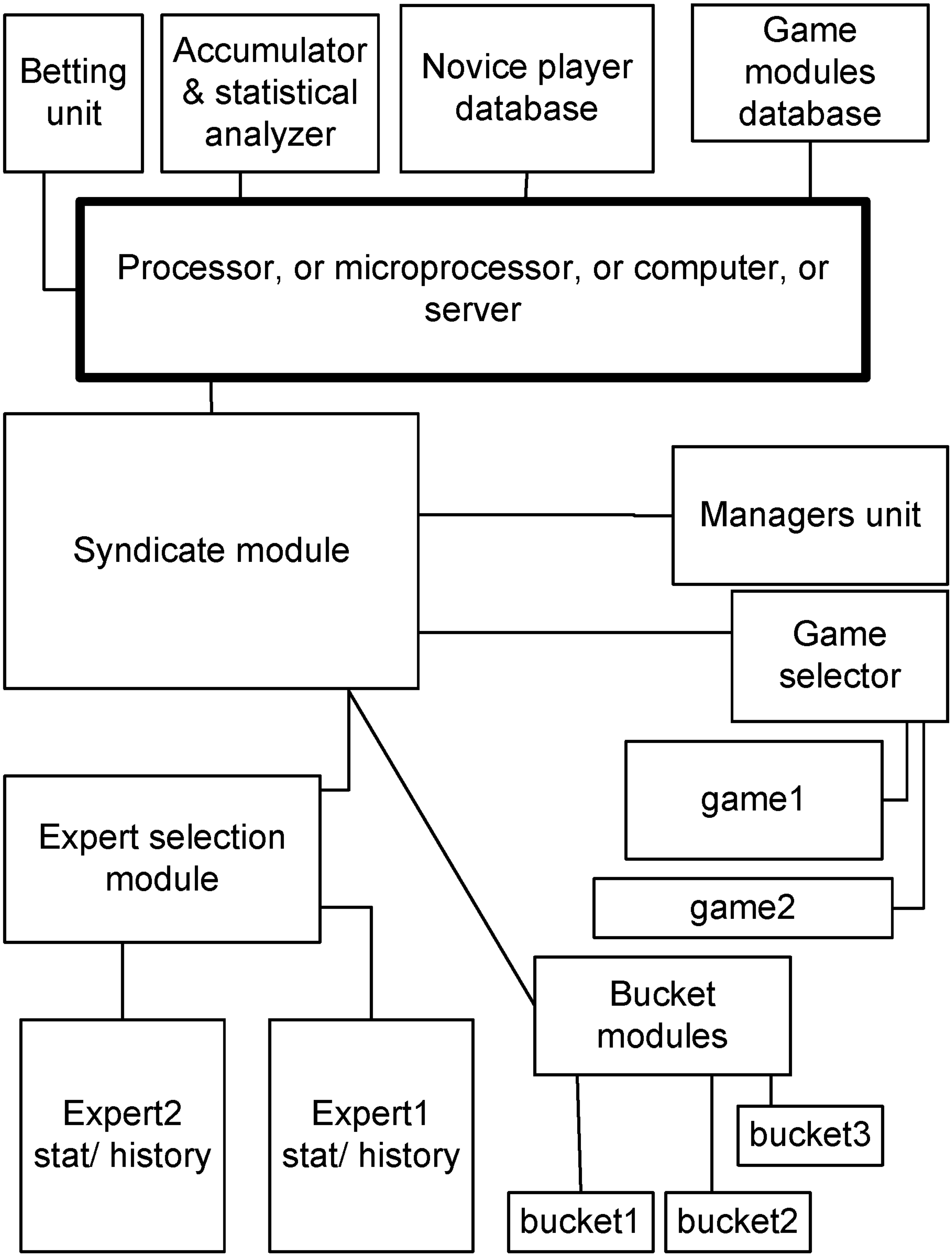
FIG. 27 is an embodiment for proxy betting system for different games, with experts' statistics/history.
Figure 28:
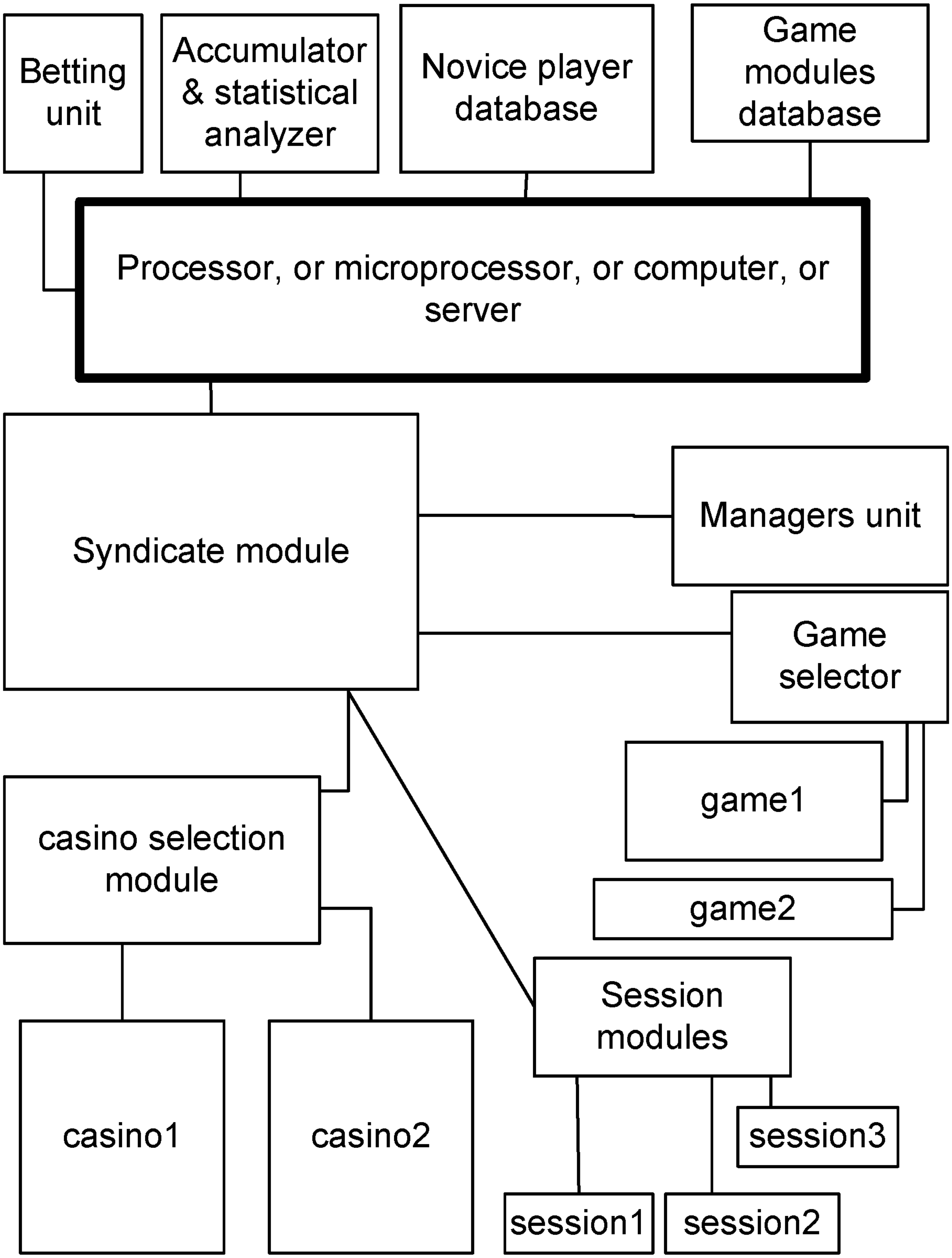
FIG. 28 is an embodiment for proxy betting system for different sessions of some games.

FIG. 25 is an embodiment for proxy betting system for syndicate module with all components. FIG. 26 is an embodiment for proxy betting system for different bucket modules for different purposes for betting as separate accounts. FIG. 27 is an embodiment for proxy betting system for different games, with experts' statistics/history. FIG. 28 is an embodiment for proxy betting system for different sessions of some games.

Figure 29:
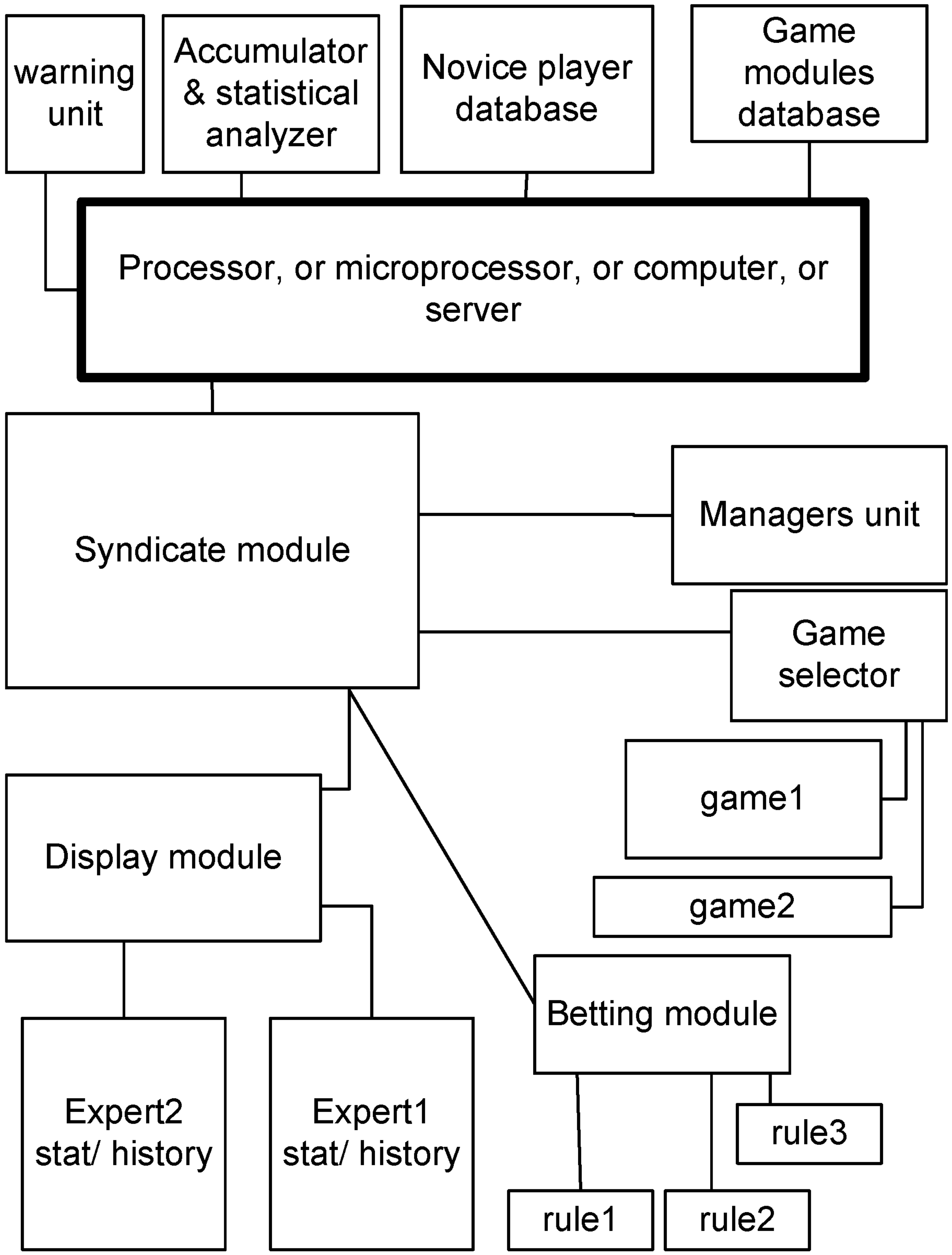
FIG. 29 is an embodiment for proxy betting system for betting module and display stat/history for experts.
Figure 30:
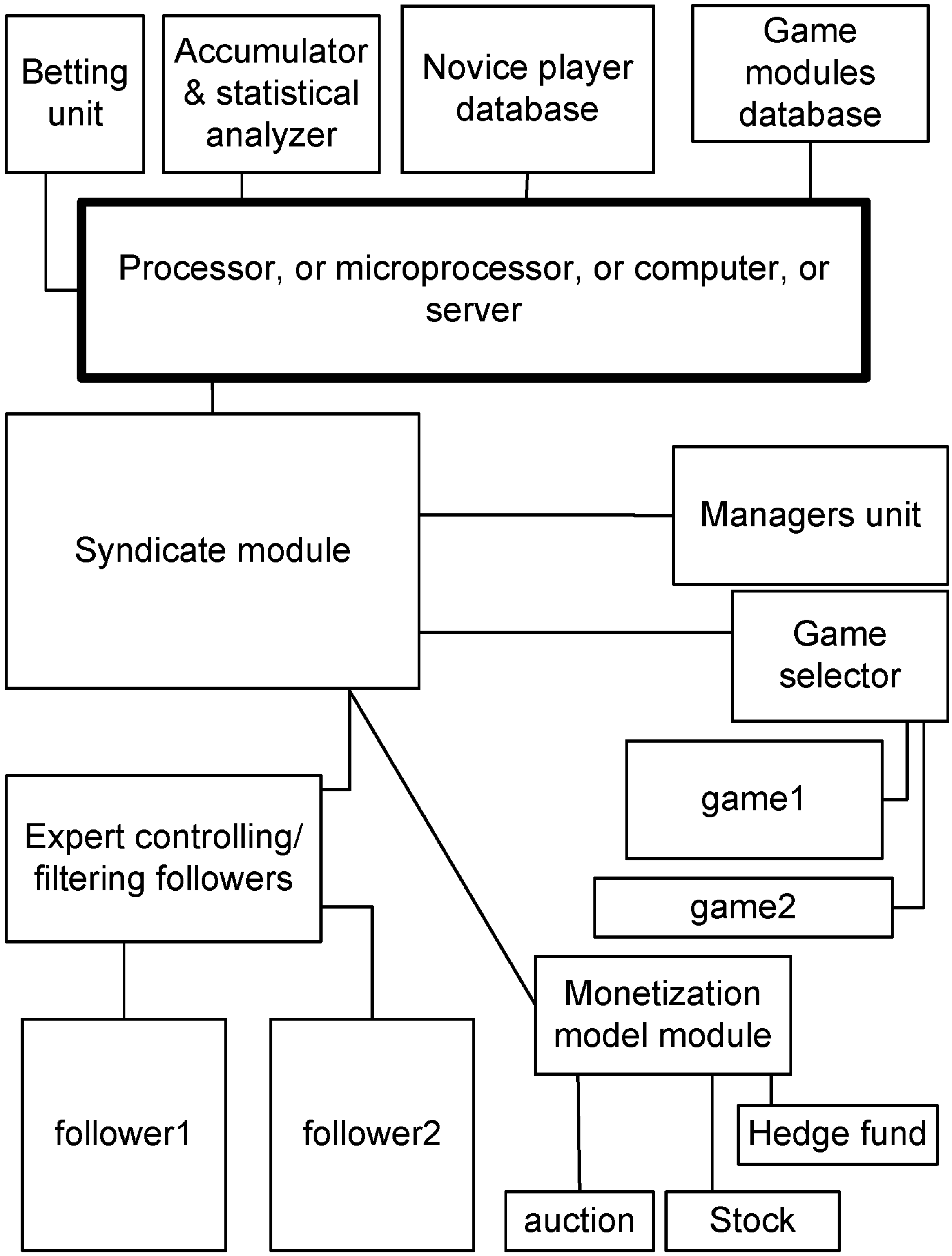
FIG. 30 is an embodiment for proxy betting system for different monetization module based on various models, with experts choosing or limiting the followers, as their options.
Figure 31:
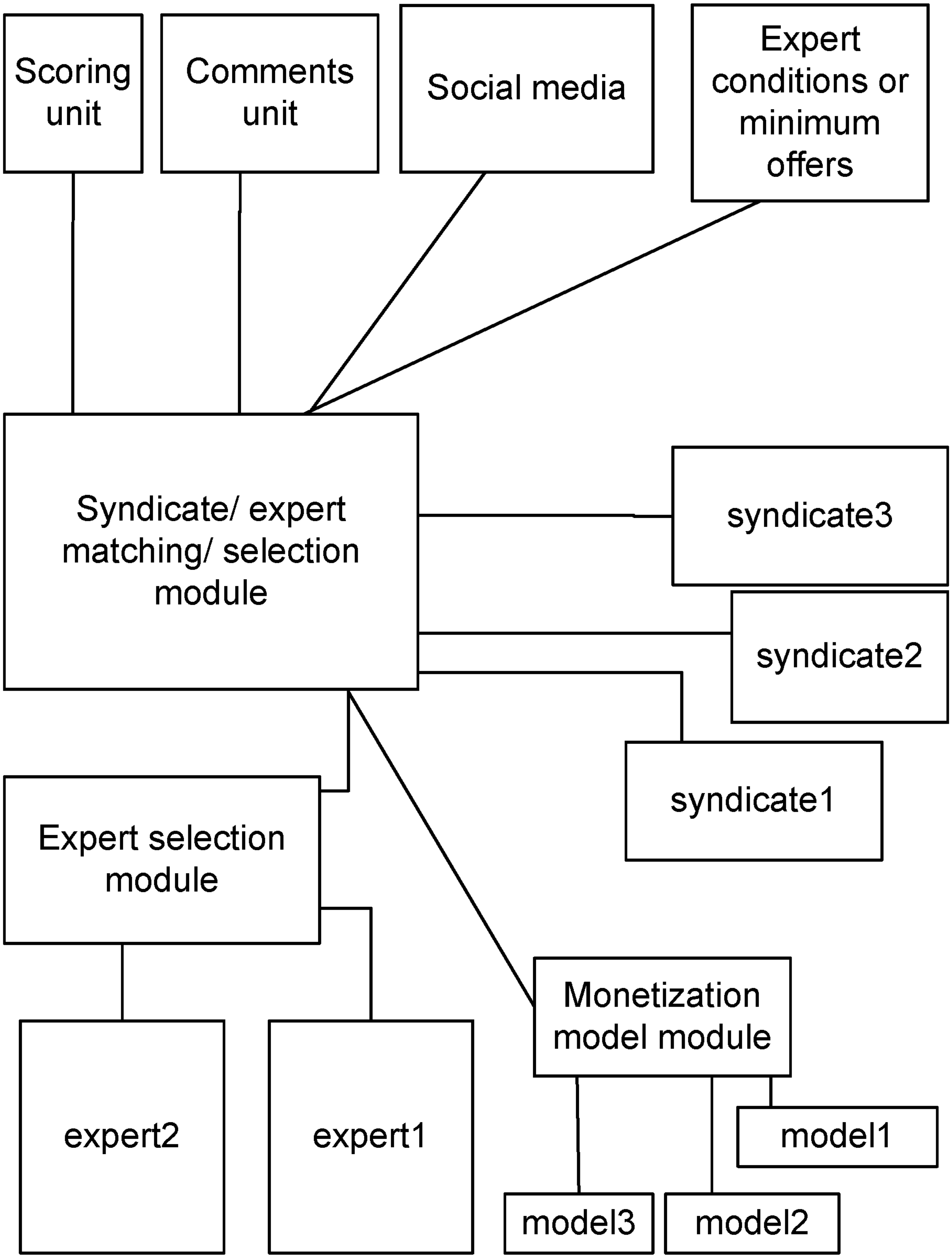
FIG. 31 is an embodiment for proxy betting system for different syndicates, different experts, and different models.

FIG. 29 is an embodiment for proxy betting system for betting module and display stat/history for experts. FIG. 30 is an embodiment for proxy betting system for different monetization module based on various models, with experts choosing or limiting the followers, as their options. FIG. 31 is an embodiment for proxy betting system for different syndicates, different experts, and different models.

Figure 32:
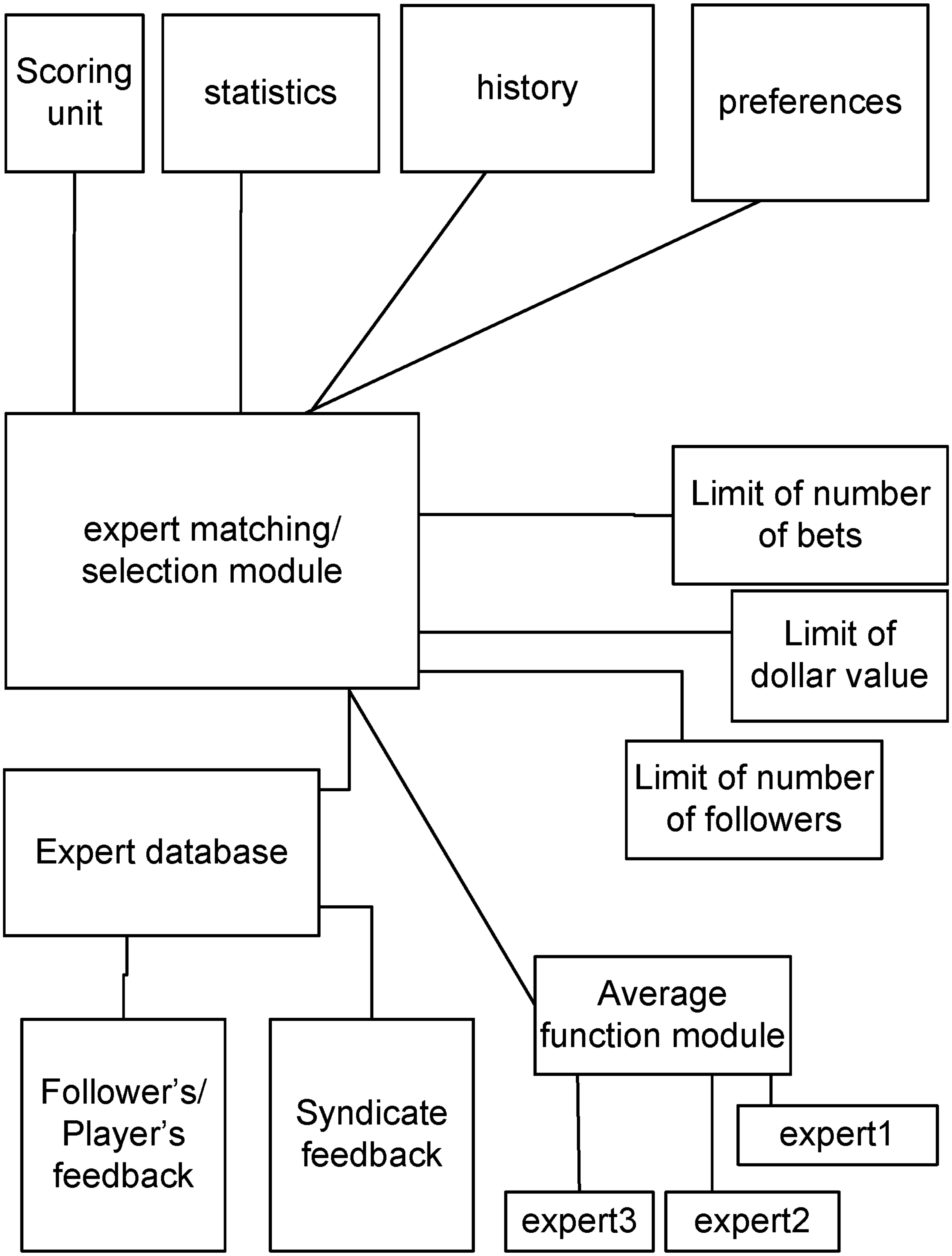
FIG. 32 is an embodiment for proxy betting system for different limitations, feedback, and experts, with corresponding functions on the expert results, e.g., averaging their values, for betting purposes.
Figure 33:
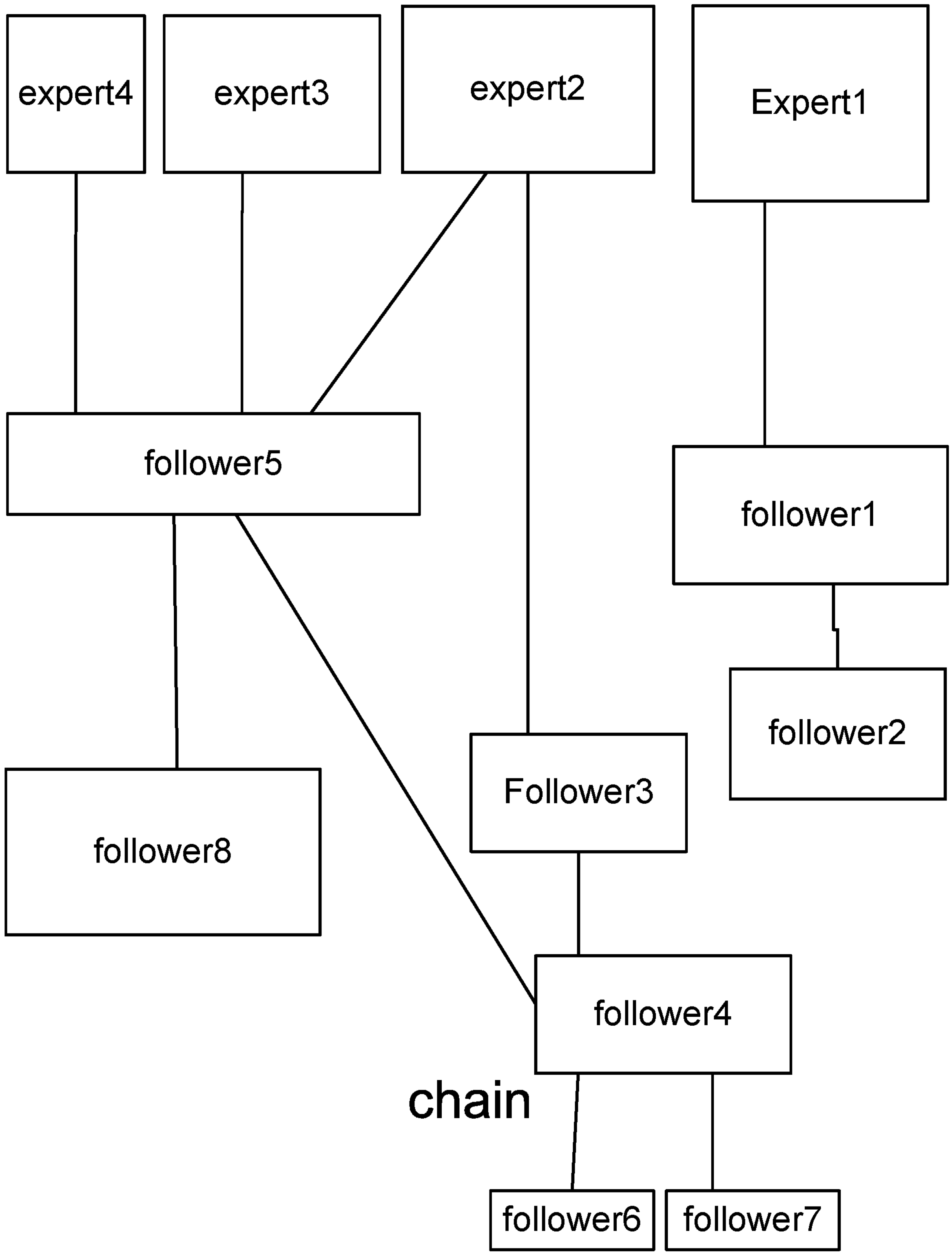
FIG. 33 is an embodiment for proxy betting system for chain of followers based on the main experts, as hierarchical.
Figure 34:
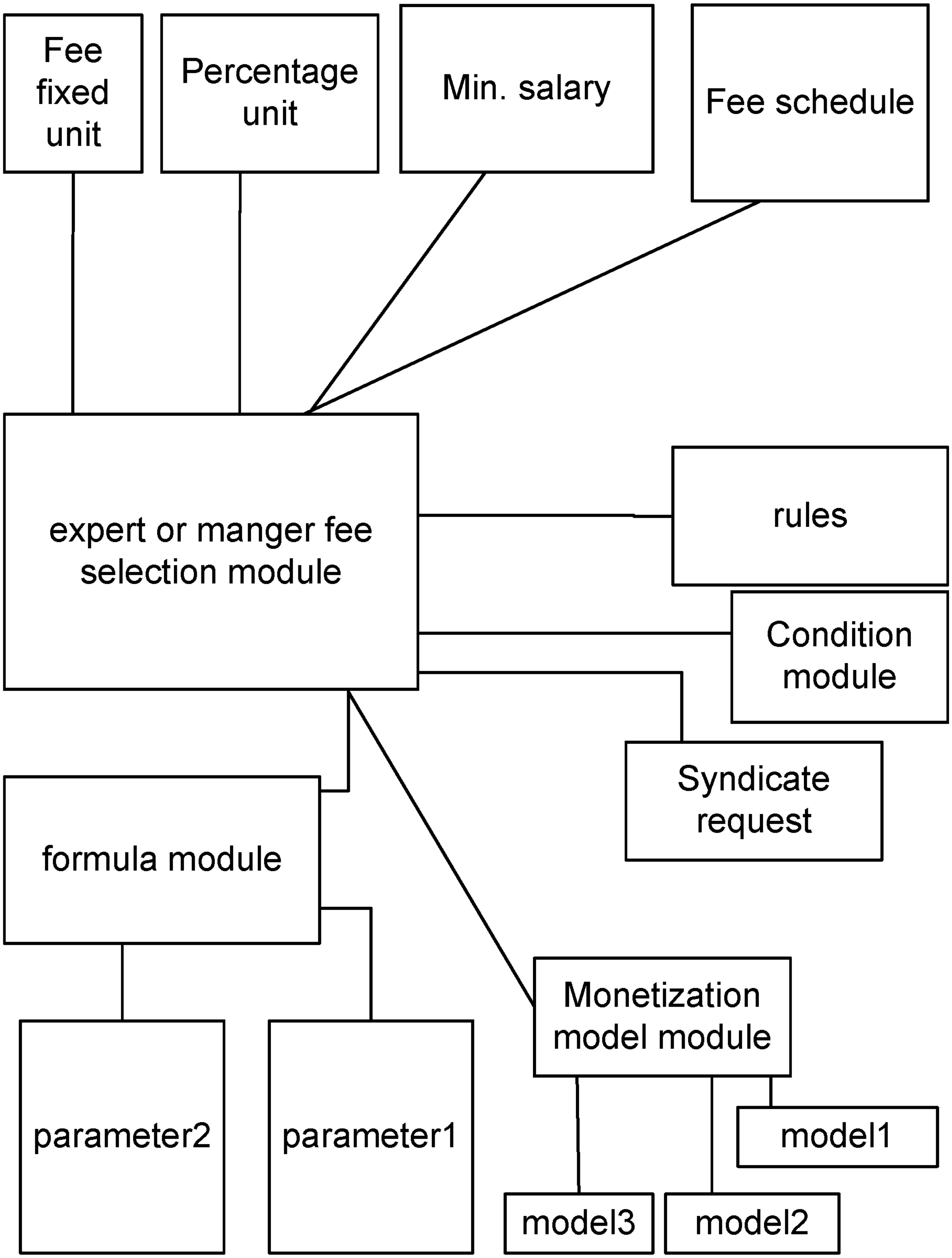
FIG. 34 is an embodiment for proxy betting system for different formulas, fees, and schedules.

FIG. 32 is an embodiment for proxy betting system for different limitations, feedback, and experts, with corresponding functions on the expert results, e.g., averaging their values, for betting purposes. FIG. 33 is an embodiment for proxy betting system for chain of followers based on the main experts, as hierarchical. FIG. 34 is an embodiment for proxy betting system for different formulas, fees, and schedules.

Figure 35:
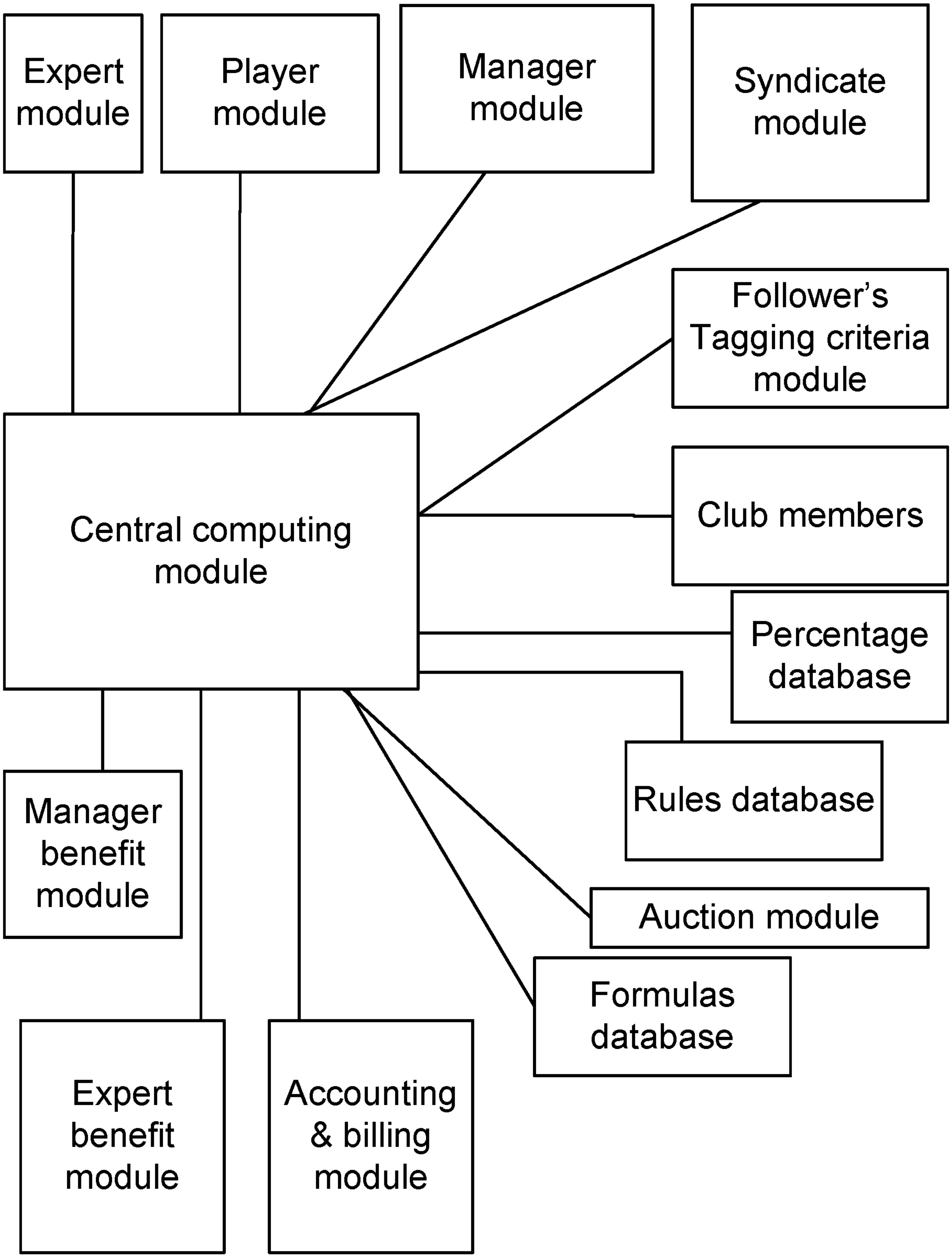
FIG. 35 is an embodiment for proxy betting system for different parties, and how they interact, and on what basis.
Figure 36:
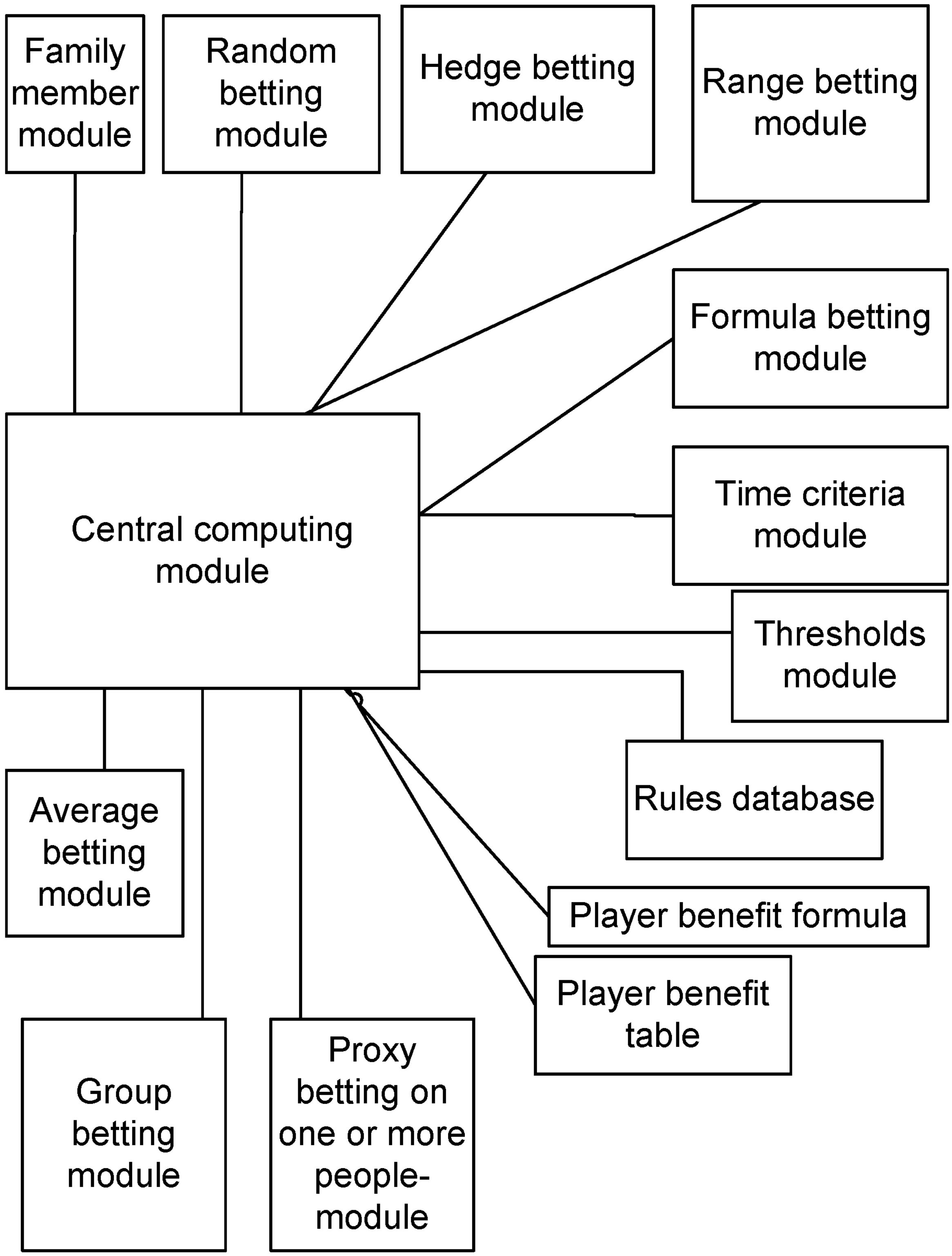
FIG. 36 is an embodiment for proxy betting system for different types of betting and their parameters.

FIG. 35 is an embodiment for proxy betting system for different parties, and how they interact, and on what basis. FIG. 36 is an embodiment for proxy betting system for different types of betting and their parameters.

When there is a big population, e.g., 10,000 people, they all can bet on one person on a machine in Las Vegas, or whatever he plays in a day, or on a specific format or session or game or class or type, or during a period, or multiple machines or in a casino or in a city, all tracked and accumulated by computer and network of devices. The minimum bet on a physical table or an electronic game may be 10,000 US$, but the follower can bet very small, e.g., 1 dollar, making it more popular. The size of bet could be reversed, i.e., larger, e.g., 100,000 US$, for a very rich follower. This can be for slot machines, mobile apps, regular table, card game, e.g., poker, physical game, e-game, slot machine systems, casino central computer, through network or Internet, online game, interactive, simulation, casino machine, PC, PDA, watch, smart phone, pad, slot management system, remote, in-casino, outside casino, or game box.

In one embodiment, the person buys a coupon or card or ticket to follow another person. In one embodiment, the person follows from social media site. In one embodiment, the person has separate bidding, automatically or manually set. In one embodiment, the person has ranking and prestige with prize and plaques. In one embodiment, the casino gets percentage or fixed dollar amount/currency/fee. In one embodiment, the person gets referral and a fee for that. In one embodiment, the person plays on a card/smart card. In one embodiment, it is connected to the bank account. In one embodiment, there is a player's card or club card.

In one embodiment, the new player is able to search for games in progress in same or different casinos or cities or places, from a large database or menu or choices, or the games in near future or scheduled for some time, or for specific people scheduled, or famous people or experts, or same physical location or property, or types of games, losing or winning games/machines/people/experts/casinos/places/managers/owners/or the like, or how long or how often win/lose, statistics, continuous losing/winning, odds, breaks, how often, probability, standard deviation, norm, ratios, best/worst ratio or range, longest running, stat on hour/day/week/month/recent/year/life/for specific game/location/machine/event/etc., winning now, percentage for wins, total win so far, history, logs, tabs, records, or the like. This enables filtering and narrowing down the experts, or choosing from remote with no knowledge in advance, or by luck or randomly. Other embodiments are:

Tag along with expert.
Machine inviting to tag along with expert.
Humans inviting to tag along with expert.
One cannot go to all casinos, but can search for those criteria for lucky machine/expert/person, to tag along with him, with or without his knowledge, as options available.
The search is done once, or continuous or periodic, or as a notification comes, when an event happens or threshold met, e.g., saying "a lucky person H playing game T on date S", to make it easier to tag along.
Can do drag along in a syndicate or by manager choice, to force the new player for a min number of play, or time period or salary or fee or winning/losing or min engagement or min risk, or min dollar amount or percentage or events.
Can search on a phone or search engine for expert person.
Slot management system commands the devices and machines, to convert them to the proxy machines, or launching machines, or master machines for experts.
Piggyback on others' winning or success.
One can play on one machine and switch to proxy mode on the same machine at any time.
One can go proxy on specific game, or go to another casino, by online presence only.
They can be on the same system, or remote, or various entities.
Two casinos exchange values or dollar amount or percentages for the fees for handling other casino's proxy hosting or request, for the benefit of both casinos.
Having an exchange for fee exchange for all casinos participating.

One may be bored to play in a quiet small casino, but with large setting with crowd with much sound and view, through monitor or video, and many people winning with glamour, more people will play from remote.

The display shows the $2^{nd}$ hall or casino, from remote.

It can show the screen of other machine, or person playing, or both, or with option for the above.

If one wants a person, or game, or machine, as specific one, or one passing the condition set upon, or the threshold passed, as the basis, then, one can search for those as criteria, e.g. from remote, and tag along with some or all of them, by filtering.

Having threshold, e.g., when somebody losses, or start losing, or start winning, or loses more than X, or winning more than Y, or for period of X losing, or for period of Y winning, or any if-then condition, or any situation defined by another person's win/lose/combo with time axis defined, with range of time, range of percentages, range of values, or the like, as condition(s) for trigger, to bet or stop betting or start betting or switch between people or transfer between games and machines or casinos.

Expert or "lucky guy" or perceived lucky person or machine or event or time or game or casino or object associated with them, or favorite, or for location/time/constraint for a presence in a remote location, or as convenience for location and time, or being in multiple places and events: as basis for leader or betting event.

One decides based on reason or condition or event or trigger to bet/not-bet or reverse, or with no reason at all.

Next player or $2^{nd}$ player or remote player or novice player: following the leader.

Based on superstitious or lucky object/event, starting betting or stopping.

Sometimes, as option, mandatory, to drag along with the leader or expert or lucky guy, to drag along the new player, for some minimum number/amount of events/time/value/winning/losing/combo, as mandatory, min engagement.

Conditions/thresholds set by manager, expert, or owner: which can be as same people or different people/entities.

One condition: the hourly rate, or $/hr or percentages, for fee for work, for managing or playing or the like.

Owner of casino/game/machine/network is different from manager of syndicate, as one option.

Owner of casino is same as manager of syndicate, as one option.

2 casinos work as proxy, and helping each other or customers, and charge each other for proxy, hosting, or transfer, accordingly, as a fee or percentage.

It can be any system which is capable of doing the functions above.

Figure 37:
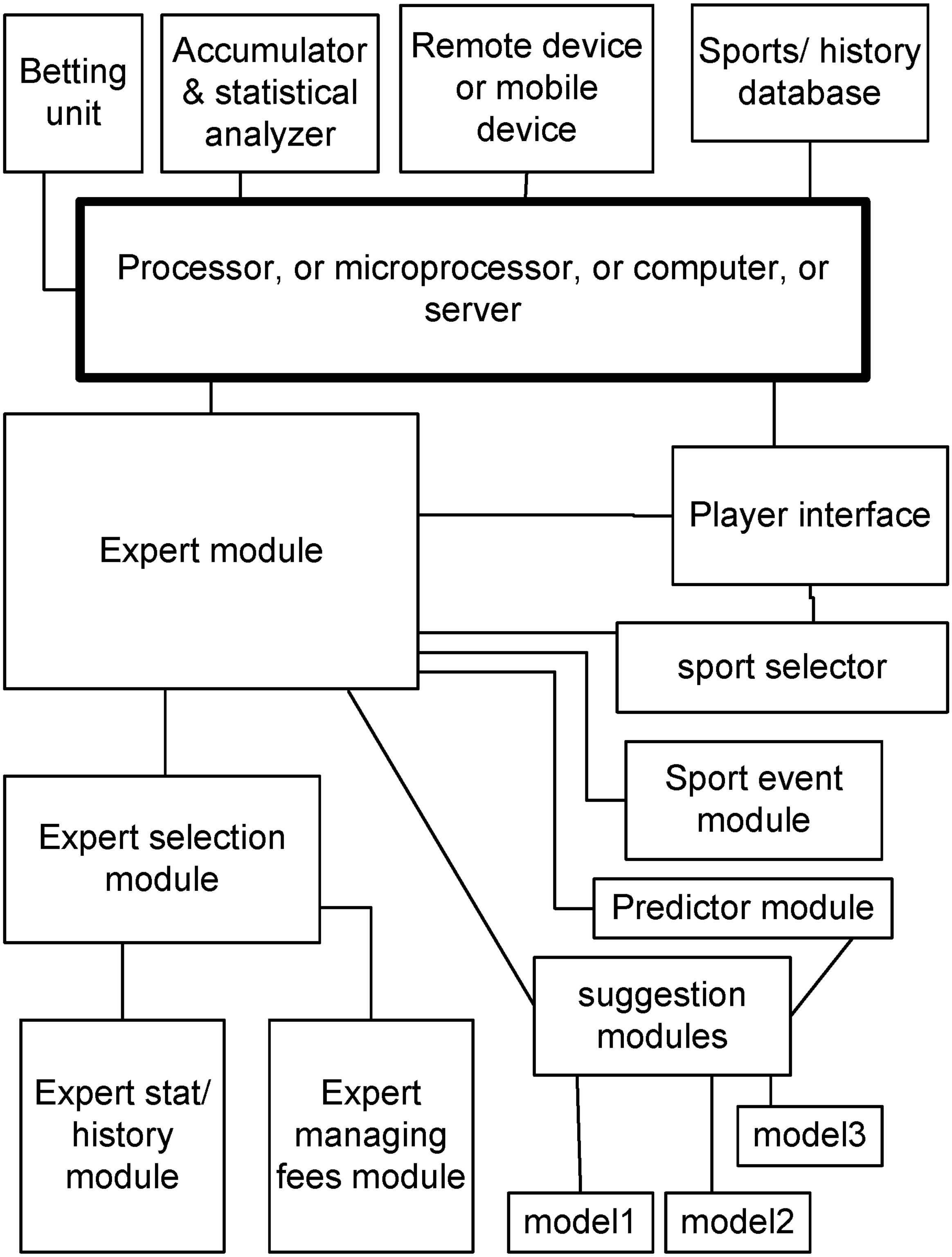
FIG. 37 is an embodiment for proxy betting system for different types of betting and their parameters.

FIG. 37 is an embodiment for proxy betting system for different types of betting and their parameters. In one embodiment, the player bets on sports/sports wagering, e.g., real games, fantasy games, or simulated games, or electronic table games or on devices, or real table games, at location or remotely. In one embodiment, the player is involved with enterprise wagering. In one embodiment, the player is involved from a remote location, e.g., off-site or out of state or out of country or off-shore or international location. In one embodiment, the player is pooling resources and assets from various parties, as a cash pool, and takes a lead. In one embodiment, the player bets on sports events, results, or combination of results, e.g., average scores in 5 games or for a season. In one embodiment, the dividend is paid on accumulated pool of bets in one syndicate, or as return on capital or investment. In one embodiment, the return is based on percentage, or min amount, or combination of them.

In one embodiment, the proxy betting is based on direct or indirect proxy role. For example, one may be proxy to another one, as a chain of proxies, that can extend more than one extension to multiple entities, e.g., similar to hierarchy or tree structure. For example, one may be putting bonds or guarantees for bets to be paid for himself or for others, as a cash reserve or equivalent, to back up the casino or game website, to make sure the bets are covered or backed by the house or casino or website. For example, one may be pulling the cash from other people on opposite sides of a bet to try to balance all winnings with losses of others, or alternatively, has a reserve for all winnings to be paid directly by the house, directly or as a backup plan.

In one embodiment, the platform for the betting is virtual, physical, electronic, on mobile device, mobile app, on phone, on tablet, on computer, on laptop, on cloud, call-in, PDA, at remote place, on computing or communication device, or the like. In one embodiment, the expert is sports writer, blogger, commentator, well-known person, or the like, to create or initiate a fund, for example, for sports or table games or racing or car racing or horse or dog racing, e.g., poker. In one embodiment, there are multiple types of games, or connected games, or network games with multi-players, remotely, on one or more machines or computers or devices. In one embodiment, the leader gets a percentage or fixed or combination or rewards or based on performance or formulas, e.g., as management fee, e.g., in all cases, or in the case of winning, only, or as a fixed salary, or as employee or contractor, for managing the pool.

In one embodiment, we have this for bookings such as horse, dog, car, or other racings. In one embodiment, we can select a person to choose whatever they choose themselves, to go for us, as well. In one embodiment, we can select a person to guide us or advice us or pick for us, but not obligated to listen to him 100 percent. In one embodiment, we can select a person to guide us, and we are obligated to listen to him 100 percent, blindly. In multiple embodiments, we can select a person to pick for us, or buy for us, or bet for us, or decide for us. In one embodiment, we can select a person to select winners or losers, e.g., in sports or teams e.g. basketball, with corresponding point spreads, and gets a commission of a fixed fee, plus a percentage of the winnings. In one embodiment, we can select a guidance and a guru or expert, and at the end of the year, e.g., the system rewards the guru's follower with the best results (e.g. in terms of income or rate or outcome or winnings or percentage or performance or average or overall or relative improvement) some grand prize, in addition to regular betting and winnings, that encourages following the guru in the future.

Other variations or examples are also covered here, as embodiments: live casino games, table games, sports betting, daily fantasy sports, and simulation sports, as well as betting on celebrities, friends, proxies, or someone who always bets on a specific team or teams from a specific town/area. Proxy or agent betting also includes sports betting. Syndicate or union betting is included, in which a single individual/company is betting on behalf of a group of individuals, with or without their input on specific events. Manager of Syndicate bets a salary and/or percentage of the win, in one embodiment. Group betting is included, where a number of betting entities pool on a single decision. Other variations include: Table games and sports betting, or fantasy sports and daily fantasy sports, or betting on experts themselves, as well as the games the experts pick, e.g., betting on experts against each other, or pool(s) of experts and/or betting entities. The expert/leader player is a regular person, a company, an entity, a marketing firm, an aggregator firm, a public relationship firm, an investing firm, an investor, a signing-up firm, an intermediary firm, a middleman, an agent, a celebrity, a smart person, an athlete, proxy on proxy, chain or proxy, nested proxy in proxy, for N chains, or a knowledgeable person. These also apply to point spreads, point totals for over/under, money-line wagers, fantasy sports, and daily fantasy sports, as various embodiments.

In one embodiment, for proxy, we have a player bet for or against or hedge against other player/group/machine/bank of machines/casino/casinos/set of games/set of hardware, which bet can be dollar for dollar/percentage base/for entire play time/limited time/time increments/handle pulls/switch from "for" to "against" and vice versa/switch to win after so many losses or so much losses and vice versa.

In one embodiment, the proxy plays along more than one entity, or can bet on multiple players at the same time, or distribute the funds or percentage or dollar value among them, based on formula and rules or predetermined settings beforehand or dynamically changed during the game, or triggered or changed based on conditions or events.

It can be view play and/or trend of play/player/specific type of game, in real time or with delay with page flip, and/or stock market style graphs or similar mechanism. Player is e.g. provided with analysis. Analysis can be emailed to player or multiple emails or saved into proxy player's account. It can be kept and accessed at machine level by player/proxy player/potential proxy players, at later time for review, with or without encryption/biometric access/free/for fee/subscription/membership/limited-time free access, as examples/options.

"Pro player" or fave/favorite player history analysis can be available for review at machine level or emailed or saved into proxy player's account. Proxy play can be many levels/layers deep. It can be for sports (or electronic sports). It can be betting on/against player of electronic game of chance and/or skill, or mixture of both, e.g., backgammon and chess type games. It can be pool style betting.

It can be betting on which original player wins more at the end (when one or both quit playing) (or by a predetermined time or period of time). This can be either players chosen at random by proxy player or players who are playing in a slot tournament. It covers basic slot machine (electronic game of chance) and other extensions in slots (electronic game of skill/chance and electronic game of skill).

It can be play casino games as a proxy player on a stationary unit with various ways to display games that are being played/winning/losing/how long they game has been going on/how much money the original player has left now/trend of current game/trend of day/trend of unit/trend of original player in general and/or today/this week/this year/years, or history and all statistics or comparisons between the featured players, with tables and graphs, or searchable based on databases and numbers and tables for various query and conditions for specific game or player or type of game or casino.

It can be the privacy set by the main player or agreed to show/announce/broadcast/publicize to others his statistics/winnings, to become famous and get income or percentage of win from it, as the player of choice for others, as the ones that are hidden from public are less likely being used as leaders for proxy games. So, the more the expert is public and the better the history, the easier for others to follow and bet on him, with more followers and less risk (for having access to known history for the leader/expert in the game, for people to follow, as proxy).

It can be play casino games on a portable device (i.e. tablet) as a proxy player and connect via wireless method (i.e. Bluetooth), or Internet, or cable or optical connections, to games that interest the public, as he/she, as a member of public, walks around and observes. Or, he/she follows a player that interests him/her, either physically or by logging into a system and follow his activity via his players card log in or his account specific to proxy play.

It can be play casino games as a proxy player via Internet, either only within the property or within city/county limits or within parameters of law of land or rules and policies of purveyor. For example, this allows player to play on his laptop or tablet from his room, while he rests or his wife gets dressed for dinner (with nothing else to do), making it very mobile and accessible at all times, thus, increasing the usages for public.

There can be a website specific to proxy gaming where players can research and choose what player/game/property/the like to follow and bet on. There could be many levels of membership that would allow anywhere from very limited to full access to various information for research and choosing. Also, wherever it is legal, much of proxy betting as explained above (and in older specs of the parent cases) can be done on/through this website.

There can be a communal gaming. There can be server based. There can be 100% passive gaming as secondary player, or partially, or active, or some portion active, e.g., choosing some parameters by the follower in the game, as e.g. 80 percent done by the leader and 20 percent by the follower, so that follower can feel that there is some contribution in the game so that it feels more exciting and involved in the game, in addition to following on the leader's result and relying on the leader, as well.

There can be a proxy machine would increase the number of popular machines. If a certain game happens to be very popular among players today, a property can still only get so many units of it. So, let's say there is a bank of 8 of those games on a floor, but there are probably another few players who wish they could be playing that game. If that game is now available to play at a proxy machine, the players, the casino and the manufacturer will all benefit from the extra player being able to play their favorite game. This will also provide a tool for management to gauge whether they should purchase more units of a popular game. Also, this way, with proxy, they can change games, as the popularity of the games change, and there is a shift on the most popular game, which simply can replace by proxy, without any need of real upgrade or substitution, which is very expensive and not practical at all in a short time period. This makes the game more flexible per device or machine to attract more people in.

Secondary player's game ends when the primary player stops playing. At this point, the secondary player gets a certain period of time to reserve the main game and walk over to the machine and begin his own game. First and foremost, however, the primary player gets a few seconds of grace period to insert more cash into his machine before a proxy player reserves it. Or, a new leader player can sit in or replace the original or they can switch or overlap or not overlap, or physically or in abstract, replace each other in the leadership position, for people to follow. This provides a great urgency for both players to decide whether they want to continue on the machine, for more demands for the machine.

In one embodiment, we have converting or reconfiguring a different machine to proxy or simulate or follow or act as said electronic gaming device; with some other options:

providing a user-interface for privacy setting.

The expert player has an ID, and hidden from public.

Using more than one experts, with access using fees, and filtered for privacy by expert.

Partially guided by expert.

Fully guided by expert.

Replace one expert with another one.

2 experts working together.

Bet against one expert & follow another one.

Hedge against one expert.

Reserve seat on a machine, by following an expert, or pay in advance.

Expert can sit more on same machine, within some time period.

Using guide on game of pure chance.

Using guide on game of pure chance, plus strategies and thinking.

providing proxy between a first casino to a second casino for a given game.

providing proxy between a first manufacture to a second manufacture for a given game.

providing proxy machine or virtual machine for a first entity, from a second entity;

charging fee or giving percentage for said providing proxy machine or virtual machine, or reservation fee, on said first entity, said second entity, said expert player, and/or said first player.

for a given game or type of machine or a specific machine, providing proxy machine or virtual machine or simulation machine.

providing proxy machine for future game played by another person, reserved for a user.

providing proxy machine for delayed game played by another person, reserved for a user.

providing proxy machine for future game played by another person, reserved for a user, for a predetermined time in future, already set by said user, for a given machine or game or type of game.

providing proxy, with no input from a user.

providing proxy, following a machine or computer device or randomizer computing module, as a leader to follow for proxy mechanism.

In one embodiment, we have the following features and situations, as any one or in combination of:

manager can limit betting on expert and suggest follower to bet on next best/available expert.

events that may or may not necessarily be considered or categorized by all as sports, e.g., horse racing, dog racing, poker, car racing, etc.

fantasy sports considered an "event" or "sports event". The teams are made up of athletes who do not all usually play on the same team, therefore, there is most likely not a real singular game that would be a sporting event. However, the results of the imaginary team are made of the tally of individual events in each member of the imaginary team's actual day/week/month/season/year that happens in a real game/event, to obtain the imaginary score or goals scored for each player, to contribute to the imaginary team, so that one team may win based on total or average scores from all players/contributors selected by the user on that imaginary team.

follower can bet on one or multiple experts' bets (within category or time period or the like) for monthly/weekly/daily/season/event/tournament membership fee and win prizes.

also, top experts can get prizes.

manager or expert can allow exact scenario of bet on an event (e.g., for choices, setup, fantasy lineup, pick, team versus team, player versus player, position versus position, fighter versus fighter, and the like) to be duplicated by follower to place a different amount of bet and/or to be used in a different tournament.

follower of a bet can be in the form of contest, and not necessarily a direct cash bet, with direct cash winnings designated or calculated by sports book line makers or similar methods.

follower can bet on expert and/or on expert's bet and/or expert's scenario of bet.

all of this could happen without the expert's real identity, e.g., expert could play under fictitious name or nickname, if he/she or manager chooses so.

expert and/or management can or may limit who and how gets to follow each expert.

team play with two or more experts.

team play with two or more followers.

expert bet can be zero in dollar amount (or the suggestion of a bet).

manager can charge a flat rate, instead of/in addition to a portion of winnings.

manager could charge rates on various or variable parameters, or using formulas or tables.

results based on daily groupings, or daily results.

results based on fantasy sports events.

sports events based on teams made up from players that do not necessarily play on the same team in reality. However, their individual actions/successes/failures create a tally of points that directly affect the tally of a would-be team that these individuals could have made, if they played together in one team, e.g., using averaging or total or median values or scores or points.

side-betting and/or real-time side-betting allows one to bet on a game that they never had either the time or the know-how to place a viable bet on.

In one embodiment, we have the following features and situations, as any one or in combination of, as a fun idea for TV or live event:

group of experts sit in a room and are cut off from the game that is going on live. They make some predictions, and viewers make real-time bets on their favorite experts' predictions/bets for the next quarter/half/segment or the like.

future bet for the whole season: allocate $1000 to an expert, or multiple experts to follow them throughout a designated period of time, or until a date, or until money runs out, or until money hits a high threshold, or until money hits a low threshold, and/or within a time limit.

In one embodiment, we have the following features and situations, as any one or in combination of:

group of experts.

follower bets on expert's opinions, or predictions.

In one embodiment, we have the following features and situations, as any one or in combination of, as a TV show:

a TV show that can support and promote proxy betting in a fun, yet, effective way. It can of course be technically streaming or part-streaming.

Bet on Me/Top Dog/Expert scenario.

We have a male and a female host. They can, but do not have to, be pro athletes. Maybe, the male is an ex player. Maybe, the female is a regular person, and she has a new guest host each time. Each episode will have four celebrity panelists. They can be pro athletes, actors, models, etc. It can have a social media celebrity among the panelists, at least once every other episode, in order to get an added target audience. The show begins with a 10 or so minutes of introduction before an actual game starts. This portion can be filmed days in advance. The audience are refreshed on the rules of the game and the panelists will be introduced. They rib on each other and talk smack about each other's knowledge of the upcoming game or sports in general. The atmosphere is very comedic. The Panelists will make predictions on a various parameters or events such as outcome of each quarter, half, or entire game, or even what celebrity will be at the court side. They will then make a case about why the audience should bet on them to come out on top. There is an app and a website for the audience to place their choice on which panelist will win the game. They can bet on who will win the entire game, or more of whose specific predictions will come true.

The panelists' predictions have not been revealed to anyone. After each quarter (or similar break) the panelists' picks for the last quarter will be revealed, and as they are gloating or justifying, the audience will have a choice to change their ballots in real time and ditch their panelist, depending on the sport and time constraints, portions of the panelists/hosts banter and comments can be either only heard on TV, or be on a smaller portion of the screen. It will also be streaming on the app and the website. Panelists get bragging rights or get paid money, e.g., given to their charity. Audience will win prizes anywhere from cash, car, cruise, sporting event tickets, court side seats, meet the athletes, etc. There will also be a huge end of season prize for audience member with highest score(s). The app can keep the action and flow of information and excitement about the next event alive.

In addition, viewers at home and/or studio can qualify or be picked at random or be picked by other criteria, to win or be eligible to win various prizes.

"Joe Nobody": There will be a reality or scripted or improvised show that directly ties into the above gameshow. Regular people (or Joes) who believe that they can outwit the celebrity panelists, will vie to be on the show as a competing panelist and to become a celebrity in their own right. There may be a series of requirements to be met, such as a proven track record on predicting elements, or other parameters of sporting events, as the panelists from above gameshow do before one could be considered to be in the running. Or, perhaps, they have to meet a minimum threshold on number of followers they have on various social media sites, or maybe have a viral video with a minimum number of views. These "Joes" may be chosen from smaller competitions within categories, such as physical location of where they are from or where they live, and we may end up with for example Western U.S. champion vs Eastern U.S. champion, facing off in the end to get the coveted seat. Or, perhaps, a tournament style approach is held to find one winner. This all could also be per year/per season/per sport/college sports/pro sports/etc. There may be a second and third or more prizes, as well. The prize may or may not be limited to getting a seat at the table. There may be cash or other forms of prizes. The camera will follow these would-be candidates as they qualify and ultimately compete in order to get the seat at the table with celebrity panelists. In addition, viewers at home and/or studio can qualify or be picked at random or be picked by other criteria to win or be eligible to win various prizes.

Followers can rate experts, and experts can rate followers. All participants can rate each other, and can be rated by computer, by manager, by syndicate, or the like. (on a rating system based on various parameters such as honesty, skill, risk taking, knowledge, etc.)

All participants may be asked for ID verification. So, even if they do not reveal their identity to other players, they can only play as one individual, or if they have more than one online persona, the manager or the company will not allow participation of two personas of same player where there could be a conflict of interest.

In different situations or scenarios, followers and experts or followers vs followers, and the like, players are matched up or put in categories based on a tiered level. This is done based on their history and level of experience, level of expertise, monies or prizes won, follower ratings, expert ratings, etc.

Maybe, if they want they can opt to move up and play against tougher opponents. (Or, opt to move down and play against lesser capabilities.) In each case, the company may deny that option or other participants could be notified and have the option to either deny the player from their current group or opt out of the game, if they are in minority vote.

In one embodiment, we have the following features and situations, as any one or in combination of:

player or expert ranking may be specific to each sport.

there will be a query or search to find a variety of the following:

1—type, level, rank, bet level, win/loss ratio, or the like of the players

2—type, amount, etc., of the bets placed.

3—search by results in dates, seasons, games, sports, etc.

All search results can lead to secondary search to other type of search. For example, a search from 3 (above) yields an answer, but you still need to know who placed that bet and how they did. So, you can search from each search result and find answer to other search categories.

There is a two-step process when a bet is placed by a follower: FIRST the money or the order for the bet goes to the expert account. SECOND the bet is placed with website or management or company, etc., with minimal to no time delay.

In one embodiment, we have the following features and situations, as any one or in combination of, for a game show:

The show is in the style of a gameshow with a source and a few layers and switches. The source is mainly a "Game or Sporting Event". The Layers consist of, but are not limited to, "Players of the game or sporting event", "A Host or Hosts", "Celebrities or Influencers", "Experts", "Studio Audience", and "Home audiences, or Viewers". Not all layers will be a part of every episode. The switches will be the choices, actions and/or consequences of them that are made by various layers.

Another component is an app or apps and/or a website and/or a telephone number and/or other modes of communications, contact and/or social media, for audience and/or other layers' participation.

The changes in relations between all components mentioned above will create slightly different versions of the show. Change in choice of source will also have an effect on the rules or outcome of the show. (For example, the difference between a game or a sporting event with single players or multiple players, or having teams of single player events, etc.)

Based on the above explanation, the show may vary by episode or by season.

An example of a show or an episode or a season (in this example, the game is a competition in video game of NBA basketball): The show opens with a host introducing herself and her co-host. He/she will then proceed to introduce the modes of audience participation and encourage people to download the app and sign up. He/she will then explain the rules of the show and introduce the celebrity/influencer panelists. The panelists will make predictions before the game begins and the audiences can choose a panelist to follow or to vote for or to bet on. An animation or ticker will show each panelists progress as the game goes on. This ticker/animation could also reflect or show chances of any qualitative outcome by a party as of any given time.

Choices:

1—During each break, audiences can change their pick of panelist if they feel their current pick is not going to do well in the next portion of game.

2—The audience pick is locked in for the duration of the game.

3—The audience will get to hop from one panelist to another only once during the entire game.

4—The Audience vote or bet as stated above can also be against one or more panelist.

The above choices may also apply to the player picks by panelists. If the panelists have these choices, then if they do change their pick, this change may be open or hidden from audiences for more fun and excitement.

Choices:

1—At the end of each episode, one or more players will be eliminated and the rest will move forward with all panelists, or some panelists can also be eliminated.

2—the show can just end with one winning player/team.

3—team can consist of panelist and player.

4—Winning team and/or panelist can choose the next category of type of game to be played in the style of e.g. the show "Jeopardy".

5—The season can begin, move forward and end tournament style, based on certain categories or criteria, e.g., same as an NCAA Basketball tournament being based on rankings and geographical placement of teams.

6—The winner can be a single player, a single panelist, a team of players, a team of panelists, or a team of panelists and players.

7—Audience participants can win from a variety of prizes including but not limited to monetary prizes, digital prizes, virtual prizes, cars, travel, future points related to future seasons, or the like.

8—There may be only first place winners or more than just first place winners from one or more layers.

9—There can be a tournament style competition similar to choice 5 from above between players and the panelists, which may come back all season long as player gets eliminated. Or, there may be new panelists each or every few episodes. Or, some of the panelists may stay and some may be replaced.

In one embodiment, we have the following features and situations, as any one or in combination of:

A method of conducting a game of chance, said method comprising: a processor receiving a name of an expert player from an expert database; wherein an electronic gaming device comprises said processor; said processor receiving a history and statistical data for performance of said expert player from a performance database; said processor displaying said history and statistical data for performance of said expert player on a device monitor; selecting said expert player for a syndicate for said game of chance on said electronic gaming device; a first player choosing said expert player from said syndicate's database; a second player choosing said expert player from said syndicate's database; said expert player betting a first value of currency on said game of chance on said electronic gaming device for a sport team, winning, outcome, final ranking, relative ranking, remaining teams, monthly groupings, weekly groupings, playoffs, point spreads, racing event setup, card game setup, real sport setup, or sport fantasy game setup; adding said first value of currency in a bucket of money; said first player contributing a first contribution money on said expert player; said second player contributing a second contribution money on said expert player; adding said first contribution money to said bucket of money; adding said second contribution money to said bucket of money, if said bucket of money has a balance lower than a first threshold; warning said second player that a limit is reached, if said bucket of money has a balance equal or more than said first threshold; giving said second player another choice of a second expert; said processor producing a first outcome for said expert player betting said first value of currency on said game of chance; said electronic gaming device communicating with a remote device; said processor producing a second outcome for said first player betting said first contribution money on said game of chance on said electronic gaming device for a sport team, winning, outcome, final ranking, relative ranking, remaining teams, monthly groupings, weekly groupings, playoffs, point spreads, racing event setup, card game setup, real sport setup, or sport fantasy game setup.

A method of conducting a game of chance, said method comprising: a processor receiving a name of a first expert player from an expert database; said processor receiving a name of a second expert player from said expert database; wherein an electronic gaming device comprises said processor; said processor receiving a history and statistical data for performance of said first expert player from a performance database; said processor receiving a history and statistical data for performance of said second expert player from said performance database; said processor displaying said history and statistical data for performance of said first expert player on a device monitor;

said processor displaying said history and statistical data for performance of said second expert player on said device monitor; selecting said first expert player for a first syndicate for said game of chance on said electronic gaming device; selecting said second expert player for a second syndicate for said game of chance on said electronic gaming device;

a first player choosing said first expert player from said first syndicate's database; said first player choosing said second expert player from said second syndicate's database; wherein said game of chance on said electronic gaming device is for a sport team, winning, outcome, final ranking, relative ranking, remaining teams, monthly groupings, weekly groupings, playoffs, point spreads, racing event setup, card game setup, real sport setup, or sport fantasy game setup;

said first expert player betting a first value of currency on said game of chance; said second expert player betting a second value of currency on said game of chance; said processor producing a first outcome for said first expert player betting said first value of currency on said game of chance;

said processor producing a second outcome for said second expert player betting said second value of currency on said game of chance; said electronic gaming device communicating with a remote device; said first player betting between or against performance of said first expert player versus said second expert player, using said first outcome and said second outcome.

A method of conducting a game of chance, said method comprising: a processor receiving a name of a first site from a site database;

said processor receiving a name of a second site from said site database; wherein an electronic gaming device comprises said processor;

said processor receiving a history and statistical data for performance of said first site from a performance database; said processor receiving a history and statistical data for performance of said second site from said performance database;

said processor displaying said history and statistical data for performance of said first site on a device monitor, as an average, aggregate, maximum, and minimum; said processor displaying said history and statistical data for performance of said second site on said device monitor, as an average, aggregate, maximum, and minimum;

selecting said first site for said game of chance on said electronic gaming device; selecting said second site for said game of chance on said electronic gaming device; wherein said game of chance on said electronic gaming device is for a sport team, winning, outcome, final ranking, relative ranking, remaining teams, monthly groupings, weekly groupings, playoffs, point spreads, racing event setup, card game setup, real sport setup, or sport fantasy game setup;

said first site betting a first value of currency on said game of chance;

said second site betting a second value of currency on said game of chance;

said processor producing a first outcome for said first site betting said first value of currency on said game of chance; said processor producing a second outcome for said second site betting said second value of currency on said game of chance; said electronic gaming device communicating with a remote device; a first player betting between or against performance of said first site versus said second site, using said first outcome and said second outcome.

A method of conducting a game of chance, said method comprising: a processor receiving a name of a first expert player from an expert database;

said processor receiving a name of a second expert player from said expert database; wherein an electronic gaming device comprises said processor;

said processor receiving a history and statistical data for performance of said first expert player from a performance database;

said processor receiving a history and statistical data for performance of said second expert player from said performance database; said processor displaying said history and statistical data for performance of said first expert player on a device monitor;

said processor displaying said history and statistical data for performance of said second expert player on said device monitor; selecting said first expert player for a first syndicate for a first game of chance on said electronic gaming device;

selecting said second expert player for a second syndicate for a second game of chance on said electronic gaming device;

a first player choosing said first expert player from said first syndicate's database; said first player choosing said second expert player from said second syndicate's database; wherein said first game of chance on said electronic gaming device is for a sport team, winning, outcome, final ranking, relative ranking, remaining teams, monthly groupings, weekly groupings, playoffs, point spreads, racing event setup, card game setup, real sport setup, or sport fantasy game setup;

wherein said second game of chance on said electronic gaming device is for a sport team, winning, outcome, final ranking, relative ranking, remaining teams, monthly groupings, weekly groupings, playoffs, point spreads, racing event setup, card game setup, real sport setup, or sport fantasy game setup;

said first expert player betting a first value of currency on said first game of chance;

said second expert player betting a second value of currency on said second game of chance;

said processor producing a first outcome for said first expert player betting said first value of currency on said first game of chance; said processor producing a second outcome for said second expert player betting said second value of currency on said second game of chance;

said electronic gaming device communicating with a remote device; said first player betting between or against performance of said first expert player playing said first game of chance versus said second expert player playing said second game of chance, using said first outcome and said second outcome.

A method of conducting a game of chance, said method comprising: a processor receiving a name of a first syndicate from a syndicate database; said processor receiving a name of a second syndicate from said syndicate database;

wherein an electronic gaming device comprises said processor;

said processor receiving a history and statistical data for performance of said first syndicate from a performance database;

said processor receiving a history and statistical data for performance of said second syndicate from said performance database; said processor displaying said history and statistical data for performance of said first syndicate on a device monitor, as an average, aggregate, maximum, and minimum;

said processor displaying said history and statistical data for performance of said second syndicate on said device monitor, as an average, aggregate, maximum, and minimum;

selecting said first syndicate for said game of chance on said electronic gaming device; selecting said second syndicate for said game of chance on said electronic gaming device;

wherein said game of chance on said electronic gaming device is for a sport team, winning, outcome, final ranking, relative ranking, remaining teams, monthly groupings, weekly groupings, playoffs, point spreads, racing event setup, card game setup, real sport setup, or sport fantasy game setup; said first syndicate betting a first value of currency on said game of chance;

said second syndicate betting a second value of currency on said game of chance; said processor producing a first outcome for said first site betting said first value of currency on said game of chance;

said processor producing a second outcome for said second site betting said second value of currency on said game of chance;

said electronic gaming device communicating with a remote device; a first player betting between or against performance of said first syndicate versus said second syndicate, using said first outcome and said second outcome.

said game of chance on said electronic gaming device is a racing event for cars, dogs, horses, or animals.

said game of chance on said electronic gaming device is a fantasy sport setup for basketball, football, soccer, baseball, or volleyball.

said first threshold is set at factory.

said first threshold is set by casino.

said first threshold is set by admin or owner.

said first player switches or changes expert in middle of a session.

said first expert player and said second expert player watch a live sport game or event, up to middle of said live sport game or event; wherein said first expert player and said second expert player move and cease from viewing said live sport game or event, after said middle of said live sport game or event; wherein said first player bets between or against performance of said first expert player versus said second expert player, after said middle of said live sport game or event; wherein said first player is permitted to switch experts after said middle of said live sport game or event.

a manager choosing said expert player.

converting or reconfiguring a different machine to proxy or simulate or follow or act as said electronic gaming device.

providing a user-interface for privacy setting.

providing proxy between a first casino to a second casino for a given game.

providing proxy between a first manufacture to a second manufacture for a given game.

providing proxy machine or virtual machine for a first entity, from a second entity; charging fee or giving percentage for said providing proxy machine or virtual machine, or reservation fee, on said first entity, said second entity, said expert player, and/or said first player.

for a given game or type of machine or a specific machine, providing proxy machine or virtual machine or simulation machine.

In one embodiment, we have the following features and situations, as any one or in combination of:

Not betting, but supporting or voting on a fantasy sports bet with a raffle style or daily membership fee, or the like, and win from pool of cash or prizes.

Pool of Red tickets ($5), Blue tickets ($10), Gold tickets ($50), etc.

All in support of Joe's picks. If Joe wins, each pool is divided evenly among each ticket in each pool.

Follower is not betting on anything. He is allowing the expert to use his expertise and skill, and play with the follower's money. It is the two-step process that we talked about elsewhere in this spec. The money goes into expert's account, and then immediately out to where the expert's play/prediction/bet/etc. goes.

Or, there's a secondary/parallel account for expert where the follower's money goes through. This avoids the model that the follower is actually "betting".

The follower can basically "copy and paste" the expert's bet/prediction/advice and use it in a different pool/team v team/top half v bottom half/one v one game or bet or play or the like.

Also, use the verbs/actions of "rooting, cheering, supporting, voting, favoring, applauding, boosting, or advocating" along with or instead of/in addition to the verb/action of betting.

The influencer/expert may have a list of multiple picks/suggestions/choices/votes on outcomes/combination of multiple outcomes/in-game events or the like, that the follower picks from.

Or, instead of a list, they may be in different or separate places.

In-game event is something like a slam dunk in a basketball game by a team or a certain player.

Or, a home-run in a baseball game. Or, other events positive or negative in other sports. An example of negative would be an accident or an injury or missing a penalty shot or lack of some event or absence of an event or player or condition.

Also, use influencer along with the word expert, or instead of, or in addition to.

An example of multiple outcomes is a bracket in March madness college basketball.

Have an interaction with the social media: We use "LIKE" wherever we use "bet, follow", or the like, or we use "DISLIKE", to bet against some event, condition, parameter, player(s), outcome(s), or team(s).

We use "LIKE" for both the expert and the follower.

Example: Expert "LIKES" a team's chances in a certain way to win, or score or do better in second half, etc., and the follower "likes" the same thing based on the expert's opinion or knowledge, etc.

The "sport event" may be a mock event like a celebrity charity game where a couple of teams comprised of celebs and/or athletes or retired athletes compete against each other to raise funds for charity.

On the proxy concept, in one embodiment, the slot machines are games of skill. So, it is a variety in between skill and chance.

EXAMPLES used for horse racing, car racing, or dog racing.

Example

For fantasy sports, when you are creating a team for yourself, you pick athletes from across the entire sport to place in each position and create a team that is mostly unique to you.

As an expert who will have followers choosing one athlete per position may not be enough. So, expert can choose a variety of players for each position and therefore create not a definite team, but in effect a "smaller pool of athletes from which a follower can pick and choose from based on various reasons". This way, the follower still does not have to do research and vetting. But if for any given reason, he does not choose a particular athlete, then he can simply move to next choice, as the expert has already done the research for him, as a filter.

One option: the manager or managing company or website can act as the/an expert.

An Embodiment

Multiple followers can bet (and all other verbiage alongside "bet") in one single pool with the expert. In other words, if Joe is an expert, a group of people can add funds to Joe's bet, until the bet is actually placed or otherwise locked-in. The bets can be same amount each, or different amounts. The participants get proportionately paid out of winnings.

In real physical locations of sports or horse race or dog race etc., for betting, online, or fantasy sports, it can be presented to the patrons a variety of easy choices for placing a bet, for interface, e.g., in the form of buttons to push or boxes to check or the like.

An Embodiment

We have sports betting within sports betting, or expert v expert, or site v site.

Sites compete against each other based on their top tier winners

Or, based on their total daily winnings and/or seasonal winnings or each sport or other divisions or all various divisions.

One can say each fantasy site will be like a team. Fans can make various bets on entire site's performance, individual contender performances, top contenders v top contenders, tier v tier, or the like.

In one embodiment, we have the following features and situations, as any one or in combination of:

The sports/events/games at casino or other locations.

Real sports, fantasy sports, horse/race track.

Can bet on bet, or bet on site, or bet on a team within a site.

Quick-pick option: somebody chooses for the user, or makes research for the user.

Can say: up to limit X dollars, bet on that, or use a bucket, until it fills up to its dollar limit.

Sports betting within sports betting, as people wage e.g. on athletes, e.g. on record setting or on history.

Bet on wager people, as they have their own records/numbers, to boast or brag about.

4 combinations:

fantasy sports betting within sports betting
sports betting within fantasy sports betting
sports betting within sports betting
fantasy sports betting within fantasy sports betting e.g., a quarterback in a real team, if he scores or wins, it has effect on both real sport betting and on fantasy sport betting, with him as a member of the team.

Bet on average, aggregate, performance, score, difference of score, or differential, per day or week or season or the like.

Sites hire experts of betting for their site, with following features or options:

a bank e.g. max at 20K$
hypothetical situation or real
using their own money
encouraging participation/jump start regular people
set amount of dollar A player, if he is a risk-taker, he can lose or win a lot. One can bet on that person, or bet on highest bet or betting person or winner or on a site or elements of a site.

All of the situations discussed above, as a proxy agent.

Syndicate: such as football league: compete between sites or teams.

Tournament style fantasy sports and leagues and tiers.

Using dice in games, for outcome, based on expert's opinion.

Accumulate money in one pot.

Use a hub, e.g., office hub, to collect money for bets, from interested employees, and split the winnings proportionally later on based on ratios and percentages recorded so far.

Expert: percentages, on the top of total so far.

Add to the hub, until max allowed or finished betting, or statistics or odds of winning changes, or the bracket or table of dollar winnings changes, or moving to a new bracket.

e.g., 2 dollars entry fee into contest.

Games of skills.

Groups of N people.

Betting M top versus M bottom.

Expert putting no money, but gives advice or guidance only, and still can follow him/her.

Video games: teams: e-sports.

In mid-game, can change the bets.

In mid-game, expert(s) are cut off from game, to predict the game from a separate room.

If an odd of somebody winning is e.g. 10:1, or 10 to 1, then if too many people bet in, the odds change/shift, and the tables/ratios/winnings/lines get skewed and titled or biased or shifted. The admin can limit participation of people, when it gets close or beyond the threshold for the time when the tables/ratios/winnings/lines get skewed and titled or biased or shifted.

Fantasy, as contest: make up teams, different for each user. Or by very low probability, may be the same for 2 users. Or by design and duplication, one team copied from another user.

It involves strategy and it is a game of skills, not just a pure gambling/chance.

Pick scenarios, not just bet.

Bet that e.g. this week John wins more than Jack in their bets.

Follower can use cash or credit, to bet.

Proxy bet on expert.

Can set dollar values/thresholds for all parameters in the betting process, as min/max.

Can automatically put in e.g. X dollars in the bank, and then follow a leader or expert, up to max daily value of e.g. Y dollars, or split between many experts, or between bets, or between sessions, or until all used up.

Can set parameters in the game by many actors, e.g., follower, expert, manager, leader, casino, admin, factory, game developer, owner, user, or the like.

In TV show, voting by audience at home or studio, for following, directions, amounts, betting on bets, betting, proxy betting, for fantasy sports, or the like.

Using mobile devices, phones, or apps, to bet.

To choose a player, e.g., a great soccer player, it may be at high demand, or premium value, or subscription value, or limit by casino, or limit by game, or limit by the soccer star himself, or the like, to notify the user that the star is taken already or not available now/anymore. So, user can have a backup person as a $2^{nd}$ best choice, or more backup lists/people, to fill its place. User can hedge that, too, for the bet.

Final ranking based on expert, real team, general prediction, index, votes, average public opinion, parameters, or another fantasy team/game.

Seasonal/daily changes on score/ranking.

2 or more experts in the field: which one wins more? The most? Dollar amount? Ranking? Versus each other? Success? Relative success? Thresholds? Bet on any of the above.

Book makers use statistics to get/set the odds.

Bet on experts, celebrities, etc., as commodities, as intermediary in between, and another layer or shell for such purpose.

Thresholding: condition: e.g., if (y>x), then winning table/odds are different now.

Thresholds: set by experts or users or managers or followers or the like, and not go beyond some given odds/stops there, with odds not changing anymore.

One embodiment: the odds of an event changes, as a function of time.

Experts v experts, teams v teams, or the like.

Daily team change, unique to a user, and following the scores accordingly, for fantasy sports team, as a function of time.

In one embodiment, we have the following features and situations, as any one or in combination of: A method of conducting a game of chance, said method comprising: a processor receiving a name of a first expert player from an expert database; said processor receiving a name of a second expert player from said expert database; wherein an electronic gaming device comprises said processor; said processor receiving a history and statistical data for performance of said first expert player from a performance database; said processor receiving a history and statistical data for performance of said second expert player from said performance database; said processor displaying said history and statistical data for performance of said first expert player on a device monitor; said processor displaying said history and statistical data for performance of said second expert player on said device monitor; selecting said first expert player for a first syndicate for said game of chance on said electronic gaming device; selecting said second expert player for a second syndicate for said game of chance on said electronic gaming device; ranking said first expert player versus said second expert player; said processor choosing parameters or teams or sport players for said game of chance on said electronic gaming device, for a first player, based on said ranking, or randomly based on a random seed value, or based on a third expert player available at a central location for advice or getting followed; said first player betting a first value of currency on said game of chance on said electronic gaming device; wherein said game of chance on said electronic gaming device is for a sport team, winning, outcome, final ranking, relative ranking, remaining teams, monthly groupings, weekly groupings, playoffs, point spreads, racing event setup, card game setup, real sport setup, or sport fantasy game setup; said processor producing a first outcome for said first player betting said first value of currency on said game of chance; said electronic gaming device communicating with a remote device.

In one embodiment, we have the following features and situations, as any one or in combination of: A method of conducting a game of chance, said method comprising: a processor receiving a name of an expert player from an expert database; wherein an electronic gaming device comprises said processor; said processor receiving a history and statistical data for performance of said expert player from a performance database; said processor displaying said history and statistical data for performance of said expert player on a device monitor; selecting said expert player for a syndicate for said game of chance on said electronic gaming device; a first player choosing said expert player from said syndicate's database; said expert player recommending a parameter of said game of chance on said electronic gaming device for a sport team, winning, outcome, final ranking, relative ranking, remaining teams, monthly groupings, weekly groupings, playoffs, point spreads, racing event setup, card game setup, real sport setup, or sport fantasy game setup; said first player contributing a first value of currency on said expert player for said parameter of said game of chance on said electronic gaming device; said processor producing a first outcome for said first player betting said first value of currency on said game of chance; said electronic gaming device communicating with a remote device.

In one embodiment, we have the following features and situations, as any one or in combination of: If a user does not have the knowledge or time to know the game or sport or know all the professional players in the sport or game, then he may rely on an expert, or just get a quick pick from a machine for sports or games or slot machines, based on first available suggestion or expert, or expert at desk on duty, or randomly, or based on current ranks of experts being available, from top to bottom. This can be for specific week, season, events, games, subcategories, sports, or the like. This can be automatic pickup. This can be for live at booth at physical location or on an app for mobile device or phone. For example, it can be 200 dollars on slot machine, with subcategory or no subcategory option, or e.g., having cutoff after 20 minutes, for table versions or games. For example, it can be for:

- Certain machine or device
- Certain expert
  - E.g., when expert shows up
  - Or reserve amount for when expert comes
- Certain manufacturer
- Certain location(s)

In one embodiment, we have the following features and situations, as any one or in combination of:

- game of chance is for slot machines.
- game of chance is for apps or casinos.
- game of chance is for different types of machines or games.
- game of chance is for casinos, based on apps, booths, or machines.
- game of chance is for specific time period or periods or limited to a start or finish time or a time range in the future, for betting period or periods.
- game of chance awards cash, reputation tier, gifts, points, mileage score, bragging rights, non-cash awards, credits, or other scores.
- the betting stops, after total losses is more than a loss threshold.
- the betting stops, after the time is more than a time threshold.
- the betting continues, as long as total wins is more than a win threshold.

the betting is stopped or is disabled when said first player's location is outside perimeter of a casino, or outside a geographical boundary, or outside a city or county coordinates, determined by said first player's global positioning device or mobile device or by triangulation method.

In one embodiment, we have the following features and situations, as any one or in combination of: The expert just gives advice and with no betting in dollar value. So, he is selling his expertise/advice, instead.

OCB & One-Click Link/Function/Trigger, for the Convenience of the Users/Improve User Experience:

In one embodiment, we have the following features and situations, as any one or in combination of:

1. Game of skills and/or chance
   The expert can be followed by others.
   Or, any person with no specific skills can be followed by others.
2. TV show integration
3. Player vs player situations
4. One click betting/linking/functioning/triggering, in our environment, or OCB
5. Tipster scheme
6. Social network scheme, with a website belonging to our platform
7. Charity scheme
8. Pari-mutuel betting in our environment: all bets of a type in a pool, where any winning can be shared, after the house or casino deduction for fees,
9. Proposition betting in our environment
10. Multiple leg/parameter situation: where only a subset of decisions is relied upon on a 3rd party, and the rest are decided by the 1st party, herself In one embodiment, we have the "electronic" game. In one embodiment, we have it in multiple forms: teams or multiple players. In one embodiment, we have, for example, fantasy sports, where bettors/gamesters create fantasy teams by picking real athletes from various teams. In one case, we have two bettors that can put portions of their teams together and form one team. For instance, two bettors (A and B) have made all their picks for this week's or today's fantasy match. Except B now realizes that his offense is somehow lacking, or one of his chosen offensive players gets hurt. Also, for A, the same thing happens to his defense, with injury. So, now, A and B can play as a team, that is formed of A's offensive line and B's defensive line.

In one embodiment, we are betting on portions of someone else's fantasy team in order to compete, or a multiple of N parts in a team coming from N people/bettors. In one embodiment, we have a TV show or an app-based show or Internet-based or streaming or any other type of mass media, to coordinate for our betting system, or gets integrated with it.

In one embodiment, we have OCB, which can mainly be on premise of proxy, as a bet made or composed by an expert or a source or artificial intelligence module or a regular person or an influencer or celebrity (referred to here as a "third party"), to suggest to an end user who desires to bet on sports or fantasy sports or electronic-sports, a prediction for event/events within an event/game/tournament or final outcome of that game, to place a wager on (a "bet"), by providing a link, a button, or a text, for the ease of operation for said end user (referred to as "bettor"). This can serve as a short-cut so that the bettor will not have to do his/her own research, nor would he need to know how to place a bet, or the industry lingo or anything else that can make one capable of placing a bet on his own, in a brick and mortar sports book or online or on an app. The bettor can be either someone who does not know how to conduct the activity of betting or does not have the time or desire to do the work. Much like when you order food to be delivered to you, it is because you either cannot or do not want to make your own food.

In one embodiment, we have OCB link, which shows up on a smartphone or laptop or desktop ("device") lock-screen, or when the device is unlocked. The link will redirect the bettor to a licensed sports book site or a social gaming site, based on what site is known to device or what site knows the device. Or, if the link is designed to redirect to a specific site only, then the bettor has to register once and enjoy the OCB convenience going forward. Or, he can choose to bet as a guest, if possible/option exists for that site.

In one embodiment, if the bet is just a regular bet that is a part of a regular menu of a sports book, then it provides a link in a notification form to invite the bettor to enjoy an easy OCB process. OCB process is the idea of bypassing all research and knowhow or steps of placing a wager by pressing a simple link/button/menu. The link can show the bettor multiple options on amount of wager, for example, $5, $10, or $20, either in form of a dropdown menu or a bubble or any other form/windows/interface. It could also offer a variety of bets in the same fashion. The OCB works with money wagers and/or non-monetary wagers. It works on sports book sites or apps or brick and mortar locations.

In one embodiment, the bettor signs into his favorite site, and there are OCB links waiting for him in his portal. Or, he signs onto or checks into or looks at his favorite influencer's portal and sees OCBs ready for use by followers. Or, when bettor looks in his own social media, he sees notifications regarding OCBs from various influencers. Or, bettor only changes his settings to see specific influencer(s). Or, influencers provide OCBs on their social media feeds and bettor or potential bettors or future bettors see the OCBs and choose to partake. Notifications maybe set based on favorite influencer/s, favorite team/s, favorite sport/s, favorite tournament/s, etc. (favorite is a loose term here, with a very broad meaning).

In one embodiment, one basic premise is that for example for purposes of marketing or keeping your customers engaged, as a book maker or a casino or a betting company, you would send out a link either in an email, a text, a tweet, or a post in social media that can redirect them to the licensed site to place bet. Also, this way, you can have many entities that form a business with no betting license, around posting bets, that will redirect people/aggregate people to a licensed company site or app.

In one embodiment, on peer-to-peer bets, competing against others in performance of your bets, or outcome of your bets, over a sporting event, or a tournament or a season or an event within an event (proposition bet), works as proxy betting.

In one embodiment, let's say as a scenario: You are a customer or a "bettor" on a betting site. The site decides to hold a site-wide competition among all bettors for a grand prize, a second prize and a third. This can be over a particular event or over a tournament or a season. The bettors may not have to do anything other than their regular betting. Or, perhaps they buy or opt in for being a party to the competition. Or, this competition is conducted with play-money and not real dollar. Or, each player starts with a set amount in their bin and the player with highest bank wins at the end, or is a part of the winning group with the highest bank value. Or, the competition is held over social media and can span over multiple betting sites or casinos. This can be done as individuals or as teams. Or, a three-man team is formed by teaming up of a bettor for each sport of e.g. 1—soccer, 1—football and 1—basketball.

In one embodiment, we have the following:

1—The idea of a ready bet link to be placed on any unlicensed media, to act as a pass-through portal (or intermediator or marketing agent or PR or ad agent) to bring or redirect end user onto a licensed site to place bet, as is, or adjust portions of the bet, with editing tools available to the user.

2—A link that does not necessarily have the intended bet in its body, but it has graphics of a bet and brings or redirects end user to a specific location on a licensed site to place a similar bet to suggestion of graphics on or near the original link.

3—The link can be placed by a licensed entity or an unlicensed entity.

In one embodiment, we have the following (collectively, called OCB for the sake of brevity):

"one link bet"

"one click bet" (OCB)

having a ready to go type of identification of a customer, based on existing technologies of thumbprint and face ID and biometrics and voice recognition, or similar, from a 3rd party. To have customers consent for certain activities is built in, during this process.

In one embodiment, we have the following: If the identity, payment information and age or other eligibility parameters of device owner are already verified, then the device owner can place a One Click Bet as a guest, and not even have to register on a site. A 3rd party, such as Facebook or Paypal or credit card or bank or a central server/location/service, can verify the person, as a proxy, without disclosing the real name and identity of the user, as a shield for privacy or security of the user, while having a trusted 3rd party confirming the user inside its shell.

In one embodiment, the potential winnings resulting from the bet can be sent back to same device, based on consent given at time of purchase, or a notification can be sent to device based on said consent, so the bettor can now go back to site and register to collect his winnings.

In one embodiment, we have the following:

1—OCB can use user's location to determine what and if there's legal limitations on betting, based on state or local laws, and so redirect them properly or save their info and notify them, when betting does become legal. Meanwhile, they can bet socially and with play/fake-money, as entertainment.

2—OCB can target end users as a blanket marketing method by location. For example, send out bets for the Red Sox to Boston and surrounding areas.

3—OCB can send multiple links and give end user options to bet on more than one, or opposing bets.

4—OCB can send opposing bets to all spectators in a stadium during a sporting event for fans to bet and/or for opposing fans to compete against each other and/or for fans of same team to compete amongst themselves.

5—OCB can send in-game bets. These are bets on events that can happen during the rest of the game, as the game has begun. The odds can change during the game, to adjust the rates and ratios/probabilities.

6—OCB links can appear on a betting site/app in various pages, before the sporting event begins and/or appears, as the event goes on. For example, as you are watching the game on your device, a link appears to allow you to bet on an event during the game, or multiple links or opposing links.

In one embodiment, we have the following: For e-sports or electronic games of skill, games were played against the machine. Then, there was competition between two players. However, now, if the prize is put up by the two parties themselves, then it is considered betting against each other. Or, there is any other type of betting taking place on the outcome of a third party's game of skill.

In one embodiment, we have the following:

As end user or bettor chooses a betting site, he signs up with necessary info, such as ID, payment info, etc., he can also pick favorites among sports, teams, athletes, cities, or upcoming events, to receive tips on. The tips come in the form of OCB, in one example.

Often between the time of scheduling and the actual game day, the line/probabilities/odds change a few times. We need to have previously sent bets to expire, updated, or replaced. In one case, both versions co-exist, but any new bets go on the 2nd or newer version. Bettor can also buy points.

In one embodiment, we have the following: Once you place a bet, you will be given the opportunity/option to do:

1. Let a circle of friends know you placed this bet.
2. Post the fact that you placed this specific bet on your chosen social media feeds, e.g., Facebook or Twitter.
3. This notification will give your friends the opportunity to:
   a. repeat your bet.
   b. be provided with a bet that challenges your bet.
   c. simply be redirected to where he can place another bet/different bet/s.
   d. explore the bet site, on his own.
   e. register to the bet site.
   f. do OCB, using the social networks info, automatically or easily, with min. number of steps.

In one embodiment, we have the game of skill. In one embodiment, we have bets placed on bets that are designed by third party.

In one embodiment, we have a link which can be in form of a series of questions that lead to end user's best fit for a bet, or make a profile of preference or character or behavior for the user. This will also play as a tool to collect data on particular customer in order to serve him better (also, to collect general data on consumers for better marketing or service or secondary offerings or related services). Another benefit of the questions would be that it would serve as a tool of acclimating customers to betting and teaching them how to bet. For example, the questions could begin by "which is your favorite team in the upcoming game?" and "Would you like to bet on who wins it, and on by how many points they win?" or "Would you like to bet on which team scores first?" or the like. So, at this point we are almost creating a customized bet for a customer who would not know how to bet on their own. This can be rule based or based on decision tree, going into details with more specific bets, based on initial interest/feedback, guiding the bets/users.

In one embodiment, we have a link that can be of a large bet that people can fill. So, for example, I send out a link for a bet for $5000, but I have only put $200 in there, and now, there is $4800 to go. So, if my friend sees it and wagers another $200, there will be room to participate for up to another $4600, and each participant can fill a portion of it, or as syndicated betting.

In one embodiment, for the purpose of customer acquisition, a betting site can send a bet link along with free start up cash equivalents for betting only. For example, it can say:

"Our experts believe the Patriots will win tonight by 12 points. Press this link to place that bet, and to receive $200 in free bets."

In one embodiment, as the line/bets/ratios change, the link for the bet at the old line will now place the bet based on the current line. Or, the link has to expire and redirect to new bet that is based on a new line. It can apply to both physical locations and online betting for e-sports in real money or play/fake/token money or prizes or coupons or discount certificates.

In one embodiment, we have e-sport betting on proxy situation, or real sport, or car racing or horse racing, or 3D VR game with virtual reality goggles/accessories, or elect, game, or chess-type or backgammon-type, or strategy or chance or combo game. In one example, it can be video or arcade or computer games, such as PacMan game or shooting games. A person can get a score. A person can finish a task faster. Two can play against each other, or more people, or as a team, or versus another team, such as a green army against a blue army in a shooting game, or one vs more people, as who wins the game or scores higher, or alternatively, one can play against computer or game itself, with no human competitor directly. However, the performances can be compared to another person later on, based on the score or points in a game, played against computer or game itself, with no human competitor directly.

In one embodiment, we have two people in game playing against each other, betting in various forms on the outcomes, or a 3$^{rd}$ person does the same, which a 4$^{th}$ person outside can follow or get advice from the 3$^{rd}$ person on these bets and results, based on 1$^{st}$ and 2$^{nd}$ persons' performances, which is a proxy situation.

In one embodiment, we have different line or probability/risk/ratio/odds for outcome, e.g., after some time. For example, the line might be 7 points or better for a given game, before the game, but it may change during or just before the game, due to injury or bad news about the team/players, which will change the odds drastically. The proposal for the bet or template for the bet can be texted or emailed or broadcasted or displayed on a big board in casino or on laptop or smart phone or database or website or on similar fashion/system. It can be recommendation with or without option to change the parameters or numbers by the users.

In one embodiment, we have different risk tolerances with different ratios or odds, and different outcomes/winnings/ratios, to be offered for various players with various tolerances with the risk/odds, e.g., high, medium or low risk situations. This produces various lines and proposals and opportunities for bet for the users/options, which rely on various events/news, e.g., for various sources, to change odds/line/ratios, accordingly, due to change of risk/odds. The multiple lines may replace or co-exist, or expire, or have a new version. The person can sign up regularly, or by social networks, e.g., Facebook account, or through Google email, or known website, or security company, or trusted organization, or PKI authentication, or bank/credit cards, or membership in a club, or the like.

In one embodiment, we have one link/click/trigger/function/menu/operation, to directly connect and sign up for all the details for ease of use and quick registration for the user, to save hassle of new registration every time. The betting based on/over/following a 3$^{rd}$ party on e-sports or video/computer/electronic games, or for others mentioned here in this disclosure, is a proxy situation, for results, scores, ratios, differences, first events, time of events, the order of events, somethings is happening, something is not happening, specific events, or the like.

In one embodiment, we have fixed bets, or templates, or variable parameters for bets, or adjustable bets, or variable by time, or based on formulas bets, or based on tables or graphs bets, or designed or recommended by a 3$^{rd}$ party, or the like.

In one embodiment, we have in a casino or building for bets/events, whenever a person enters, using her face recognition or ID from his phone/tel number, the casino can detect, track, or recognize him, which can direct the person directly to the most likely website for the taste of the user for betting, based on history and other personal data, for marketing, and also possible or optional automatic or one click registration for the website, e.g., from smart phone or laptop, to get in, with prior data registered or downloaded or re-used or certified or confirmed, e.g., for passwords, credit card number, age, location, name, charge account, or the like, for convenience of the user, so that it is easier to get in and bet, for more traffic/commerce.

In one embodiment, we have detected a person in place A, so that it sends him to the related or main bet website/link, automatically, or with option/with one click/trigger. It can go to a marketing site where it sends it to the main site, under license from government, or go directly to main website/link, or using a script to do the same. The recognition can also be done by fingerprints or voice recognition/signature or hand gesture for commands or mapped gestures for functions or barcode or biometrics for authentication. The convenience for betting and registration helps for more traffic and ecommerce.

The proxy helps for people who do not have the knowledge of betting or subject, or do not have time, or have low interest as one person, but may become very excited/interested in/as a group, with their friends, to have fun/for entertainment purposes. It can be with fake money or real money. The OCB can include multiple steps/moves, as one unit or multiple actions by the user, which optionally can be combined in one, only.

In one embodiment, we have repeat on a bet. A bet can be that S is better than G in this game or event. It can be on a TV show or Internet broadcast or Twitter type method, where people can choose or vote for the best or most popular player/expert video player, or funniest player, which may not be the best player, with various votes and scores, for categories or various parameters. It can be game of chance only, or skill only, or both combined/combo. The proxy does not have to be expert. It could be just an ordinary person, e.g., on a slot machine or e-sports. TV show can complement the casino business/website. The statistics and experience/history of the leader is shown to all users to evaluate before following or become follower of the leader or expert, e.g., at website or on display at casino or advertised at Facebook to attract friends or strangers to follow him. The leader does not have to be expert or highest score. For example, it may be the funniest player or the most fun player to watch, or the guy with the highest/most votes, followers, or watchers/most admired. So, he does not have to be the best player in terms of score or skills. That would be only a subset of that umbrella/superset, which we can call here as an/the "interesting player", to cover all these situations/cases, mentioned in this disclosure, including the best player in terms of score/skills. This ("interesting") is just a title for designation to cover all (not an adjective, necessarily, for all situations). (The topic/subject of bet can also be anything "interesting", or "not interesting", in general, in different examples/situations.) Note that the interesting player, in general, can be any third party person. In casino or slot-type games, in one example, one bets on a game or follows somebody else, based on game being interesting, or player being interesting, or he does not know the rules or game, or he does not have the time to follow the tournaments, or wants to be involved with a group of friends for fun, or for similar reasons. As shown in Background section above from prior/parent applications, we have a general/broad definition of expert or interesting player: It can be used for people who are at different casinos or machines, or who cannot physically be there, or cannot afford to go there, or do not have time to go there, or the specific game is not there at the current location. The proxy scheme can help all of those people/situations. It can be used for a 1$^{st}$ person, who thinks that the 2$^{nd}$ person is an expert or lucky or has luck or is on a lucky machine or on lucky streak or on a roll or has more chance of winning or has a lucky object, or has those impressions mentioned above, regardless of the actual data or validity. So, in those cases, the 1$^{st}$ person wants to be in his place, or wants to be there, or wants to sit on that machine and play, instead or with the 2$^{nd}$ person.

In one embodiment, we have online or in casino or on smart device/phone/watch. It can be social casino with fake money/tokens. A player can joke and tease another, or challenge or brag/trash talk (or remind the loss of his friends to him), directly in the game or in social networks/Facebook or others, or on board or in casino or on phone or on chat or on Twitter or in similar settings. The players can go against each other or against the house/casino/computer/game. The office coworkers can team up or pool together against another branch or group. One person may be expert or good at it, and can have 1000 followers, who can compose the bet, and send the hyperlink/link to the friends to follow/support on his bet/lead. It can be on his portal or on casino's or at his friends'.

In one embodiment, we have a tipster with expertise with followers on website with subscriptions or per use payment. He can predict the game well, and the history and percentages/scores show his accuracy so far, or the amount won for himself and others, for credibility and future reference/resume for future followers to compare or choose or drop him. The casino can hire the leader or expert as contractor, e.g., if he wins 20 dollars, it may not share anything (not necessarily, as an option), but if he loses, up to 30 percent goes to the leader. So, the leader gets money for losses, but if he loses too much he would also lose the followers very fast which is very bad for his business or income. So, he has to try to be as best as he can for the long-term business survival/continuity. So, it is a self-correcting/adjusting mechanism for bad leaders and good leaders in the long term in the market/list. The mechanism for payment can vary as well, e.g., for winning situations, as well, with percentages, as an example, or some limitations on max or min or revenue, or based on table/curve/formulas/cases, shown on the contract.

In one embodiment, we have link from famous athlete or actor or celebrity, with their OCB feature and recommendations for followers. Influencer or leader can use his money or others or syndicate or bucket from others for pooling money. For celebrities, they may use charities, with percentages of winning for casino or website going to the charity, in loss or winning cases, to help charities in this process.

In one embodiment, we have 2 pots or more for winning between friends, each with its own parameters that one can contribute in the total. Generally, odds of winning between players are higher than against the house/casino, but the bets can be adjusted based on those facts/odds/ratios.

In one embodiment, we have prop-bet or proposition bet, before or during the game, e.g., for bets like: "Who scored the first goal?" or "Who comes from the bench at the 2$^{nd}$ half?" or similar conditions or events. The user can change the bet or edit that, as one example.

In one embodiment, we have multiple legs or parameters for the decision or bet, where some of those components come from a leader, and the rest from other sources or other leaders or the user himself (not relied on any leader). The teams or individuals or officemates or communities or sites or leagues can compete and challenge each other in a rivalry for better bets/more wins. They can bet on teams, cities, leagues, or individuals in sports.

In one embodiment, we have a bucket for extra prize, which is given to best player or divide at the end equally between all or the best player in the losing team or N people will get it or one (or M people) gets all at end by elimination. In one embodiment, we have an avatar for user with a character controlled by the user, which can affect or gets affected by the outcome. The bet can be on the derivative of the outcome or game. The OCB can go through marketing site or intermediate site or skip all of those to the main/licensed betting site. The OCB helps marketing and repeat customers and more traffic, for ease of use.

In one embodiment, the data from OCB can determine the location and age of the user, for proper website and choices, e.g., if the state or the age does not allow the gambling or betting, then the person can get a choice for social betting with fake money, or gets directed to those websites, e.g., automatically. One can record and display the video on Youtube or similar sites for marketing to show the skills or results, e.g., for video games, e.g., PacMan, for history/experience/scores/skills/statistics.

In one embodiment, one can have different tiers for free or fee/subscription/percentage for leader's fee, or ads on the site. For betting, one follower from game for team A versus B can bet on another set of game between C and D (other teams), which may eventually meet up at a later time with the winner of A versus B. The leader can be selected from TV or YouTube, using video or display, by the judges or people, as talent show, or audition. The pot/bucket for accumulated fund can become very large, collected from a team of people.

In one embodiment, we have the following:

Customer Acquisition Marketing Focused Game Concepts: (Some of these were Originally Described in Our Parent Cases:)

SHADOWBET™

Third parties place bets on behalf of a player (or team of players), wagering their betting pools in one or more contests on their behalf. These third parties may be separate from, or part of a collection of bettors provided by the operator. The third party "ShadowBettor" is awarded a portion of the betting pool or a set fee for their effort, regardless of the outcome of the wagers they make.

EASYBET™

Send predefined promotional wagers (by both amount of bet and game type) to your potential customers via SMS, social media or email.

If the player takes advantage of this "free wager", some or all of the amount won can be cashed out immediately, or after one or more conditions set by the operator, such as:

- After the winnings have been wagered one or more times.
- After a defined period of time (e.g., one week) has elapsed.

After another external triggering condition, such as an onsite visit or placing a wager on a social gaming platform.

Requiring the player to use the winnings within a window of time, or else it expires.

It is also possible to present a basket of EasyBets™ to potential customers, driven to the portal from the original EasyBet™, triggering several new rounds of engagement.

BETWITHME™

Imagine seeing a friend's tweet; they just placed a $20 wager on their hometown football college team, and the tweet invites you to join in. You click the link and now it is two of you, in for forty bucks. Two days later, your friends have seen you and your friends wager and have started to join in. Now, there is over a dozen of you and $300 bucks in play.

Now, a week later, and this tweet has bounced back and forth through dozens of your friends and friends of friends in social media. Unbelievably, over 250 of your fellow alumni have nearly six thousand dollars of action in play, and it is spreading through Twitter, Facebook and Instagram.

It is easy to imagine a scenario where, by the time the game kicks off, there are thousands of friends, family and even strangers who have thrown in behind this display of team loyalty, representing thousands of dollars of college football wagering action.

BetWithMe™ harnesses the power of social media and influencer marketing. What if, for example, one of the people in that pool ended up being a famous singer/artist/celebrity/sport's icon?

Combined with virality and potential mass media pickups, this one original twenty-dollar wager could become one of the most exciting, spontaneous gaming events across multiple markets, and with no attendant risk for the operator, as all wagering is pari-mutuel, pool-based gambling.

BETFORME™

Imagine a GoFundMe style wager as part of a Bride and Groom registry who are big fans of a football team. As a part of their wedding registry, they ask family and friends to place a bet through a simple link. Guests click the link and enter the bet amount.

Now, it gets interesting: the bride and groom can choose to cash out some or all of the total wagers (minus a small transaction fee), until a countdown locks them out. But, if they let the whole thing ride, they can receive an upfront gift from the betting site, win or lose (and the betting site has profiles associated with all the friends and family, as a result of participation.)

Peer to Peer (P2P) Game Concepts:

3MANSCRAMBLE™

This is a guaranteed-winner, micro-transaction side game associated with another game. The bettor wagers in a 3ManScramble side game, choosing a $2 or $5 side bet, together with two other bettors randomly selected by the system, as a team of three, for example. The outcome of the side bets are added together, and all teams are ranked based on their team scores.

In one variant of the game, at the end of the day (or week, event or time period), the highest aggregated team score, displayed on a leaderboard, wins a prize. In another variant of the game, only the highest scoring member of a team counts, and each transaction's high scores are aggregated to determine which team wins the bonus award. With unlimited ways to configure the scoring process, you can create any level of interest and complexity that the wagers would be attracted by, including options like rolling over winnings or scores to the next event, or high/low/averages to determine transaction-based scoring.

SPORTSBETTINGBINGO™

Works with any sport/contest

Play across one or several contests

Proxy play with individuals or teams

A celebrity, for example, a celebrity/sport's icon leads a panel of two to three celebrity guests, who during the show, declare propositions on outcomes of the game. These could be propositions, point spreads or any other predictable outcome, across one (or multiple) games. After the guests make their prognostications ("Bets"), the celebrity has the option to agree with, and back one of their sets of picks. At this point, the celebrities picks are "locked" in the system.

Players may now select one or more of these bets as a micro-transaction, which are added to a virtual bingo card ("Card"). As the game (or games) play out, Bets which turn out to be true are marked on the Card. The first player or players to get a Bingo on their Card share in/get the pool contributed to by everyone's micro transactions. Additionally, if a "Bingo" is made, comprised of Shaq's backed picks, the players share in/get a bonus award.

BESTBET™

Imagine a tournament event, where in addition to participating in the tournament itself, participants and viewers can bet on the tournament participants, wagering that they will win (place or show) in a ranking compared to the other tournament participants in a winner-take-all meta-bet! As you are betting your own money on who is going to win, you are also challenging other bettors to see who the best performer is in the present arena.

BETROULETTE™

Players pay a fee—it could be two dollars, five dollars, a hundred dollars, or a menu of tiered wagers, to get randomly assigned to e.g. twenty pre-designated bets. If the player is unhappy with one or more of their randomized bets, they can pay a micro-transaction fee to re-randomize one or more of those bets. If you were lucky the first time, congratulations! If you were not so happy with what you got, you can try your luck again . . . and again . . . and again.

BETROULETTEBATTLEROYALE™

This is a variant of BetRoulette™ where, in each tier of bettors, the best performing player wagers within a tier takes home ALL THE MONEY.

BETGURU™ (BETBOSS™)

This is syndicated betting. It is very similar to GroupBet™ except only one person (the Guru) makes all the decisions (including the maximum/total amount of the final bet). Others may join his bet by contributing to the maximum/total amount wagered. Once the maximum amount wagered by the participants in the GroupBet™ is reached, at any time, there could be just one or several BetGurus available for players to join (this is the choice of the operator based on the situations of the event being wagered on).

BETGURU™ H2H

This Head to Head (H2H) variant of BetGuru™ competes 1v1, 2v2, or more, in a Head to Head contest.

BETGURU™ SERIES CHALLENGE

In this variant of BetGuru™, each group invites challengers to compete in a series of several challenges within an event or a season.

BETGURULEAGUE™ (BETBOSSLEAGUE™)

This variant of BetGuru™ competes groups against groups in a tournament bracket-style competition.

FANTASYCOLLABORATIONBET™ (Players Building the Perfect Team Collaboratively)

In FantasyTeamCollaboration™, you do not have to shoulder all the responsibility for creating your perfect Fantasy Team. Collaborate with others by offense, defense or other components of the team, to create your perfect Fantasy Team Collaboration!

FANTASYTEAMMATCHUP™ (Individual Players Grouped Together)

An extension of FantasyCollaborationBet™, the system randomly groups two or more teams, and the outcomes of those determine their group ranking on a leaderboard for competitive awareness. Do not like your team? Pay a microtransaction to trade randomly with another team before the countdown timer locks in the matchup!

FANTASYCOLLABORATIONLEAGUE™ (Players Bringing their Own Defined Teams)

In this variant of FantasyCollaborationBet, players bring their own defined teams (rather than randomly being placed).

FANTASYOFFICEPARTY™

In this variant, two or more fantasy sports bettors invite coworkers, family or friends to bet on which Office participant will perform the best. The wagers and rewards could be social (just for fun) currency, actual money or prizes.

SPORTOFFICEPARTY™

In this variant, instead of fantasy sports, two or more bettors with real (or imagined) sports betting knowledge invite coworkers, family or friends to bet on which Office participant will perform the best. The wagers and rewards could be social (just for fun) currency, actual money or prizes.

In one embodiment, OCB, as one example, is any particular or semi-particular bets that are predesigned so that the bettor can place bets without his own research, and by accepting a third party's research/suggestion. This predesigned bet can simply 1—exist on any licensed or unlicensed website, and 2—a link can redirect the bettor to a licensed site, regardless of whether said link is found on a betting site or on social media or blog or a tipster site, and whether it is openly suggesting for anyone to place the bet or it is passively placed/suggested, as long as there is a link nearby that can bring bettor to where the bet is placed, directly or indirectly.

For e-sports or any electronic game of skill, chance, skill & chance, alone or in combination, as an example, whether on regular casino floor, or a special designated area, or in form of a slot machine, or played on a PC or Mac, or on a limited area network or similar, or on the Internet or similar, or on one's own gaming device, or one one's own computer, or on other's device, is generally about anyone betting on the outcome of any third party's game. This can even be a player who relies on the outcome of another player's game to win collective victory (teammates), as one embodiment.

The outcome is not limited to win or lose. It can be outcome of events or actions within a game. For e-sports, an example is placing a wager or a bet that is designed based on such outcomes, as described in details in this disclosure.

One embodiment is for proxy betting, as follows: A method of conducting a game of chance and/or skills, with method comprising: a processor receiving a name of an interesting player from an interesting-player database; wherein an electronic gaming device comprises said processor; said processor receiving history and statistical data for performance of said interesting player from a performance database; said processor displaying said history and statistical data for performance of said interesting player on a device monitor; selecting said interesting player for a syndicate or proxy for said game of chance and/or skills on said electronic gaming device; a first player choosing said interesting player from said syndicate or proxy's database; wherein said game of chance and/or skills is related or based on one or more of following: a sport event, an electronic sport event, a fantasy sport event, a video game, a computer game, a telephone-based game, an Internet-based game, a car race, a horse race, an animal race, a casino game, a card game, a backgammon-type game, a chess-type game, a board game, a table game, a slot machine game, an electronic game, a network-based game, a software game, a virtual reality game, a simulation game, a reality game, a TV show game, or a laptop game, regarding or related to: sport team, winning, outcome, final ranking, relative ranking, remaining teams, monthly groupings, weekly groupings, playoffs, point spreads, racing event setup, card game setup, real sport setup, sport fantasy game setup, video game, racing event, scores, games, or any other results.

Wherein an award or currency won or obtained in said game of chance and/or skills is related or based on one or more of following: coupons, real currency, fake or play currency, bitcoin or electronic money, discount certificates, certificates, free-stay or free-food at a hotel, discounts, foreign currency, coins, gold, silver, jewelry, tokens, plastic or metal coin-type objects, social money or currency, charity contribution, score, mileage, bragging rights score, travel discounts, use of services or objects, corporate sponsored services, objects, or merchandise, commercial objects, gifts, surprise winnings, future discounts, credits, cash, debit cards, credit cards, account deposits, credit line, bills, rewards, awards, or prizes.

The interesting player setting up a first bucket of fund; wherein said first bucket of fund has a total value set by said interesting player; said first player contributing to said first bucket of fund, up to maximum of said total value; wherein said first bucket of fund is connected to an event or condition, related to said game of chance and/or skills, with some risk or odds associated with occurrence of said event or condition; said interesting player making a first bet or recommendation to bet on said event or condition, on said game of chance and/or skills; said interesting player announcing said first bet or recommendation to bet, on said event or condition, through said electronic gaming device, a social media outlet or media or network, an electronic mail or email, a media format, Internet, private network, computer network, cloud, server, server farm, chat, texting, SMS, messaging, chat forum, blog, blog forum, storage on cloud, edge devices, electronic board, laptop, computer, watch, telephone, screen, monitor, casino device, casino board, display, social broadcasting, sound broadcasting or media, electromagnetic broadcasting or media, optical method, on paper, on mail, on storage media, storage device, or an electronic device.

The first player noticing or receiving said announcement by said interesting player regarding said first bet or recommendation to bet, on said event or condition; said first player following or recording said interesting player regarding said first bet or recommendation to bet, on said event or condition; said first player betting on said first bet, on said event or condition, with a first risk factor for said event or condition; in case said event or condition is satisfied or occurred, said processor calculating a first winning value for said first player, based on said first risk factor for said event or condition, based on said contribution to said first bucket of fund by said first player, and based on all rules and conditions set for said electronic gaming device.

Wherein said first winning value for said first player is based on said award or currency won or obtained in said game of chance and/or skills; an accounting unit disbursing or transferring funds, objects, certificates, or documents related to said first winning value for said first player, to said first player; said accounting unit calculating a leader's award, percentage fee, or reward, based on said first winning value for said first player, for said interesting player: said accounting unit notifying said interesting player regarding said leader's award, percentage fee, or reward; said accounting unit transferring or sending said leader's award, percentage fee, or reward to said interesting player.

With the following options:

said interesting player setting up a second bucket of fund.

said second bucket of fund has parameters and risk factors different from those of said first bucket of fund.

said second bucket of fund has a maximum contribution different from said maximum of said total value, associated with said first bucket of fund.

a second player contributing to said first bucket of fund.

presenting a template for bets.

editing a template for bets.

producing a new parameter for bets.

aggregating funds for bets.

providing funds for bets with various risk factors.

updating an offer to bet.

comparing all bets.

expiring an offer to bet.

sending a new version of an offer to bet.

competing against another participant.

competing against said electronic gaming device.

using a mobile device for betting.

paying by a mobile device.

connecting with others by a mobile device for betting or pooling.

using encryption or biometrics to authenticate on a mobile device.

One embodiment is for "one-link/direct/trigger betting", as follows:

A method of conducting a game of chance and/or skills, said method comprising: a processor receiving a name of an interesting player from an interesting-player database; wherein an electronic gaming device comprises said processor; in case said electronic gaming device or a first player enters a specific area or location, or in case said electronic gaming device gets into a specific mode or state, then providing a link to a registration module; said first player selecting or activating said link to said registration module; said registration module accessing to a database, registry, or storage for information about said first player; said registration module getting said information about said first player from said database, registry, or storage; said registration module automatically registering said first player into a site or device for said game of chance and/or skills; said registration module automatically providing a user interface for said site or device for said game of chance and/or skills to said first player; said user interface for said site or device providing a syndicate or proxy for said game of chance and/or skills, through an interesting player; said user interface for said site or device receiving history and statistical data for performance of said interesting player from a performance database; said first player choosing said interesting player from said syndicate or proxy.

Wherein said game of chance and/or skills is related or based on one or more of following: a sport event, an electronic sport event, a fantasy sport event, a video game, a computer game, a telephone-based game, an Internet-based game, a car race, a horse race, an animal race, a casino game, a card game, a backgammon-type game, a chess-type game, a board game, a table game, a slot machine game, an electronic game, a network-based game, a software game, a virtual reality game, a simulation game, a reality game, a TV show game, or a laptop game, regarding or related to:

sport team, winning, outcome, final ranking, relative ranking, remaining teams, monthly groupings, weekly groupings, playoffs, point spreads, racing event setup, card game setup, real sport setup, sport fantasy game setup, video game, racing event, scores, games, or any other results.

wherein an award or currency won or obtained in said game of chance and/or skills is related or based on one or more of following: coupons, real currency, fake or play currency, bitcoin or electronic money, discount certificates, certificates, free-stay or free-food at a hotel, discounts, foreign currency, coins, gold, silver, jewelry, tokens, plastic or metal coin-type objects, social money or currency, charity contribution, score, mileage, bragging rights score, travel discounts, use of services or objects, corporate sponsored services, objects, or merchandise, commercial objects, gifts, surprise winnings, future discounts, credits, cash, debit cards, credit cards, account deposits, credit line, bills, rewards, awards, or prizes.

The interesting player setting up a first bucket of fund; wherein said first bucket of fund has a total value set by said interesting player; said first player contributing to said first bucket of fund, up to maximum of said total value; wherein said first bucket of fund is connected to an event or condition, related to said game of chance and/or skills, with some risk or odds associated with occurrence of said event or condition; said interesting player making a first bet or recommendation to bet on said event or condition, on said game of chance and/or skills; said first player receiving a notice regarding said first bet or recommendation to bet, on said event or condition; said first player betting on said first bet, on said event or condition, with a first risk factor for said event or condition; in case said event or condition is satisfied or occurred, said processor calculating a first winning value for said first player, based on said first risk factor for said event or condition, based on said contribution to said first bucket of fund by said first player, and based on all rules and conditions set for said electronic gaming device.

Wherein said first winning value for said first player is based on said award or currency won or obtained in said game of chance and/or skills; an accounting unit disbursing or transferring funds, objects, certificates, or documents related to said first winning value for said first player, to said first player.

With the following options:

said accounting unit calculating a leader's award, percentage fee, or reward, based on said first winning value for said first player, for said interesting player.

said accounting unit notifying said interesting player regarding said leader's award, percentage fee, or reward.

said accounting unit transferring or sending said leader's award, percentage fee, or reward to said interesting player.

said interesting player setting up a second bucket of fund.

said second bucket of fund has parameters and risk factors different from those of said first bucket of fund.

said second bucket of fund has a maximum contribution different from said maximum of said total value, associated with said first bucket of fund.

a second player contributing to said first bucket of fund.

presenting a template for bets.
editing a template for bets.
producing a new parameter for bets.
providing funds for bets with various risk factors.
updating an offer to bet.
expiring an offer to bet.
competing against another participant.
competing against said electronic gaming device.
using a mobile device for betting.
paying by a mobile device.
connecting with others by a mobile device for betting or pooling.
connecting a mobile device with another mobile device for betting or pooling.

One embodiment is for "social network integration in betting system", as follows:

A method of conducting a game of chance and/or skills, said method comprising: a processor receiving a name of an interesting player from an interesting-player database; wherein an electronic gaming device comprises said processor; a first player connecting to a social network, forum, chat, email, broadcast, or platform; said first player contacting one or more friends through said social network, forum, chat, email, broadcast, or platform; said first player inviting said one or more friends to play or bet with or against said first player, or to team up with said first player, or to follow said first player, or to be followed by said first player, or to organize a pool for fund, or to organize a pool for bet, or to organize a team, or to organize a league, or to coordinate a fund-raising, or to brag about said first player's scores or wins, or to trash-talk said one or more friends to challenge said one or more friends to play or bet with or against said first player, or to get attention or encouragement or respect from said one or more friends, or to brag about said first player's expertise or skills, or to get recommendations or tips from said one or more friends.

The first player receiving an option or choice for an interesting player; said first player choosing said interesting player, as a syndicate or proxy for said game of chance and/or skills; said first player receiving history and statistical data for performance of said interesting player from a performance database; wherein said game of chance and/or skills is related or based on one or more of following:

a sport event, an electronic sport event, a fantasy sport event, a video game, a computer game, a telephone-based game, an Internet-based game, a car race, a horse race, an animal race, a casino game, a card game, a backgammon-type game, a chess-type game, a board game, a table game, a slot machine game, an electronic game, a network-based game, a software game, a virtual reality game, a simulation game, a reality game, a TV show game, or a laptop game, regarding or related to:

sport team, winning, outcome, final ranking, relative ranking, remaining teams, monthly groupings, weekly groupings, playoffs, point spreads, racing event setup, card game setup, real sport setup, sport fantasy game setup, video game, racing event, scores, games, or any other results.

Wherein an award or currency won or obtained in said game of chance and/or skills is related or based on one or more of following:

coupons, real currency, fake or play currency, bitcoin or electronic money, discount certificates, certificates, free-stay or free-food at a hotel, discounts, foreign currency, coins, gold, silver, jewelry, tokens, plastic or metal coin-type objects, social money or currency, charity contribution, score, mileage, bragging rights score, travel discounts, use of services or objects, corporate sponsored services, objects, or merchandise, commercial objects, gifts, surprise winnings, future discounts, credits, cash, debit cards, credit cards, account deposits, credit line, bills, rewards, awards, or prizes.

The interesting player setting up a first bucket of fund; wherein said first bucket of fund has a total value set by said interesting player; said first player contributing to said first bucket of fund, up to maximum of said total value; wherein said first bucket of fund is connected to an event or condition, related to said game of chance and/or skills, with some risk or odds associated with occurrence of said event or condition; said interesting player making a first bet or recommendation to bet on said event or condition, on said game of chance and/or skills; said first player receiving a notice regarding said first bet or recommendation to bet, on said event or condition; said first player betting on said first bet, on said event or condition, with a first risk factor for said event or condition.

In case said event or condition is satisfied or occurred, said processor calculating a first winning value for said first player, based on said first risk factor for said event or condition, based on said contribution to said first bucket of fund by said first player, and based on all rules and conditions set for said electronic gaming device; wherein said first winning value for said first player is based on said award or currency won or obtained in said game of chance and/or skills; an accounting unit disbursing or transferring funds, objects, certificates, or documents related to said first winning value for said first player, to said first player.

With the following options:

said accounting unit calculating a leader's award, percentage fee, or reward, based on said first winning value for said first player, for said interesting player.
said accounting unit notifying said interesting player regarding said leader's award, percentage fee, or reward.
said accounting unit transferring or sending said leader's award, percentage fee, or reward to said interesting player.
said first player bragging about said first player's accuracy or percentage of wins or consistency in predictions or good luck or expertise in sports or games.
said social network, forum, chat, email, broadcast, or platform is Facebook.
said social network, forum, chat, email, broadcast, or platform is Twitter.
said social network, forum, chat, email, broadcast, or platform is chat platform on a mobile phone.
presenting a template for bets.
editing a template for bets.
using an ad on a social network.
using a link or trigger on a social network.
transferring money on a social network.
raising pool fund on a social network.
competing against another participant.
competing against said electronic gaming device.
using a mobile device for betting.
paying by a mobile device.
connecting with others by a mobile device for betting or pooling.
adding followers on a social network.

Figure 38:
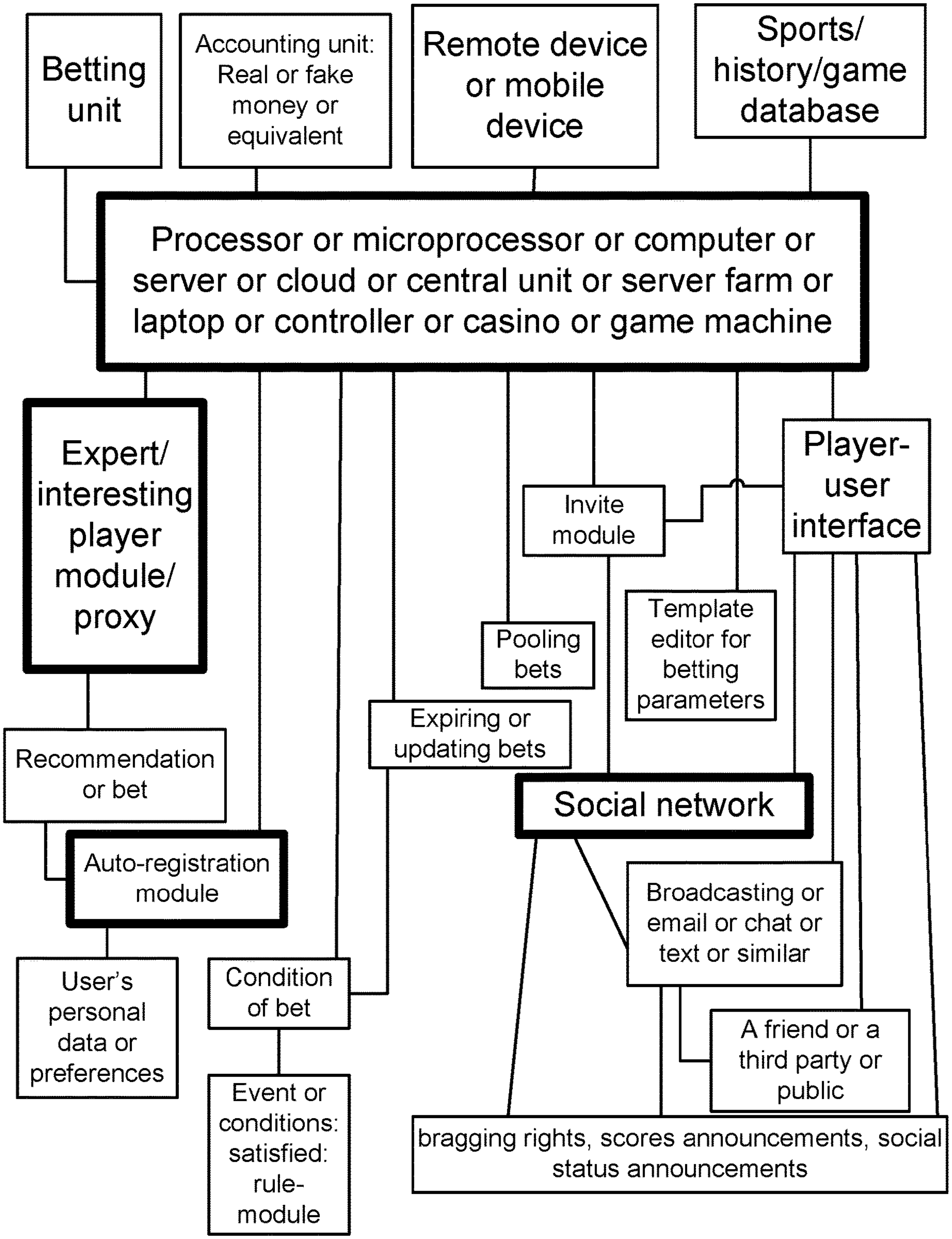
FIG. 38 is an embodiment for proxy betting system, with one-link connectivity for easy registration and betting, as well as connection and integration of social networks, for rapid expansion in market and for generating excitement among users.

FIG. 38 is an embodiment for proxy betting system, with one-link connectivity for easy registration and betting, as well as connection and integration of social networks, for rapid expansion in market and for generating excitement among users, which relates to the 3 embodiments described above, as options/extras.

The end user should be able to buy points in his favor. For example, we can have a situation where buying points means that you can move a point-spread up to e.g. two points in your favor. You should pay an extra 10% for each half-point that the line is moved. Points cannot be purchased on money lines or half-time point-spreads. You can e.g. buy points on NFL, NCAA Football, NBA, or NCAA Basketball point-spreads. There could be a deadline or window of time for that option. The rules are not necessarily universal and may change from vendor to vendor, or from sport to sport, or from event to event.

An embodiment is that when an entity sends out a link or a post to invite people to bet on a certain stage of a tournament, for example, the NBA or the college basketball games come down to 4 teams in the playoffs. Or, when an entity sends out a link, inviting people to bet on the playoffs and redirect clicks to a page where you can make various bets on all playoff games or events within those games. The invitations can go to friends, friends of friends, and/or public.

An embodiment is the following:

said first player registering for said game of chance and/or skills using said social network.

automatically registering for said game of chance and/or skills using said social network.

automatically extracting personal information from said social network for said first player.

said personal information comprises location, age, preferences, and methods of payments, for said first player.

said first player registering for said game of chance and/or skills using a mobile device or phone.

automatically registering for said game of chance and/or skills using a mobile device or phone.

using a mobile device or phone for identification, authentication, and registration.

An embodiment is the following: A method of conducting a game of chance and/or skills, said method comprising: providing a link, post, invitation, request, or address to a registration module, website, casino, betting site, gambling electronic device, or computing device, for a first player on a first device; wherein said first device comprises a processor; said first player selecting or activating said link, post, invitation, request, or address to said registration module, website, casino, betting site, gambling electronic device, or computing device, in one or more steps or stages; accessing to a database, registry, or storage for information about said first player, or receiving said information about said first player; registering said first player into said registration module, website, casino, betting site, gambling electronic device, or computing device, for said game of chance and/or skills; providing a user interface for said registration module, website, casino, betting site, gambling electronic device, or computing device, for said game of chance and/or skills to said first player; said user interface for said registration module, website, casino, betting site, gambling electronic device, or computing device providing a syndicate, proxy, recommendation, invitation, or opportunity for said game of chance and/or skills, through said registration module, website, casino, betting site, gambling electronic device, or computing device; wherein said game of chance and/or skills is related or based on one or more of following: a sport event, an electronic sport event, a fantasy sport event, a video game, a computer game, a telephone-based game, an Internet-based game, a car race, a horse race, an animal race, a casino game, a card game, a backgammon-type game, a chess-type game, a board game, a table game, a slot machine game, an electronic game, a network-based game, a software game, a virtual reality game, a simulation game, a reality game, a TV show game, or a laptop game, regarding or related to: sport team, winning, outcome, final ranking, relative ranking, remaining teams, monthly groupings, weekly groupings, playoffs, point spreads, racing event setup, card game setup, sport fantasy game setup, sport setup, video game, racing event, scores, games, or any other results; wherein an award or currency won or obtained in said game of chance and/or skills is related or based on one or more of following: coupons, real currency, fake or play currency, bitcoin or electronic money, discount certificates, certificates, free-stay or free-food at a hotel, discounts, foreign currency, coins, gold, silver, jewelry, tokens, plastic or metal coin-type objects, social money or currency, charity contribution, score, mileage, bragging rights score, travel discounts, use of services or objects, corporate sponsored services, objects, or merchandise, commercial objects, gifts, surprise winnings, future discounts, credits, cash, debit cards, credit cards, account deposits, credit line, bills, rewards, awards, or prizes; said first player contributing to a first bucket of fund; wherein said first bucket of fund is connected to an event or condition, related to said game of chance and/or skills, with some risk or odds associated with occurrence of said event or condition; said first player betting on a first bet, on said event or condition, with a first risk factor for said event or condition; in case said event or condition is satisfied or occurred, said processor calculating a first winning value for said first player, based on said first risk factor for said event or condition, based on said contribution to said first bucket of fund by said first player, and based on all rules and conditions set for said first device; wherein said first winning value for said first player is based on said award or currency won or obtained in said game of chance and/or skills; an accounting unit disbursing or transferring funds, objects, certificates, or documents related to said first winning value for said first player, to said first player.

An embodiment is the following:

inviting people to bet on a certain stage of a tournament.

said tournament is NBA or the college basketball games.

said tournament is NBA or the college basketball games, coming down to N teams in playoffs, wherein N is an integer number.

redirecting clicks or selections to another page.

making various bets on all playoff games or events within said games.

said invited people are friends, friends of friends, social media contacts, email contacts, chat contacts, family members, coworkers, or public.

making various bets during a game.

making various bets during a series of games.

hedging bets in a negative form of a condition or status.

breaking a condition in multiple components.

making a separate bet on each of said multiple components.

aggregating bets on each of said multiple components from various sources.

sending reminders to said invited people.

automatically chatting with said invited people.

automatically texting to said invited people.

presenting a template for bets.

editing a template for bets.

using a mobile device for betting.

modifying parameters of a bet during a game.

counteroffering parameters of a bet during a game.

accepting said modified parameters of said bet during said game.

accepting said counteroffered parameters of said bet during said game.

An embodiment is the following: A method of conducting a game of chance and/or skills, said method comprising: in case an electronic gaming device or a first player enters a specific area or location, or in case said electronic gaming device gets into a specific mode or state, then providing a link to a registration module; wherein said electronic gaming device comprises a processor; automatically selecting or activating said link to said registration module, in one or more steps or stages; said registration module automatically accessing to a database, registry, or storage for information about said first player; said registration module automatically getting said information about said first player from said database, registry, or storage; said registration module automatically registering said first player into a site or device for said game of chance and/or skills; said registration module automatically providing a user interface for said site or device for said game of chance and/or skills to said first player; said user interface for said site or device automatically providing a syndicate or proxy for said game of chance and/or skills, through an interesting player, said electronic gaming device, a website, a server, a computer, a casino, a central device, a controller, or an electronic device; wherein said game of chance and/or skills is related or based on one or more of following:

a sport event, an electronic sport event, a fantasy sport event, a video game, a computer game, a telephone-based game, an Internet-based game, a car race, a horse race, an animal race, a casino game, a card game, a backgammon-type game, a chess-type game, a board game, a table game, a slot machine game, an electronic game, a network-based game, a software game, a virtual reality game, a simulation game, a reality game, a TV show game, or a laptop game, regarding or related to:

sport team, winning, outcome, final ranking, relative ranking, remaining teams, monthly groupings, weekly groupings, playoffs, point spreads, racing event setup, card game setup, sport fantasy game setup, sport setup, video game, racing event, scores, games, or any other results;

wherein an award or currency won or obtained in said game of chance and/or skills is related or based on one or more of following:

coupons, real currency, fake or play currency, bitcoin or electronic money, discount certificates, certificates, free-stay or free-food at a hotel, discounts, foreign currency, coins, gold, silver, jewelry, tokens, plastic or metal coin-type objects, social money or currency, charity contribution, score, mileage, bragging rights score, travel discounts, use of services or objects, corporate sponsored services, objects, or merchandise, commercial objects, gifts, surprise winnings, future discounts, credits, cash, debit cards, credit cards, account deposits, credit line, bills, rewards, awards, or prizes.

An embodiment is the following: said first player contributing to a first bucket of fund, up to a maximum value; wherein said first bucket of fund is connected to an event or condition, related to said game of chance and/or skills, with some risk or odds associated with occurrence of said event or condition; said first player automatically betting on a first bet, on said event or condition, with a first risk factor for said event or condition; in case said event or condition is satisfied or occurred, said processor calculating a first winning value for said first player, based on said first risk factor for said event or condition, based on said contribution to said first bucket of fund by said first player, and based on all rules and conditions set for said electronic gaming device; wherein said first winning value for said first player is based on said award or currency won or obtained in said game of chance and/or skills; an accounting unit disbursing or transferring funds, objects, certificates, or documents related to said first winning value for said first player, to said first player.

An embodiment is the following: A method of conducting a game of chance and/or skills, said method comprising: providing a link to a registration module for a first player; wherein an electronic gaming device comprises a processor; said first player selecting or activating said link to said registration module, in one or more steps or stages; said registration module automatically accessing to a database, registry, or storage for information about said first player; said registration module automatically getting said information about said first player from said database, registry, or storage; said registration module automatically registering said first player into a site or device for said game of chance and/or skills; said registration module automatically providing a user interface for said site or device for said game of chance and/or skills to said first player; said user interface for said site or device automatically providing a syndicate or proxy for said game of chance and/or skills, through an interesting player, said electronic gaming device, a website, a server, a computer, a casino, a central device, a controller, or an electronic device; wherein said game of chance and/or skills is related or based on one or more of following: a sport event, an electronic sport event, a fantasy sport event, a video game, a computer game, a telephone-based game, an Internet-based game, a car race, a horse race, an animal race, a casino game, a card game, a backgammon-type game, a chess-type game, a board game, a table game, a slot machine game, an electronic game, a network-based game, a software game, a virtual reality game, a simulation game, a reality game, a TV show game, or a laptop game, regarding or related to: sport team, winning, outcome, final ranking, relative ranking, remaining teams, monthly groupings, weekly groupings, playoffs, point spreads, racing event setup, card game setup, sport fantasy game setup, sport setup, video game, racing event, scores, games, or any other results; wherein an award or currency won or obtained in said game of chance and/or skills is related or based on one or more of following: coupons, real currency, fake or play currency, bitcoin or electronic money, discount certificates, certificates, free-stay or free-food at a hotel, discounts, foreign currency, coins, gold, silver, jewelry, tokens, plastic or metal coin-type objects, social money or currency, charity contribution, score, mileage, bragging rights score, travel discounts, use of services or objects, corporate sponsored services, objects, or merchandise, commercial objects, gifts, surprise winnings, future discounts, credits, cash, debit cards, credit cards, account deposits, credit line, bills, rewards, awards, or prizes; said first player contributing to a first bucket of fund; wherein said first bucket of fund is connected to an event or condition, related to said game of chance and/or skills, with some risk or odds associated with occurrence of said event or condition; said first player betting on a first bet, on said event or condition, with a first risk factor for said event or condition; in case said event or condition is satisfied or occurred, said processor calculating a first winning value for said first player, based on said first risk factor for said event or condition, based on said contribution to said first bucket of fund by said first player, and based on all rules and conditions set for said electronic gaming device; wherein said first winning value for said first player is based on said award or currency won or obtained in said game of chance and/or skills; an accounting unit disbursing or transferring funds, objects, certificates, or documents related to said first winning value for said first player, to said first player.

An embodiment is the following: A method of conducting a game of chance and/or skills, said method comprising: a first player connecting to a social network, forum, chat, email, broadcast, or platform; wherein an electronic gaming device comprises a processor; extracting information about said first player from said social network, forum, chat, email, broadcast, or platform; wherein said information about said first player comprises one or more of following:

name, age, address, email address, job, income, monthly expenses, credit score, credit worthiness, preferences, biometrics, family information, risk tolerance degree, method of payment, credit limit, gambling habit, favorite casino, and favorite game;

registering said first player in a registration module, website, casino, betting site, gambling electronic device, or computing device, using said information about said first player; said first player receiving an option or choice for an interesting player from an interesting-player database; said first player receiving history and statistical data for performance of said interesting player from a performance database; said first player choosing said interesting player, as a syndicate, recommender, or proxy for said game of chance and/or skills; wherein said game of chance and/or skills is related or based on one or more of following:

a sport event, an electronic sport/e-sport event, a fantasy sport event, a video game, a computer game, a telephone-based game, an Internet-based game, a car race, a horse race, an animal race, a casino game, a card game, a backgammon-type game, a chess-type game, a board game, a table game, a slot machine game, an electronic game, a network-based game, a software game, a virtual reality game, a simulation game, a reality game, a TV show game, or a laptop game, regarding or related to:

sport team, winning, outcome, final ranking, relative ranking, remaining teams, monthly groupings, weekly groupings, playoffs, point spreads, racing event setup, card game setup, sport fantasy game setup, video game, racing event, scores, games, or any other results.

An embodiment is the following: An award or currency won or obtained in said game of chance and/or skills is related or based on one or more of following:

coupons, real currency, fake or play currency, bitcoin or electronic money, discount certificates, certificates, free-stay or free-food at a hotel, discounts, foreign currency, coins, gold, silver, jewelry, tokens, plastic or metal coin-type objects, social money or currency, charity contribution, score, mileage, bragging rights score, travel discounts, use of services or objects, corporate sponsored services, objects, or merchandise, commercial objects, gifts, surprise winnings, future discounts, credits, cash, debit cards, credit cards, account deposits, credit line, bills, rewards, awards, or prizes;

said interesting player setting up a first bucket of fund; wherein said first bucket of fund has a total value; said first player contributing to said first bucket of fund, up to maximum of said total value; wherein said first bucket of fund is connected to an event or condition, related to said game of chance and/or skills, with some risk or odds associated with occurrence of said event or condition; said interesting player making a first bet or recommendation to bet on said event or condition, on said game of chance and/or skills; said first player receiving a notice regarding said first bet or recommendation to bet, on said event or condition; said first player betting on said first bet, on said event or condition, with a first risk factor for said event or condition; in case said event or condition is satisfied or occurred, said processor calculating a first winning value for said first player, based on said first risk factor for said event or condition, based on said contribution to said first bucket of fund by said first player, and based on all rules and conditions set for said electronic gaming device; wherein said first winning value for said first player is based on said award or currency won or obtained in said game of chance and/or skills; an accounting unit disbursing or transferring funds, objects, certificates, or documents related to said first winning value for said first player, to said first player.

An embodiment is the following:

verifying age of said first player using said information about said first player.

verifying location or residence of said first player using said information about said first player.

verifying income and credit limit of said first player using said information about said first player.

rejecting said first player for gambling on real money, if it is determined that said first player is underage for gambling, based on law.

redirecting said first player to a social gambling site, based on fake or play money, if it is determined that said first player is underage for gambling, based on said law.

rejecting said first player for gambling on real money, if it is determined that said first player is not allowed for gambling, based on law in said first player's jurisdiction or location.

redirecting said first player to a social gambling site, based on fake or play money, if it is determined that said first player is not allowed for gambling, based on said law in said first player's jurisdiction or location.

said social network, forum, chat, email, broadcast, or platform is Facebook.

said social network, forum, chat, email, broadcast, or platform is Twitter.

communicating to said social network, forum, chat, email, broadcast, or platform, with a mobile device, phone, or smart phone.

presenting a template for bets.

using an ad on said social network.

editing or changing a template or parameters for bets.

verifying method of payment by said first player using said information about said first player.

rejecting said first player for gambling, if it is determined that said first player is not allowed for gambling, based on law, regarding said first player's method of payment being a credit card.

redirecting said first player to a social gambling site, based on fake or play money, if it is determined that said first player is not allowed for gambling, based on said law.

verifying identity of said first player, using said information about said first player versus said first player's biometrics input.

said social network, forum, chat, email, broadcast, or platform is a chat platform on a mobile or smart phone.

said first player bragging about said first player's performance and past winnings on said social network, forum, chat, email, broadcast, or platform.

adding followers on said social network, forum, chat, email, broadcast, or platform.

One embodiment is: The method of conducting a game of chance and/or skills, as recited in claim 1, wherein H human players play against G machines and against Y other humans in a single or team version of said game of chance and/or skills, wherein H, G, and Y are all positive integers more than 1, and wherein G machines do not make any intentional mistakes in said game of chance and/or skills. Or, we have: The method of conducting a game of chance and/or skills, as recited in claim 1, wherein H human players play against G machines and against Y other humans in a single or team version of said game of chance and/or skills, wherein H, G, and Y are all positive integers more than 1, and wherein G machines make one or more intentional mistakes in said game of chance and/or skills.

One embodiment is: Sport betting expert has a YouTube channel, and he analyzes games on his channel and has millions of viewers/followers. He posts/recommends specific bets on the screen, and his viewers bet on that. It may have a link or hyperlink. The link bring the viewers to a split-screen so they can bet and still watch the show. The bets are specific, but not in the form of a link, as an example.

One embodiment is, in the form of a scenario, with options to follow below: Tipster or third party A puts out a OCB on his Twitter feed. He may only put it out in states where sports betting is legal. He gets 900 people who take him up on his offer. He gets to track these customers: How much they bet, how much they win or lose, if they change any component of the bet, if they place other bets while on site, and the like. He can keep track of his success rate. Based on success rate, he can charge customers and casinos (sports book sites). Based on his business style, he can set up a way to charge the 900 bettors a fee for his work. For example, after one free bet, there is a per-bet charge, or a type of charge, only if you win, or subscribe. He may choose to redirect all or portions of bettors to certain licensed site base on a business agreement made with said site. Based on tracking, he can create a portfolio and increase the value of his business. The information can be provided to customers for tax purposes or other reasons. In one example, the customer's registration information stays with tipster, and he registers customers with sites that he wishes to do business with. He can use the same registration info to move customers from site to site based on his business decisions. In one example, the page he will bring them to looks like his own page, but it actually resides on a licensed site. Or, his page and customer's info are portable from site to site, so he can choose what licensed site he wishes to bring his customers to, for any betting transaction. This will provide a marketplace for those who are skilled in sports betting or customer acquisition through social media or otherwise.

A "friend" is a broad term in here, including a stranger or any third party. The expert or leader or interesting player is also very broad, including any party or any person (or team), even with no skills, or any organization as a unit.

In one embodiment, we have a player who has a higher cost for fantasy sports, to set it up and spend resources and time to make a team, even before betting. Then, there is another factor that comes in, for ratio or risk of winning, for a real player and a fantasy player or avatar or placeholder.

In one embodiment, we have bucket of funds being the same. In one embodiment, we have no bucket of funds. In one embodiment, we can go directly to the betting step, e.g., based on suggested bets, e.g., based on a precise or semi-precise or no-precise suggestion. In one embodiment, we have his own page or the page from casino or rented from casino, but customized or looked like a personal page, on the Internet or website. In one embodiment, we have directed from social site, directly or indirectly, e.g., from Facebook, to go to the betting site or suggestion site. In one embodiment, we have tools for changing/editing/using the template for the bets.

In one embodiment, we have waging dollar/money from a third party, which is calculated from a $4^{th}$ party or equipment, or received information from a source, or calculated by a processor (in some situations). In one embodiment, we have counter offer, where a person or machine can change parameters or numbers or odds in their favor and return as a negotiation to set the final bet at the end of the process, or it can be in the form of opposing bets or multiple choices.

In one embodiment, we have a site independent of a casino or within a casino or under umbrella of a casino or betting site or larger site or larger corporation or association or insurance shell or cooperative shell or dependent on a site or in a casino site but with customized look or feel, as if it was independent. So, for example, it saves money for interface and billing or operation or reduce risk or distribute risk or have one IT department for all or reduce overhead for site, or provide common platform for all to use at a fraction of cost for processor or storage or cloud or payment interface or charging or security or all the modules in this disclosure or a casino or a betting site, with all functions or usages needed or desired, or the like. Or, because either regulations or business practices favored by big casinos, or economic of scale or ad costs, we want to also be able to do it under a bigger umbrella. Meaning that, e.g., the end user will place his bets through our technology, but he will only be redirected to the site with which he will place the wager, or any of the combinations mentioned above/here.

In one embodiment, the benefit of OneClickBet is as follows, as an example: Its advertisement through email or social media suggests that you bet on something specific, e.g., giving hints with all parameters or tools to set them or set already or with a link or links to do it, with min. efforts, even if you do not know the rules of the game or betting or casino or site or do not have time or patience. They can also provide similar bets or sports or games or situations to bet on, instead or in addition, to increase the traffic or commerce or betting possibilities and volume.

In one embodiment, their advertisement is triggered by: 1—things you have searched on your device, 2—things you have searched on Amazon or the like, and 3—things that may complement your searches or your previous purchases, or prior behavior or profile/preferences/history/experience/tracking, as well as things that they believe you may like, based on your prior searches and purchases, or from Likes on your social media.

Today in the sports betting, there are only cookie cutter bets that are evaluated for odds by odds-maker and then made available for customers to place a wager on. However, we would like to allow their customers to name and create their own unique bets. This would be a perfect match for our environment. Especially, if it allows the creator of a bet to convert that bet into a hyperlink and have it existing somewhere where other people can place a wager on. These bets could be in the form of templates with changeable components. For example, the bet would be "NY Giants will score 14 points in the first half". I like that bet and I will place a wager on it. But I also want to place a similar bet on the opponent, so I change some components and say "Patriots will score 21 points in the first half". The bet can be consistent or neutral or in contradiction to the original bet. The bets can come one at a time or simultaneously or in combo or instead of or replacing or the like.

In one embodiment, we have a third party composing cookie-cutter bet formats that basically fit all or most competitions within electronic games of skill or skill & chance. In one embodiment, we have a third party composing specific bets for specific games of skill or skill & chance. In one embodiment, we have cloud computing, server farms, no-server, edge computing, single computer, mobile device, laptop, tel, watch, or IoT, or the like, for computing device.

Any variations of the above teaching is also intended to be covered and protected by the current patent application. Any 2 or more embodiments can be combined or mixed, as well.

The invention claimed is:

1. A method of conducting a game of chance and/or skills, said method comprising:

a processor receiving a name of an interesting player;

wherein an electronic gaming device comprises said processor;

a first player connecting to a social network, forum, chat, email, broadcast, or platform;

said first player contacting one or more friends through said social network, forum, chat, email, broadcast, or platform;

said first player inviting said one or more friends to play or bet with or against said first player, or to team up with said first player, or to follow said first player, or to be followed by said first player, or to organize a pool for fund, or to organize a pool for bet, or to organize a team, or to organize a league, or to coordinate a fund-raising, or to brag about said first player's scores or wins, or to trash-talk said one or more friends to challenge said one or more friends to play or bet with or against said first player, or to get attention or encouragement or respect from said one or more friends, or to brag about said first player's expertise or skills, or to get recommendations or tips from said one or more friends;

said first player receiving an option or choice for said interesting player;

said first player receiving history and statistical data for performance of said interesting player from a performance database;

said first player choosing said interesting player, as a syndicate or proxy for said game of chance and/or skills;

wherein said game of chance and/or skills is related or based on one or more of following:

an electronic sport event, an e-sport event, a fantasy sport event, a video game, a computer game, a telephone-based game, an Internet-based game, a car race, a horse race, an animal race, a casino game, a card game, a backgammon-type game, a chess-type game, a board game, a table game, a slot machine game, an electronic game, a network-based game, a software game, a virtual reality game, a simulation game, a reality game, a TV show game, or a laptop game, regarding or related to:

sport team, winning, outcome, final ranking, relative ranking, remaining teams, monthly groupings, weekly groupings, playoffs, point spreads, racing event setup, card game setup, sport fantasy game setup, video game, racing event, scores, games, in-game event, an event that affects said game of chance and/or skills, an event with associated bet or risk, or any other results;

wherein an award or currency won or obtained in said game of chance and/or skills is related or based on one or more of following:

coupons, real currency, fake or play currency, bitcoin or electronic money, discount certificates, certificates, free-stay or free-food at a hotel, discounts, foreign currency, coins, gold, silver, jewelry, tokens, plastic or metal coin-type objects, social money or currency, charity contribution, score, mileage, bragging rights score, travel discounts, use of services or objects, corporate sponsored services, objects, or merchandise, commercial objects, gifts, surprise winnings, future discounts, credits, cash, debit cards, credit cards, account deposits, credit line, bills, rewards, awards, or prizes;

said interesting player setting up a first bucket of fund;

wherein said first bucket of fund has a total value set by said interesting player;

said first player contributing to said first bucket of fund, up to maximum of said total value;

wherein said first bucket of fund is connected to an event or condition, related to said game of chance and/or skills, with some risk or odds associated with occurrence of said event or condition;

said interesting player making a first bet or recommendation to bet on said event or condition, on said game of chance and/or skills;

said first player receiving a notice regarding said first bet or recommendation to bet, on said event or condition;

said first player betting on said first bet, on said event or condition, with a first risk factor for said event or condition;

in case said event or condition is satisfied or occurred, receiving or calculating a first winning value for said first player, based on said first risk factor for said event or condition, based on said contribution to said first bucket of fund by said first player, and based on all rules and conditions set for said electronic gaming device;

wherein said first winning value for said first player is based on said award or currency won or obtained in said game of chance and/or skills;

an accounting unit disbursing or transferring funds, objects, certificates, or documents related to said first winning value for said first player, to said first player.

2. The method of conducting a game of chance and/or skills, as recited in claim 1, said method comprises: said accounting unit calculating a leader's award, percentage fee, or reward, based on said first winning value for said first player, for said interesting player.

3. The method of conducting a game of chance and/or skills, as recited in claim 2, said method comprises: said accounting unit notifying said interesting player regarding said leader's award, percentage fee, or reward.

4. The method of conducting a game of chance and/or skills, as recited in claim 3, said method comprises: said accounting unit transferring or sending said leader's award, percentage fee, or reward to said interesting player.

5. The method of conducting a game of chance and/or skills, as recited in claim 1, said method comprises: said first player bragging about said first player's accuracy or percentage of wins or consistency in predictions or good luck or expertise in sports or games.

6. The method of conducting a game of chance and/or skills, as recited in claim 1, wherein said social network, forum, chat, email, broadcast, or platform is Facebook.

7. The method of conducting a game of chance and/or skills, as recited in claim 1, wherein said social network, forum, chat, email, broadcast, or platform is Twitter.

8. The method of conducting a game of chance and/or skills, as recited in claim 1, wherein said social network, forum, chat, email, broadcast, or platform is a chat platform on a mobile phone.

9. The method of conducting a game of chance and/or skills, as recited in claim 1, said method comprises: presenting a template for bets.

10. The method of conducting a game of chance and/or skills, as recited in claim 1, said method comprises: editing a template for bets.

11. The method of conducting a game of chance and/or skills, as recited in claim 1, said method comprises: using an ad on said social network.

12. The method of conducting a game of chance and/or skills, as recited in claim 1, said method comprises: using a link or trigger on said social network.

13. The method of conducting a game of chance and/or skills, as recited in claim 1, said method comprises: transferring money on said social network.

14. The method of conducting a game of chance and/or skills, as recited in claim 1, said method comprises: raising pool fund on said social network.

15. The method of conducting a game of chance and/or skills, as recited in claim 1, said method comprises: competing against another participant.

16. The method of conducting a game of chance and/or skills, as recited in claim 1, said method comprises: competing against said electronic gaming device.

17. The method of conducting a game of chance and/or skills, as recited in claim 1, said method comprises: using a mobile device for betting.

18. The method of conducting a game of chance and/or skills, as recited in claim 1, said method comprises: paying by a mobile device.

19. The method of conducting a game of chance and/or skills, as recited in claim 1, said method comprises: connecting with others by a mobile device for betting or pooling.

20. The method of conducting a game of chance and/or skills, as recited in claim 1, said method comprises: adding followers on said social network.

21. The method of conducting a game of chance and/or skills, as recited in claim 1, said method comprises: said first player registering for said game of chance and/or skills using said social network.

22. The method of conducting a game of chance and/or skills, as recited in claim 1, said method comprises: automatically registering for said game of chance and/or skills using said social network.

23. The method of conducting a game of chance and/or skills, as recited in claim 22, said method comprises: automatically extracting personal information from said social network for said first player.

24. The method of conducting a game of chance and/or skills, as recited in claim 23, wherein said personal information comprises location, age, preferences, and methods of payments, for said first player.

25. The method of conducting a game of chance and/or skills, as recited in claim 1, said method comprises: said first player registering for said game of chance and/or skills using a mobile device or phone.

26. The method of conducting a game of chance and/or skills, as recited in claim 1, said method comprises: automatically registering for said game of chance and/or skills using a mobile device or phone.

27. The method of conducting a game of chance and/or skills, as recited in claim 1, said method comprises: using a mobile device or phone for identification, authentication, and registration.

28. The method of conducting a game of chance and/or skills, as recited in claim 1, wherein said one or more friends is or comprises any third party or stranger.

29. The method of conducting a game of chance and/or skills, as recited in claim 1, said method comprises: a third party putting a link or bet or recommendation on said third party' Twitter or broadcast or feed or blog.

30. The method of conducting a game of chance and/or skills, as recited in claim 1, said method comprises: broadcasting only in states where sports betting is legal.

31. The method of conducting a game of chance and/or skills, as recited in claim 1, said method comprises: tracking followers or customers or viewers.

32. The method of conducting a game of chance and/or skills, as recited in claim 1, said method comprises: tracking followers or customers or viewers, as how much said followers or customers or viewers bet, how much said followers or customers or viewers win or lose, if said followers or customers or viewers change or edit or customize any component of any bet, or if said followers or customers or viewers place other bets, while on a first site.

33. The method of conducting a game of chance and/or skills, as recited in claim 1, said method comprises: tracking success rate or wins.

34. The method of conducting a game of chance and/or skills, as recited in claim 1, said method comprises: based on success rate, charging customers, casinos, or sports book sites.

35. The method of conducting a game of chance and/or skills, as recited in claim 1, said method comprises: charging bettors a fee for services.

36. The method of conducting a game of chance and/or skills, as recited in claim 1, said method comprises: charging bettors a fee for subscription.

37. The method of conducting a game of chance and/or skills, as recited in claim 1, said method comprises: redirecting all or portions of bettors to a certain licensed site, based on a business agreement made with said certain licensed site.

38. The method of conducting a game of chance and/or skills, as recited in claim 1, said method comprises: based on tracking or history, creating a portfolio and increasing value of a business, with more traffic or followers or ads.

39. The method of conducting a game of chance and/or skills, as recited in claim 1, said method comprises: providing information to customers for tax purposes.

40. The method of conducting a game of chance and/or skills, as recited in claim 1, said method comprises: providing information of a user to a tipster.

41. The method of conducting a game of chance and/or skills, as recited in claim 1, said method comprises: providing information of a user to a tipster, for future registrations.

42. The method of conducting a game of chance and/or skills, as recited in claim 1, said method comprises: providing a marketplace or platform for people with skills or knowledge to get followers from general public.

* * * * *